US011710205B2

(12) United States Patent
Okuyama et al.

(10) Patent No.: US 11,710,205 B2
(45) Date of Patent: Jul. 25, 2023

(54) IMAGE CAPTURING METHOD AND DISPLAY METHOD FOR RECOGNIZING A RELATIONSHIP AMONG A PLURALITY OF IMAGES DISPLAYED ON A DISPLAY SCREEN

(71) Applicant: MAXELL, LTD., Kyoto (JP)

(72) Inventors: Nobutaka Okuyama, Kyoto (JP); Ryuji Nishimura, Kyoto (JP); Susumu Yoshida, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/743,105

(22) Filed: May 12, 2022

(65) Prior Publication Data
US 2022/0270197 A1 Aug. 25, 2022

Related U.S. Application Data

(60) Division of application No. 17/227,031, filed on Apr. 9, 2021, now Pat. No. 11,367,158, which is a (Continued)

(30) Foreign Application Priority Data

Jun. 20, 2016 (JP) ................................ 2016-121612
Jul. 1, 2016 (JP) ................................ 2016-131929

(51) Int. Cl.
*G06T 1/00* (2006.01)
*H04N 9/82* (2006.01)
(Continued)

(52) U.S. Cl.
CPC ............ *G06T 1/0007* (2013.01); *H04N 5/77* (2013.01); *H04N 5/92* (2013.01); *H04N 5/93* (2013.01);
(Continued)

(58) Field of Classification Search
CPC .. G06T 1/0007; H04N 5/232; H04N 5/23203; H04N 5/23212; H04N 5/23293;
(Continued)

(56) References Cited

U.S. PATENT DOCUMENTS 8,495,066 B2 7/2013 Aihara et al.
9,215,375 B2 * 12/2015 Shintani ........... H04N 5/232945
(Continued)

FOREIGN PATENT DOCUMENTS

JP 2000-092439 A 3/2000
JP 2003-259350 A 9/2003
(Continued)

OTHER PUBLICATIONS

International Search Report issued in corresponding International Patent Application No. PCT/JP2017/020407, dated Aug. 22, 2017, English Translation.
(Continued)

*Primary Examiner* — Luong T Nguyen
(74) *Attorney, Agent, or Firm* — McDermott Will & Emery LLP

(57) ABSTRACT

An image capturing apparatus includes a capture part acquiring image data, and a display displaying an image on a display based on the image data. First information acquired includes at least either an azimuth angle or an elevation angle as a direction of the image and at least either an angle of view of the image or angle-of-view related information calculating the angle of view. When a second direction of a second image is included within a range of a first angle of view in a first direction of a first image, the second image is associated with the first image, and the first image is displayed within the display, and display is performed in a state in which the second image to be associated with the first image is overlapped on the first image within the display
(Continued)

as the second image or second information indicating the second image.

19 Claims, 50 Drawing Sheets

Related U.S. Application Data continuation of application No. 16/311,631, filed as application No. PCT/JP2017/020407 on Jun. 1, 2017, now Pat. No. 11,004,167.

(51) Int. Cl.
| | |
|---|---|
| H04N 9/804 | (2006.01) |
| H04N 23/63 | (2023.01) |
| H04N 23/66 | (2023.01) |
| H04N 23/67 | (2023.01) |
| H04N 5/92 | (2006.01) |
| H04N 5/93 | (2006.01) |
| H04N 5/77 | (2006.01) |
| H04N 23/60 | (2023.01) |

(52) U.S. Cl.
CPC ......... *H04N 9/8042* (2013.01); *H04N 9/8205* (2013.01); *H04N 23/60* (2023.01); *H04N 23/63* (2023.01); *H04N 23/66* (2023.01); *H04N 23/67* (2023.01); *H04N 23/631* (2023.01)

(58) Field of Classification Search
CPC .. H04N 5/77; H04N 5/92; H04N 5/93; H04N 9/8042; H04N 9/8205; H04N 5/232933; H04N 5/23216; H04N 5/23238; H04N 5/23245; H04N 5/23296; H04N 9/804; H04N 23/60; H04N 23/63; H04N 23/66; H04N 23/67; H04N 23/631; H04N 23/698; H04N 23/62; H04N 23/667; H04N 23/69

See application file for complete search history.

(56) References Cited

U.S. PATENT DOCUMENTS

| | | | | |
|---|---|---|---|---|
| 9,426,379 | B2* | 8/2016 | Nonaka | ............... H04N 5/23216 |
| 9,924,087 | B2* | 3/2018 | Fukuya | ............ H04N 5/232945 |
| 11,004,167 | B2 | 5/2021 | Okuyama et al. | |
| 2003/0160863 | A1 | 8/2003 | Kakou et al. | |
| 2004/0061787 | A1 | 4/2004 | Liu et al. | |
| 2007/0223047 | A1* | 9/2007 | Kameyama | .......... H04N 1/3875 |
| | | | | 358/537 |
| 2012/0075410 | A1 | 3/2012 | Matsumoto et al. | |
| 2012/0169769 | A1 | 7/2012 | Minamino et al. | |
| 2012/0281119 | A1 | 11/2012 | Ohba et al. | |
| 2012/0300051 | A1 | 11/2012 | Daigo et al. | |
| 2014/0125814 | A1 | 5/2014 | Takahashi | |
| 2015/0271414 | A1 | 9/2015 | Sato | |
| 2016/0142629 | A1* | 5/2016 | Jung | .................. H04N 5/23229 |
| | | | | 348/218.1 |

FOREIGN PATENT DOCUMENTS

| | | | |
|---|---|---|---|
| JP | 2006-319538 A | 11/2006 | |
| JP | 2008-028648 A | 2/2008 | |
| JP | 2009-129182 A | 6/2009 | |
| JP | 2010-252258 A | 11/2010 | |
| JP | 2010-263270 A | 11/2010 | |
| JP | 2011-114401 A | 6/2011 | |
| JP | 2012-75018 A | 4/2012 | |
| JP | 2012-142825 A | 7/2012 | |
| JP | 2013-015907 A | 1/2013 | |
| JP | 2015-167309 A | 9/2015 | |

OTHER PUBLICATIONS

Notice of Reasons of Refusal issued in corresponding JP Application No. 2021-069100, dated Mar. 15, 2022 w/ Machine English Translation.
Non-Final Office Action issued in related parent U.S. Appl. No. 17/227,031, dated Nov. 10, 2021.
Notice of Allowance issued in related parent U.S. Appl. No. 17/227,031, dated Feb. 15, 2022.
U.S. PTO Non-Final Office Action issued in related parent U.S. Appl. No. 16/311,631, dated Sep. 17, 2020.
U.S. PTO Notice of Allowance issued in related parent U.S. Appl. No. 16/311,631, dated Jan. 12, 2021.
Parent U.S. Appl. No. 16/311,631, filed Dec. 19, 2018.
Notice of Reasons of Refusal issued in corresponding JP Application No. 2022-107595, dated Feb. 28, 2023 w/Machine English Translation.

* cited by examiner

STORAGE

21 — MANAGEMENT INFORMATION

○ IMAGE FILE MANAGEMENT INFORMATION
  (FILE NAME, UPDATE TIME AND DATE, TYPE, SIZE, ETC.)
○ ASSOCIATING MANAGEMENT INFORMATION
  ・TYPE IDENTIFIER (FIRST IMAGE (WIDE ANGLE)/
    SECOND IMAGE (NARROW ANGLE)
  ・REFERENCE IDENTIFIER
  ・SETTING CHARACTER STRING

24 — IMAGE FILE

22 — METADATA

○ PHOTOGRAPHING DATE AND TIME
    (YEAR, MONTH, DATE, HOUR, MINUTE, SECOND)
○ PHOTOGRAHING PLACE
    (POSITIONAL INFORMATION
    {LATITUDE, LONGITUDE, ALTITUDE}
    OR SETTING CHARACTER STRING)
○ MODEL TYPE
○ RESOLUTION
○ PHOTOGRAPHING DIRECTION
    ・AZIMUTH ANGLE ($\theta$)
    ・ELEVATION ANGLE ($\phi$)
○ ANGLE OF VIEW
    ・HORIZONTAL ANGLE OF VIEW (Ah)
    ・VERTICAL ANGLE OF VIEW (Av)
○ ANGLE-OF-VIEW RELATED INFORMATION
    (ELECTRONIC ZOOMING MAGNIFICATION (n),
    FOCAL LENGTH (f),
    DIMENSION OF IMAGE CAPTURE ELEMENT {sw, sh, sd} etc.)
○ ROTATION ANGLE
○ THUMBNAIL (SHRUNK IMAGE)
......

23 — IMAGE DATA

FIG. 18

THIRD SELECTION SYSTEM: SETTING CHARACTER STRING

| FILE NAME | PHOTOGRAPHING DATE | TAG | TYPE | |
|---|---|---|---|---|
| IMAGE G1 | JANUARY 5, 2016··· | PARK A | WIDE ANGLE | ··· |
| IMAGE G2 | JANUARY 5, 2016··· | PARK A | NARROW ANGLE | ··· |
| IMAGE G3 | JANUARY 5, 2016··· | PARK A | NARROW ANGLE | ··· |
| IMAGE G4 | JANUARY 12, 2016··· | OBSERVATION DECK B | WIDE ANGLE | ··· |
| IMAGE G5 | JANUARY 12, 2016··· | OBSERVATION DECK B | NARROW ANGLE | ··· |

FIG. 37
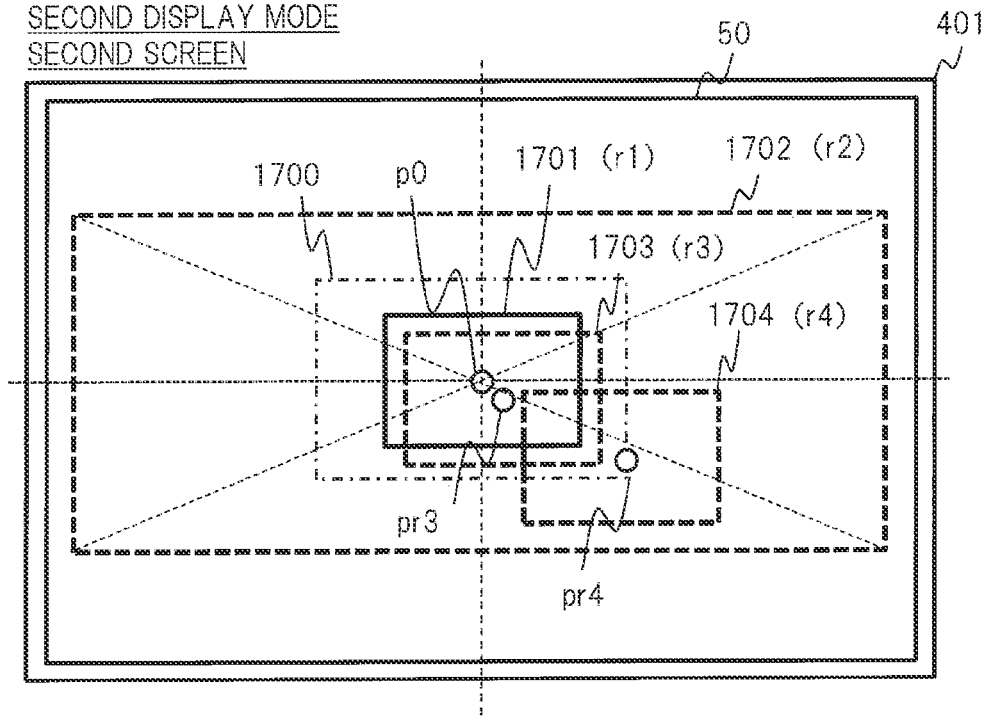
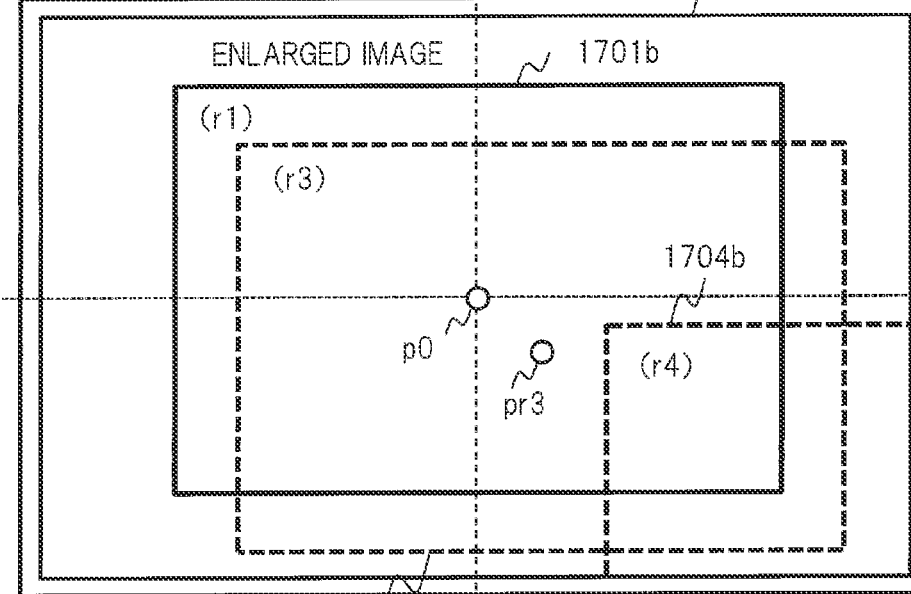

IMAGE CAPTURING METHOD AND DISPLAY METHOD FOR RECOGNIZING A RELATIONSHIP AMONG A PLURALITY OF IMAGES DISPLAYED ON A DISPLAY SCREEN

CROSS REFERENCE TO RELATED APPLICATIONS

This is a Divisional of U.S. patent application Ser. No. 17/227,031, filed on Apr. 9, 2021, which is a Continuation of U.S. patent application Ser. No. 16/311,631 filed on Dec. 19, 2018, now U.S. Pat. No. 11,004,167, issued on May 11, 2021, which is the U.S. National Phase under 35 U.S.C. § 371 of International Application No. PCT/JP2017/020407, filed on Jun. 1, 2017, which claims the benefits of Japanese Application No. 2016-121612, filed on Jun. 20, 2016 and Japanese Application No. 2016-131929, filed on Jul. 1, 2016, the entire contents of which are hereby incorporated by reference.

TECHNICAL FIELD

The present invention relates to techniques of an image capturing apparatus and an image capturing and display apparatus, and relates to screen display techniques of captured images.

BACKGROUND ART

Conventionally, as an electronic apparatus, such as an image capturing apparatus or the like, having a function for capturing a plurality of images having different photographing directions and angles of view, a digital camera, a smartphone and the like are listed. Moreover, as an electronic apparatus, such as a display apparatus or the like, having a function for reproducing/displaying the plurality of images, a television receiver (hereinafter, sometimes referred to as "television"), a notebook PC and the like are listed. The above-described images are still images or motion images. The photographing direction is specified by, for example, an azimuth angle and an elevation angle. The angle of view is represented by an angle showing an image range, and is also referred to as a viewing angle, which is specified by, for example, a horizontal angle of view corresponding to the azimuth angle and a vertical angle of view corresponding to the elevation angle.

As images having different angles of view, an image captured with a relatively wide angle (hereinafter, referred to as "wide angle image", sometimes referred to also as "first image" or the like) and an image captured with a relatively narrow angle (hereinafter, referred to as "narrow angle image", sometimes referred to also as "second image" or the like) are listed. Examples of the wide angle include such angles of view as to be set to 120° and 180° or more in the horizontal angle of view. Note that, an image in the case of 180° is sometimes referred to as a half celestial sphere image, and an image in the case of 360° is sometimes referred to as a celestial sphere image. As an example of the narrow angle, angles of view having 45° or less in the horizontal angle of view are listed. Hereinafter, as a unit of the angle, a degree (°) is used. However, this may be converted to a unit of radian or the like.

As a related art technique to the screen display of captured images, Japanese Patent Application Laid-open Publication No. 2000-92439 (Patent Document 1) is listed. In the Patent Document 1, with respect to an electronic still camera or the like, the following technique is described. When a power-supply off is instructed, the electronic still camera generates an image list display-use file that allows record images recorded in a recording memory to be displayed as a list in an external apparatus. On a list display screen displayed by image search by using the file, a plurality of shrunk images are displayed as the list.

RELATED ART DOCUMENTS

Patent Documents

Patent Document 1: Japanese Patent Application Laid-open Publication No. 2000-92439

SUMMARY OF THE INVENTION

Problems to be Solved by the Invention

A user, who is a photographer, sometimes captures a plurality of images that are different in photographing directions and angles of view, at similar places and similar date and time by using an image capturing apparatus. For example, at the same park on the same date, the user captures a wide angle image in a certain photographing direction with a certain angle of view, and the user also captures a narrow angle image in a different photographing direction with a different angle of view. In such a case, the plurality of images can be said to be a group of images associated with one another having a predetermined relationship with respect to the place, the date and time, the photographing direction, the angle of view and the like.

Conventional image capturing apparatuses and display apparatuses have a function by which on a display screen, a plurality of images are displayed in a list with a parallel layout in an order of, for example, image capture date and time, file names or the like. For example, in the case of the Patent Document 1, on a list display screen, a plurality of shrunk images are displayed in the parallel layout.

However, in the related art, it is difficult for the user to intuitively recognize a plurality of images that have a predetermined relationship among all the images displayed on a display screen. For example, even when wide angle images and narrow angle images captured at the similar place on the similar date and time are mixed, it is difficult for the user to recognize a relationship among those images. In the related art, there is no such function as to reproduce and display a plurality of images having a certain relationship so as to be associated with one another. In the related art, there is no such function, etc., of displaying a certain image by referring to other images having a relationship with the certain image from a state in which the certain image is displayed on a display screen. In the related art, time and effort are spent for editing and managing works of a plurality of images by a user.

That is, in the related art, it is difficult to favorably view a plurality of images having a relationship, and there is some room for improvements in convenient use.

An object of the present invention relates to an image capturing apparatus and a display apparatus, and is to provide a technique that easily recognizes a relationship among a plurality of images and achieves more convenient use.

Means for Solving the Problems

Typical embodiments of the present invention relate to an image capturing apparatus and a display apparatus, and have a feature with the following configurations.

An image capturing apparatus according to one embodiment is provided with an image capture part configured to acquire image data by capturing a still image or a motion image and a display part configured to reproduce and display the image on a display screen based on the image data, and first information is acquired, the first information including at least either one of an azimuth angle and an elevation angle as a photographing direction of the image and at least either one of an angle of view of the image and angle-of-view related information capable of calculating the angle of view, a second image is associated with a first image in a plurality of the captured images when a second photographing direction of the second image is included in a range of a first angle of view in a first photographing direction of the first image, the first image selected based on a user's operation is displayed within the display screen, and the second image associated with the first image is displayed on the first image so as to be overlapped as the second image or second information representing the second image.

A display apparatus according to one embodiment is provided with an input part to which image data of a still image or a motion image captured by an external image capturing apparatus is input so as to be held therein and a display part configured to reproduce and display the image on a display screen based on the image data, and first information is acquired, the first information including at least either one of an azimuth angle and an elevation angle as a photographing direction of the image and at least either one of an angle of view of the image and angle-of-view related information capable of calculating the angle of view, a second image is associated with a first image in a plurality of the captured images when a second photographing direction of the second image is included in a range of a first angle of view in a first photographing direction of the first image, the first image selected based on a user's operation is displayed within the display screen, and the second image associated with the first image is displayed on the first image so as to be overlapped as the second image or second information representing the second image.

Effects of the Invention

According to typical embodiments of the present invention, in an image capturing apparatus and a display apparatus, a relationship among a plurality of images can be easily recognized, and more convenient use can be achieved.

BRIEF DESCRIPTIONS OF THE DRAWINGS

FIG. 5 is a diagram that shows a configuration of management information and metadata in the image capturing apparatus of the first embodiment;

FIG. 18 is an explanatory diagram that shows a third selection system in the image capturing apparatus of the first embodiment;

FIG. 37 is a diagram that shows an example of an enlarging/shrinking process, etc., in the second display mode screen in the image capturing apparatus of the fourth embodiment;

BEST MODE FOR CARRYING OUT THE INVENTION

Hereinafter, embodiments of the present invention will be described in detail with reference to the accompanying drawings. Note that the same components are denoted by the same reference symbols in principle throughout all the drawings for describing the embodiments, and the repetitive description thereof will be omitted.

First Embodiment

With reference to FIG. 1 to FIG. 21, explanations will be given to an image capturing apparatus and a display apparatus according to a first embodiment of the present invention. The image capturing apparatus and the display apparatus of the first embodiment have a function by which a plurality of images having different photographing directions and angles of view at the time of photographing, particularly, a wide angle image and a narrow angle image, are displayed so as to be associated with one another.

[Image Capturing and Display System]

Figure 1:
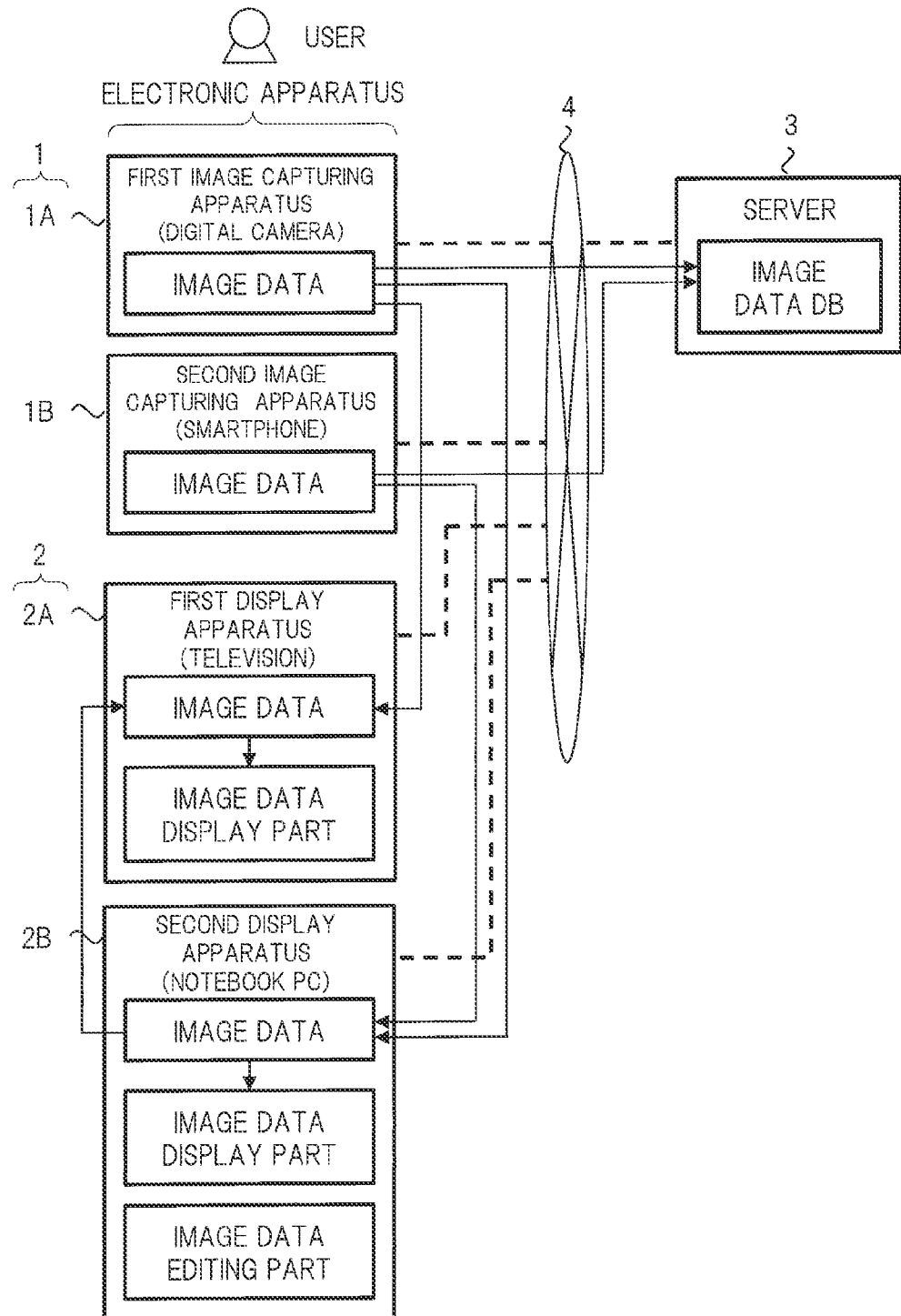
FIG. 1 is a diagram that shows a configuration of an image capturing and display system that is constituted by an image capturing apparatus and a display apparatus according to a first embodiment of the present invention.

FIG. 1 shows a configuration of an image capturing and display system that is a system constituted by an image capturing apparatus and a display apparatus according to a first embodiment. In the image capturing and display system of FIG. 1, a first image capturing apparatus 1A and a second image capturing apparatus 1B corresponding to image capturing apparatuses 1 of the first embodiment, a first display apparatus 2A and a second display apparatus 2B corresponding to display apparatuses 2 of the first embodiment, and a server 3 are connected to one another through a communication network 4. The communication network 4 includes a wireless communication network and the Internet.

The image capturing apparatus 1 is an electronic apparatus having at least an image capture function and a display function. The display apparatus 2 is an electronic apparatus having at least a display function. A user, who is a photographer, is provided with the first image capturing apparatus 1A and the second image capturing apparatus 1B as well as the first display apparatus 2A and the second display apparatus 2B, as the electronic apparatuses which are owned by the user himself/herself or authority of use for which the user himself/herself has. For example, the first image capturing apparatus 1A is a digital camera, the second image capturing apparatus 1B is a smartphone, the first display apparatus 2A is a television, and the second display apparatus 2B is a notebook PC.

Each of the first image capturing apparatus 1A and the second image capturing apparatus 1B has a function for holding at least image data of an image captured by its own apparatus in a storage means of its own apparatus. Moreover, each of the first image capturing apparatus 1A and the second image capturing apparatus 1B may have a function for transmitting image data of the image captured by its own apparatus to a server 3 so as to be stored and registered in an image data DB of the server 3. Furthermore, each of the first image capturing apparatus 1A and the second image capturing apparatus 1B may have a function for transmitting the image data of the image captured by its own apparatus to the first display apparatus 2A and the second display apparatus 2B based on a user's operation.

Each of the first display apparatus 2A and the second display apparatus 2B has a function for receiving image data from the image capturing apparatus 1 or the server 3, etc., serving as an external apparatus so as to be input thereto and to be stored in the storage means inside its own apparatus. For example, the first display apparatus 2A receives image data from the first image capturing apparatus 1A and the second display apparatus 2B through communication. For example, the second display apparatus 2B receives image data from the first image capturing apparatus 1A and the second image capturing apparatus 1B through communication. Moreover, the first display apparatus 2A and the second display apparatus 2B have image data display parts. Each image data display part displays an image on a display screen based on image data.

Furthermore, for example, the second display apparatus 2B has an image data editing part. Based on a user's operation relative to the display screen, the image data editing part edits the information and the contents of the image data. As described later, the user can carry out settings relating to a relationship among a plurality of images by the editing process.

The server 3, which is, for example, a server apparatus managed by a service provider, keeps image data from a user's apparatus, and stores the data inside the image data DB. Thus, back-up and a unified management of the image data are achieved. Note that the server 3 and the image data DB may be provided as different apparatuses.

[Image Capturing Apparatus]

Figure 2:
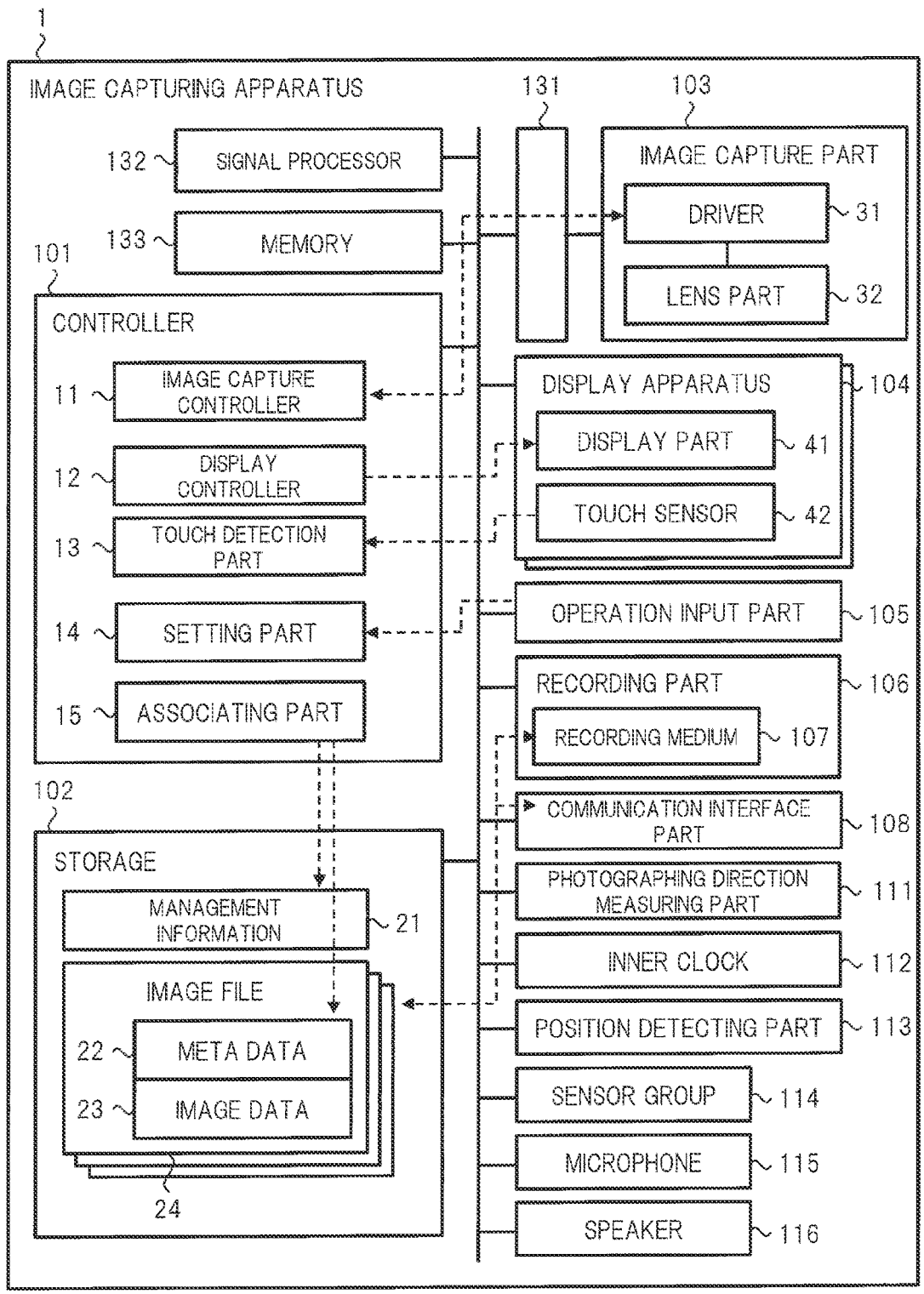
FIG. 2 is a diagram that shows a configuration of the image capturing apparatus of the first embodiment.

FIG. 2 shows a configuration of an image capturing apparatus 1. The image capturing apparatus 1 is constituted by a controller 101, a storage 102, an image capture part 103, a display apparatus 104, an operation input part 105, a recording part 106, a recording medium 107, a communication interface part 108, a photographing direction measuring part 111, an inner clock 112, a position detecting part 113, a sensor group 114, a microphone 115, a speaker 116, an interface circuit part 131, a signal processor 132, a memory 133 and the like. These respective parts are connected to one another through a bus or the like, and cooperate with one another at a high speed based on the control of the controller 101.

The controller 101 controls the entire image capturing apparatus 1. The controller 101 includes control circuits, such as a processor, a ROM, a RAM and the like. The controller 101 is provided with an image capture controller 11, a display controller 12, a touch detection part 13, a setting part 14 and an associating part 15 as processors achieved by processes of the control circuit.

The controller 101 achieves image capture and display by controlling the respective parts such as the image capture part 103 or the like in accordance with operation modes. The operation modes include a photographing mode, a reproducing/displaying mode, or the like. In accordance with the operation modes and states, the controller 101 controls the image capture part 103, the display apparatus 104, the recording part 106 or the like, through the signal processor 132 and the memory 133.

The controller 101 controls settings for a photographing direction, an angle of view, etc., in the image capture based on a user's input operation carried out through the operation input part 105 and the touch sensor 42. In accordance with the capturing of the image through the image capture part 103, the controller 101 forms metadata 22 together with image data 23, and stores them in the storage 102 or records them in the recording medium 107 of the recording part 106 as an image file 24 including the metadata 22 and the image data 23. Moreover, the controller 101 forms and manages management information 21 relating to the image file 24.

Based on the control of the controller 101, the storage 102 stores various pieces of data and information including a plurality of image files 24 and the management information 21. Note that a mode in which the storage 102 is integrated into the controller 101, a mode in which the storage 102 and the recording part 106 are unified as one part, or others may be applicable.

Based on the control from the image capture controller 11, the image capture part 103 captures an image. The image capture part 103 includes a driver 31 and a lens part 32. The driver 31 includes a driving circuit, and drives the image capture element and lenses of the lens part 32, based on the driving control from the image capture controller 11. The lens part 32 includes an optical system composed of a plurality of lenses including lenses in association with an electronic zoom or an optical zoom. For example, the driver 31 carries out a focusing operation in which the focal length is changed by controlling the position of the focusing lens. The lenses of the lens part 32 may have a zoom lens system fixed without the necessity of replacement so as to handle the electronic zoom or an optical lens system which can be replaced so as to be detachable.

The image capture part 103 includes image capture elements such as CMOS, CCD or the like. On the image capture surface of the image capture element, photoelectric conversion elements are two-dimensionally disposed. The image capture part 103 carries out photoelectric conversion for an optical image of an imaged object that enters through the lens part 32 and is formed on the image capture surface of the image capture elements, to form an image capture signal. The image capture part 103 has an AD conversion circuit therein for converting an analog signal to a digital signal, and outputs a digitized image capture signal. In the image capture part 103, a high-speed operation for the auto-focusing process may be achieved by using image capture elements on which phase-difference auto-focusing pixels are disposed, or a high-speed operation for the input/output processes of the image capture signal may be achieved by using a built-in memory. The AD conversion circuit or the like may be provided on the outside of the image capture part 103. The image capture system of the image capture part 103 is not particularly limited.

The display apparatus 104 such as a touch panel includes a display part 41 and a touch sensor 42. The touch panel is a display means as well as an operation input means. The display part 41 includes a display driver, and displays a display screen to a user. The display part 41 is, for example, a liquid crystal display part but may be an organic EL display part or the like. The system of the display part 41 and the system of the touch sensor 42 are not particularly limited. A plurality of the display apparatuses 104 may be provided, or the display apparatus 104 may not include the touch sensor 42. In addition to the touch panel serving as the main display apparatus 104 as a main part, the first embodiment includes a photographing monitor-use display apparatus described later.

The touch sensor 42 is disposed so as to correspond to the region of the display screen of the display part 41, and receives a touch input operation onto the display screen. The touch sensor 42 has, for example, an electrostatic capacitance system, detects a change in electrostatic capacitance due to proximity of a finger, etc., or a touch by a finger, etc., as an electric signal, and outputs this touch detection signal to the touch detection part 13 of the controller 101. The touch panel has, for example, a built-in touch sensor 42 on a liquid crystal panel display part, and a glass protective cover is disposed on the front side, and a back light is disposed on the back side. Note that the display apparatus 104 may be controlled so as to automatically cause a non-display state by turning off the back light based on a non-used state for a certain period of time or the like. The touch panel may have a pressure-sensitive system or the like.

Based on a touch detection signal obtained from the touch sensor 42, the touch detection part 13 detects the presence/absence of a touch and touch position coordinates, etc., on the display screen, and also detects operations, such as a tap, swipe, pinch or the like. The user can carry out various operations, such as an instruction input to the image capturing apparatus 1, an operation for adjusting a focus onto a desired position within the display screen, or the like, by the touch input operations to the display screen of the touch panel.

In accordance with an operation mode, the interface circuit part 131 transfers a driving control signal from the controller 101 to the image capture part 103 based on the control of the controller 101. Moreover, based on the control, the interface circuit part 131 outputs an image capture signal from the image capture part 103 to the signal processor 132 or the memory 133. Note that a mode in which a plurality of the image capture parts 103 are connected to the interface circuit part 131 may be used.

The signal processor 132, which includes an image/audio signal processing circuit and a coding/decoding circuit, has functions for carrying out various signal processings, such as an image signal processing, an audio signal processing, a coding processing and a decoding processing, in accordance with the control of the controller 101. The signal processings of the signal processor 132 include signal processing relative to an image capture signal from the image capture part 103, signal processing relative to the image data 23 and signal processing at the time of displaying an image on the display apparatus 104. By these signal processings, the signal processor 132 generates recording-use or display-use image signals. These image signals include still images and motion images of the image data 23.

The signal processor 132 carries out signal processings, such as a filtering process, an amplifying process in response to sensitivity setting, a white balance correcting process, or the like, to the image capture signal. At the time of, for example, recording the image data 23 into the recording medium 107 as the image file 24, the signal processor 132 carries out a coding process in a predetermined format for this purpose to original data. This coding process includes a data compressing process. At the time of reading the image data 23 or the like from the recording medium 107, the signal processor 132 carries out a corresponding decoding process so as to restore the data into the original data. At the time of reproducing/displaying an image on the display apparatus 104 based on the image data 23, the signal processor 132 carries out signal processing for this purpose. The signal processor 132 carries out audio signal processing on an audio input signal from the microphone 115 and an audio output signal to the speaker 116.

The memory 133 is used as a buffer memory at the time of signal processing by the signal processor 132, and various signals and pieces of data are stored therein. The memory 133 is constituted by, for example, DRAM, flash memory or the like.

The operation input part 105 includes various hardware buttons or the like allowing the user to carry out input operations. Through the operation input part 105, the user can input an instruction so that angle-of-view related information or the like can be set to the setting part 14.

The setting part 14 receives settings to be input by the user through the operation input part 105 and the touch panel, and sets information related to photographing and displaying. To the setting part 14, electronic zooming magnification, focal length, angle of view and the like relating to the lenses of the image capture part 103 can be set as setting information relating to photographing. The image capture controller 11 drives and controls the image capture part 103 so as to automatically adjust the angle of view or the like based on the setting information of the setting part 14.

The recording part 106 includes a recording/reproducing circuit or the like, and is provided detachably with the recording medium 107. The recording medium 107 is, for example, an SD card. The recording part 106 records the image file 24 including the image data 23 of the storage 102, the memory 133 or the like into the recording medium 107 based on control of the controller 101. The recording part 106 reads out the image file 24 from the recording medium 107 and stores it in the storage 102, the memory 133 or the like based on control of the controller 101. The user can detach, and then, carry or replace the recording medium 107. Note that audio data together with the image data 23 may be included in the image file 24.

The communication interface part 108 includes a wireless communication interface part. Based on control of the controller 101, the communication interface part 108 is connected to the communication network 4 through a wireless access point or the like, and carries out communication processing to and from an external apparatus. For example, as shown in FIG. 1, the image capturing apparatus 1 communicates with the server 3, the display apparatus 2 or a different image capturing apparatus 1 through the communication network 4 so as to transmit the image file 24 of its own apparatus or receive the image file 24 from an external apparatus. At this time, the communication interface part 108 transfers communication data of the image file 24. The communication interface part 108 may be provided with a telephone network communication function, a LAN communication function, a near-field communication function, or the like.

A photographing direction measuring part 111, which includes sensors, such as an electronic compass, a gyro sensor, an accelerator sensor and the like, measures the photographing direction of the image capturing apparatus 1 by using them, and outputs the information of the photographing direction to the controller 101. The photographing direction measuring part 111 measures the azimuth angle and elevation angle as the photographing direction. Moreover, the photographing direction measuring part 111 detects a rotation angle indicating the tilt of the image at the time of photographing based on detection of an orientation of the image capturing apparatus 1. The rotation angle of the image is represented by an angle made by a lateral line and a longitudinal line of a rectangular shape of the image relative to a horizontal direction and a vertical direction.

The inner clock 112 measures the current date and time. Thus, the controller 101 can obtain the photographing date and time. The position detecting part 113 includes a GPS receiving part, and detects the position of the image capturing apparatus 1 by using a signal from a satellite. The position detecting part 113 detects {latitude, longitude, altitude (height from the sea level)} as positional information. The altitude may be omitted. The sensor group 114 is another sensor group, and, for example, a proximity sensor and a light intensity sensor are listed. The microphone 115 is an audio input apparatus, and the speaker 116 is an audio output apparatus.

The image capture controller 11 controls the image capture part 103 or the like at the time of imaging in accordance with the operation mode of the image capturing apparatus 1 so as to capture an image, and obtains image data 23. The image capture controller 11 stores the image data 23 in the storage 102 or the like as the image file 24. The image capture part 103 and the image capture controller 11 have functions capable of capturing both a wide angle image and a narrow angle image. The image capture controller 11 carries out zooming control relative to the optical system of the image capture part 103. The zooming control is control for the electronic zoom or the optical zoom. The image capture controller 11 recognizes and adjusts the electronic zooming magnification, the focal length, the angle of view and the like relating to the lenses of the image capture part 103, based on the setting information such as the angle-of-view related information, etc., of the setting part 14.

When optical lenses are replaceable among those having different focal lengths or the like in the image capture part 103, for example, the user replaces lenses to an optical lens having a relatively large focal length at the time of capturing a narrow angle image, and also replaces lenses to an optical lens having a relatively small focal length at the time of capturing a wide angle image. When the user replaces the lenses of the image capture part 103, the setting part 14 may automatically detect the replacement, and also detect the focal length or the like of the lens after the replacement. Alternatively, after the replacement, the user may input and set the focal length or the like of the lens after the replacement onto the setting part 14. Moreover, the image capture controller 11 acquires the setting information after the update from the setting part 14 so as to recognize the focal length or the like.

The display controller 12 controls the display part 41 or the like of the display apparatus 104 so as to display an image and information on the display screen of the display part 41. Based on the management information 21 and the image file 24, the display controller 12 displays folder information and an image on the display screen. The display controller 12 provides various screens forming graphical user interfaces to the user. The display controller 12 controls switching of the screens in accordance with a display mode described later. The display controller 12 also provides a menu screen, a setting screen or the like.

In cooperation with the image capture controller 11 and the display controller 12, the associating part 15 carries out an associating process in which a plurality of images having a predetermined relationship are associated with one another. The associating part 15 carries out the associating process at a predetermined timing and trigger at the time of imaging, the time of reproducing/displaying, or the like, in accordance with an associating system described later. The associating part 15 carries out determination for the associating process aiming at the plural image data 23 of the storage 102 or the like, as a first process in the associating processes. In the determination of the first process, an image becoming a candidate for the associating process is selected based on a condition such as a photographing place or the like, in accordance with a selection system described later. As a second process, the associating part 15 determines a first image and a second image to be associated with each other among the plurality of images becoming the candidates for the associating process based on conditions in the photographing direction and the angle of view. As a result of determination, the associating part 15 forms the metadata 22 or the management information 21 so as to associate the first image with the second image.

Upon reproducing/displaying images, the display controller 12 specifies the first image and the second image having a predetermined relationship based on the determination results of the associating part 15 or reference confirmation of the metadata 22 or the management information 21 of the image file 24 whose images have been associated with one another, and displays a plurality of images including these first image and second image on the display screen so as to be associated thereto.

As hardware configurations of the respective processors such as the controller 101 and the signal processor 132 of the image capturing apparatus 1 and the respective functions, note that a mode in which each of the respective processors and the respective functions may be provided as a circuit such as an individual LSI may be used, or another mode in which they are provided as a circuit such as one unified LSI or the like may be used.

[Display Apparatus]

Figure 3:
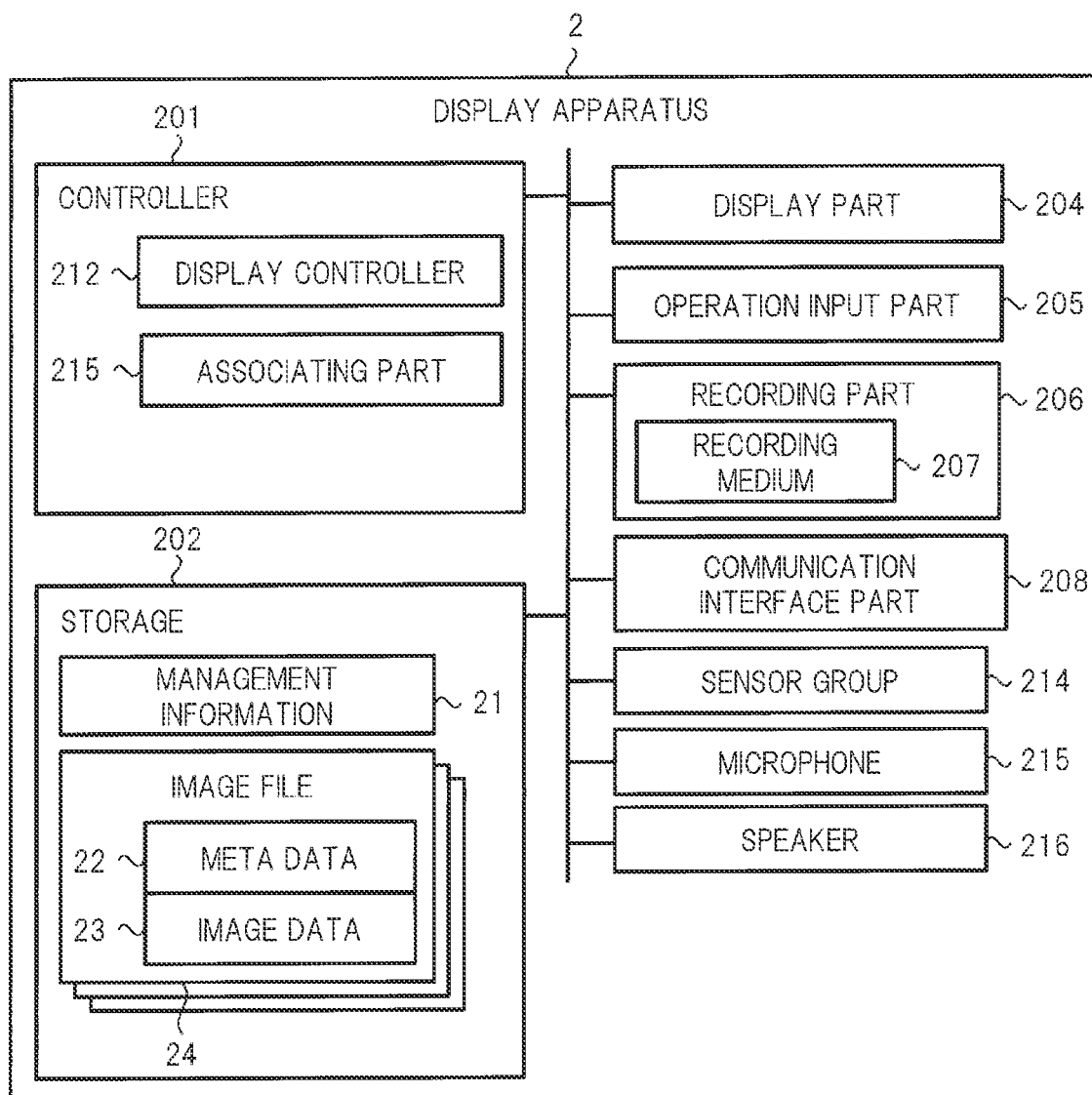
FIG. 3 is a diagram that shows a configuration of the display apparatus of the first embodiment.

FIG. 3 shows a configuration of the display apparatus 2. In the display apparatus 2, a mainly different configuration from that of the image capturing apparatus 1 is no processor relating to the image capture part 103 and the image capture. Explanation for the same components of constituting components of the display apparatus 2 as those of the image capturing apparatus 1 will be omitted. The display apparatus 2 is provided with a controller 201, a storage 202, a display part 204, an operation input part 205, a recording part 206, a recording medium 207, a communication interface part 208, a sensor group 214, a microphone 215, a speaker 216 and the like. These respective parts are connected to one another through a bus or the like, and are cooperated with one another at a high speed based on the control of the controller 201.

The controller 201 controls the entire display apparatus 2. The controller 201 includes control circuits, such as a processor, a ROM, a RAM and the like. The controller 201 is provided with a display controller 212 and an associating part 215 as processors achieved by processes of the control circuit. The controller 201 controls the display on a display screen of the display part 204 based on user's input operations given through the operation input part 205.

Based on the control of the controller 201, the storage 202 stores various pieces of data and information including plural image files 24 and the management information 21. The image files 24 and the management information 21 may be generated by its own apparatus, or may be acquired from an external apparatus.

The display part 204 includes a display driver, and displays the display screen to the user. The display part 204 may be prepared as a touch panel.

The operation input part 205 includes various hardware buttons or the like allowing the user to carry out input operations. The operation input part 205 may have a remote controller and a remote controlled light receiving part. Through the operation input part 205, the user can input an instruction and carry out user settings.

The recording part 206 includes a recording/reproducing circuit or the like, and the recording medium 207 is detachably provided thereto. The recording part 206 records the image file 24 including the image data 23 of the storage 202 or a memory, etc., into the recording medium 207 based on control of the controller 201. Based on control of the controller 201, the recording part 206 reads out the image file 24 from the recording medium 207 and stores it on the storage 202 or the memory, etc. The user can detach, and then, carry or replace the recording medium 207.

Based on control of the controller 201, the communication interface part 208 is connected to the communication network 4, and carries out communication processing to and from an external apparatus. For example, as shown in FIG. 1, the display apparatus 2 communicates with the server 3, the image capturing apparatus 1 or a different display apparatus 2 through the communication network 4 so as to transmit the image file 24 of its own apparatus or receive the image file 24 from an external apparatus. At this time, the communication interface part 208 transfers communication data of the image file 24.

The display controller 212 controls the display part 204 or the like so as to display an image and information on the display screen of the display part 204. Based on the management information 21 and the image file 24, the display controller 212 reproduces and displays folder information and an image on the display screen of the display part 204. The display controller 212 provides various screens forming graphical user interfaces to the user. The display controller 212 controls switching of the screens in accordance with a display mode described later.

In cooperation with the display controller 212, the associating part 215 carries out an associating process in which a plurality of images having a predetermined relationship are associated with one another. The associating part 215 may also carry out the associating process aiming at the image file 24 acquired from an external apparatus. The associating process of the associating part 215 is the same as the associating process of the associating part 15. As a result of determination, in association of the first image with the second image, the associating part 215 writes the associating information onto the metadata 22 or the management information 21 of the image file 24 of the first image and the second image.

Upon reproducing/displaying images, the display controller 212 specifies the first image and the second image having a predetermined relationship based on the determination results of the associating part 215 or reference confirmation of the metadata 22 or the management information 21 of the image file 24 whose images have been associated with one another, and displays a plurality of images including these first image and second image on the display screen so as to be associated thereto.

Hereinafter, the image capturing apparatus 1 will be mainly explained. However, functions and operations other than those relating to the image capture can be similarly achieved when the display apparatus 2 is used as the main body.

[Image Capturing Apparatus—Appearance]

Figure 4:
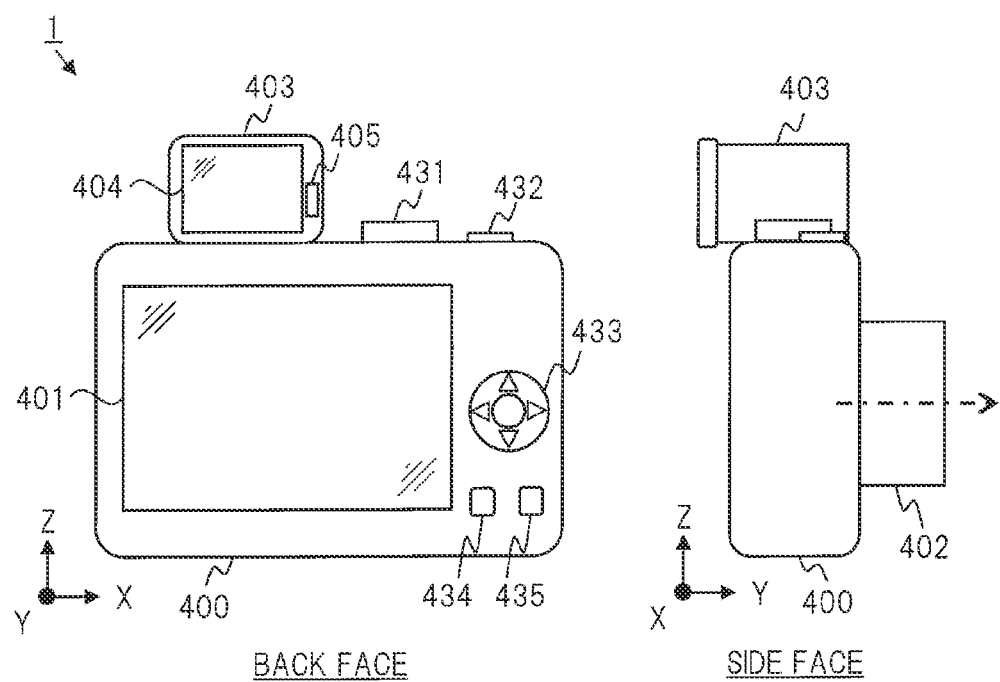
FIG. 4 is a diagram that shows an appearance of the image capturing apparatus of the first embodiment.

FIG. 4 shows a configuration example of an appearance of the image capturing apparatus 1. A left side of FIG. 4 shows a configuration viewed from a back surface of a housing 400 of the image capturing apparatus 1, and a right side thereof shows a configuration viewed from a right side face of the housing 400. The back surface refers to a surface on which the display screen 401 of the display part 41 is formed, and the front surface refers to another surface on which the lens 402 of the image capture part 103 is formed.

On the configuration of the side face, a lens 402 of the lens part 32 is disposed in the center position of the front face of the housing 400. Moreover, onto the main housing 400, an electronic viewing finder (EVF) 403 is formed so as to, for example, protrude upward. The EVF 403 is one of the display apparatuses 104.

In the configuration of the back surface, a display screen 401 having a rectangular shape corresponding to the above-described touch panel is disposed so that the information display and the touch input operation can be carried out. Moreover, the EVF 403 has a display screen 404 and a proximity sensor 405. The EVF 403 displays an image of an imaged object as a photographing monitoring image based on a signal input through the lens and the image capture elements at the time of photographing. The user can carry out the photographing process while checking the photographing monitoring image of the EVF 403. On the display screen 404, information such as a diaphragm value or the like may be displayed so as to be overlapped. The proximity sensor 405 detects a proximity state of the object. The proximity sensor 405 is prepared as an electrostatic capacitance system, an optical system or the like. For example, the controller 101 determines the presence/absence of the use of the EVF 403 by the user, by detecting the presence/absence of the proximity state through the proximity sensor 405. Depending on the determination, the controller 101 automatically switches the display on the display screen 401 and the display of the photographing monitoring image on the display screen 404 of the EVF 403. Note that the present invention is not limited to the mode with the EVF 403, and an optical finder may be provided. Moreover, another mode in which the photographing monitoring image is displayed on the display screen 401 may be set.

The housing 400 is provided with a mode setting dial 431, a shutter button 432, a cross-shaped (directional) key 433, a reproducing/displaying mode button 434, a power supply button 435 and the like as the operation input part 105. The cross-shaped key 433 includes top and bottom buttons, right and left buttons and a center button that can be used for selection, determination, cancelation, etc., of information at a desired position within the display screen 401. In the display screen 401, based on a predetermined input operation, a menu display can be shown.

The mode setting dial 431 is used for setting operation modes. The shutter button 432 is pushed down at the time of photographing. The reproducing/displaying mode button 434 is used when an image is reproduced and displayed on the display screen 401, and can also be used for switching the display modes. The power supply button 435 is used for turning ON/OFF of the power supply or the like. The user can display the photographing monitoring image on the display screen 401 or the display screen 404 so that various input operations such as focus adjustment by touch at a desired position can be carried out.

[Image Capturing Apparatus—Operation Mode]

As the operation modes of the image capturing apparatus 1, a photographing mode, a reproducing/displaying mode, etc. are provided. The outline of operations of the photographing mode is described below. When the user pushes the power supply button 435 so as to bring the power supply ON state, a normal photographing mode is activated. In accordance with the normal photographing mode, the controller 101 drives and controls the image capture part 103 or the like. In the normal photographing mode, a still image and a motion image can be photographed as images. Upon photographing, the controller 101 reads out a photographing signal from the image capture part 103 at a predetermined cycle, and carries out a predetermined signal processing at the signal processor 132 through the interface circuit part 131 so that the signal is converted to an image signal with a display-use format. Moreover, based on the image signal, the controller 101 displays a photographing monitoring image on the display screen 401 of the touch panel of the display apparatus 104 or the display screen 404 of the EVF 403 in real time. While checking the photographing monitoring image on the display screen 401 or the display screen 404, the user carries out the photographing as described below.

The user sets the angle-of-view related information or the like as photographing conditions onto the setting part 14 through the operation input part 105. In the case of photographing a still image, the user pushes down the shutter button 432. The image capture controller 11 detects the pushing down of the shutter button 432, and determines the diaphragm value, the shutter speed, the focus and the like in accordance with the set photographing conditions. The shutter button 432 has, for example, a half push state and a full push state. The imaging controller 11 carries out control so as to set the focus or the like at the time of the half push state, and also to start the imaging process at the time of the full push state.

The imaging signal of a still image captured by the image capture part 103 is subjected to a predetermined signal processing for use in still images by the use of the signal processor 132 and the memory 133. As its coding system at this time, for example, JPEG is adopted. However, as other systems, MPEG or high image quality RAW system, or the like, may be adopted. The image file 24 corresponding to the coded still image data is recorded in, for example, the recording medium 107 by using the recording part 106.

At the time of photographing a motion image, the user pushes down a motion image photographing button to start photographing the motion image, and again pushes down the motion image photographing button to stop the motion image photographing process. An imaging signal of the motion image is subjected to a signal processing in a predetermined system for the motion image. As its system, for example, MPEG system such as H264 and H265 or other systems may be adopted. The coded motion data is similarly recorded in, for example, the recording medium 107.

The operation outline of the reproducing/displaying mode is described below. When the controller 101 detects that the reproducing/displaying mode is set through the reproducing/displaying mode button 434, the controller 101 reads out the image file 24 from the recording medium 107 of the recording part 106, and stores the data in the storage 102. The display controller 12 restores the original data of the image from the image data 23 by using a decoding process using the signal processor 132, and generates the image data for displaying the image or the like on the display screen. The display controller 12 controls the display apparatus 104 based on the image data so that the image or the like is displayed on the display screen.

[Management Information and Image File]

FIG. 5 shows a configuration example of the management information 21 and the image file 24 of the storage 102. The management information 21 includes image file management information and associating management information. The image file management information is information managed by a publicly-known file system, and includes information such as a file name, update date and time, a type, a size or the like. The associating management information is unique information formed so as to manage the relationship among a plurality of images. The associating management information includes, for example, a type identifier, a reference identifier, and a setting character string.

The type identifier is an identifier for identifying the type of the image for each image file 24. The types of images include two types such as a wide angle image and a narrow angle image. The reference identifier is an identifier for reference to an associated state among a plurality of images. For example, when there are a first image and a second image that is made associated therewith, the reference identifier corresponds to a file name of the image file 24 of the second image that is a reference destination as a reference identifier included in the first image. Moreover, as a reference identifier included in the second image, the reference identifier corresponds to a file name of the image file 24 of the first image that is a reference source. Although described later, the set character string is a character string that can be optionally set by the user based on the user operation. Upon editing an image and carrying out managing operations thereon, the user can set a character string representing, for example, the photographing place to the image. Note that the set character string is formed inside the associating management information. However, the set character string may be formed inside the metadata 22.

The image file 24 includes the metadata 22 and the image data 23. A header part of the image file 24 has the metadata 22, and a body part thereof has the image data 23. The image data 23 is data of a still image or a motion image, and is coded data in the case of recording-use. The metadata 22 is data for managing information including various attribute values relating to the image data 23. In other words, the metadata 22 corresponds to additional information and attribute information. As information items, the metadata 22 includes the photographing date and time, the photographing place, a model type, a resolution, the photographing direction, the angle of view, the angle-of-view related information, a rotation angle, and a thumbnail.

The photographing date and time are, for example, year, month, date, hours, minutes and seconds. The photographing place includes positional information or set character string. The positional information includes positional coordinates {latitude, longitude, and altitude} detected by the position detecting part 113. The set character string is a character string representing the photographing place set by the user. The model type is information uniquely representing the type of the image capturing apparatus 1. The model type may include a type of a lens or the like. The resolution represents the resolution of the image of the image data 23.

The photographing direction is information including an azimuth angle (represented by θ) and an elevation angle (represented by φ). The angle of view is information including a horizontal angle of view (represented by Ah) and a vertical angle of view (represented by Av). The angle-of-view related information is information such as an electron zooming magnification (represented by n), a focal length (represented by f), and a dimension of an image capture surface of an image capture element, etc. The dimension includes {horizontal size sw, vertical size sh, and diagonal angle size sd}. Note that the metadata 22 may have a system with only either the angle of view item or the angle-of-view related information item.

In other words, the rotation angle corresponds to rotation around an optical axis of a lens at the time of photographing, and is an angle representing the rotation of the image at the time of photographing. For example, the rotation angle corresponds to the angle and direction based on a state where the lateral direction of the housing 400 is made coincident with the horizontal surface as shown in FIG. 4.

The thumbnail is a shrunk image based on the original data of the image. The thumbnail is constituted in accordance with the resolution and the type of the image or the like, and is recorded so as to be coded or not coded. When the thumbnail is previously formed and held, the thumbnail can be displayed at a high speed at the time of reproducing/displaying. As the thumbnail, a plurality of types of thumbnails with different resolutions or the like may be formed and held. The thumbnail may be eliminated, or may be managed separately from the metadata 22. The display controller 12 may form and display the thumbnail every reproducing and displaying.

Note that the metadata 22 has an expanded system based on a predetermined system such as Exif (Exchangeable image file format) but is not limited to this. The Exif is a system for use in pictures of a digital camera. In the Exif, the model type and the photographing condition information are embedded in the image data as the metadata. Software for use in image displaying and image editing can refer to this metadata, and the user can edit the information of the metadata. The metadata of the image file of the Exif in the related art includes no information such as the angle of view or the like. In the first embodiment, as an expanded system, items such as the angle of view and the angle-of-view related information are prepared in the metadata 22 as unique information items.

The metadata 22 is formed and managed as the header part of the image file 24 and managed. However, separately from the image data file, it may be formed and managed as a metadata file. Moreover, the present invention is not limited to the mode of management on the unique information by using the metadata, but also applicable to another mode of collective management on the same information in the management information 21. In the case of a motion image, note that various pieces of information such as the metadata 22 may be written for, for example, each of image frames having a predetermined time interval therebetween. The time interval may be constant, or may be generated only when the angle of view or the like changes.

[Management of Relationship Among Plurality of Images]

Figure 6:
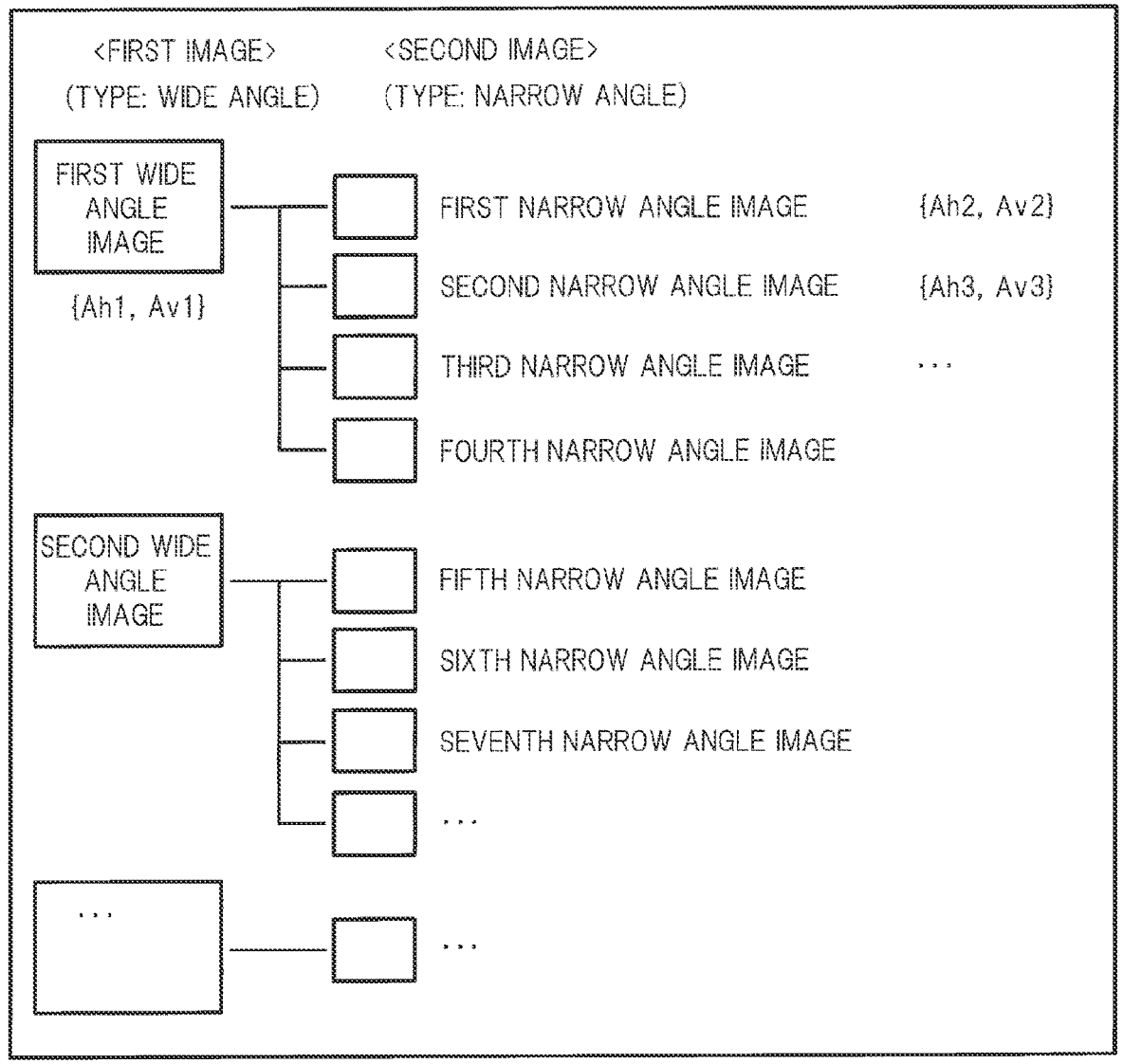
FIG. 6 is a diagram that shows managements of a relationship among a plurality of images in the image capturing apparatus of the first embodiment.

FIG. 6 shows associating managements relating to a relationship among the plurality of images. For example, in the associating management information of the management information 21 of FIG. 5, the controller 101 manages a relationship shown in FIG. 6. In FIG. 6, the type of the first image is the wide angle, and the type of the second image is the narrow angle. The present example includes a first wide angle image, a second wide angle image and the like as the first image, and a first narrow angle image, a second narrow angle image and the like as the second image. For example, a plurality of second images, such as the first narrow angle image, the second narrow angle image and the third narrow angle image, etc., are associated with the first wide angle image. In the associating information, for example, an image filename of the first narrow angle image or the like is included as the reference identifier included in an image file of the first wide angle image. Moreover, an image file name of the first wide angle image is included as the reference identifier included in an image file of the first narrow angle image. Thus, the images having the relationship can refer to one another.

As one display mode, note that information showing the relationship among the plurality of images as shown in FIG. 6 may be displayed on the display screen. At this time, as shown in FIG. 6, the first image and the second image may be displayed in a tree structure, or may be displayed while the node of the second image is connected to the periphery of the node of the first image by a link line although not illustrated.

In the first embodiment, as the type of the image, a wide angle and a narrow angle relating to the angle of view are distinguished from each other. In the image capturing apparatus 1, the angle of view is classified by using an absolute value based on a threshold value. As the threshold value relating to the angle of view, a first angle of view is set. When the angle of view of the captured image is the first angle of view or larger, the controller 101 sets a wide angle image as its type. When it is smaller than the first angle of view, it sets a narrow angle image as its type. The present invention is not limited to this, and three or more types may be set as the type of the angle of view.

[Photographing Direction and Angle of View of Image]

Figure 7:
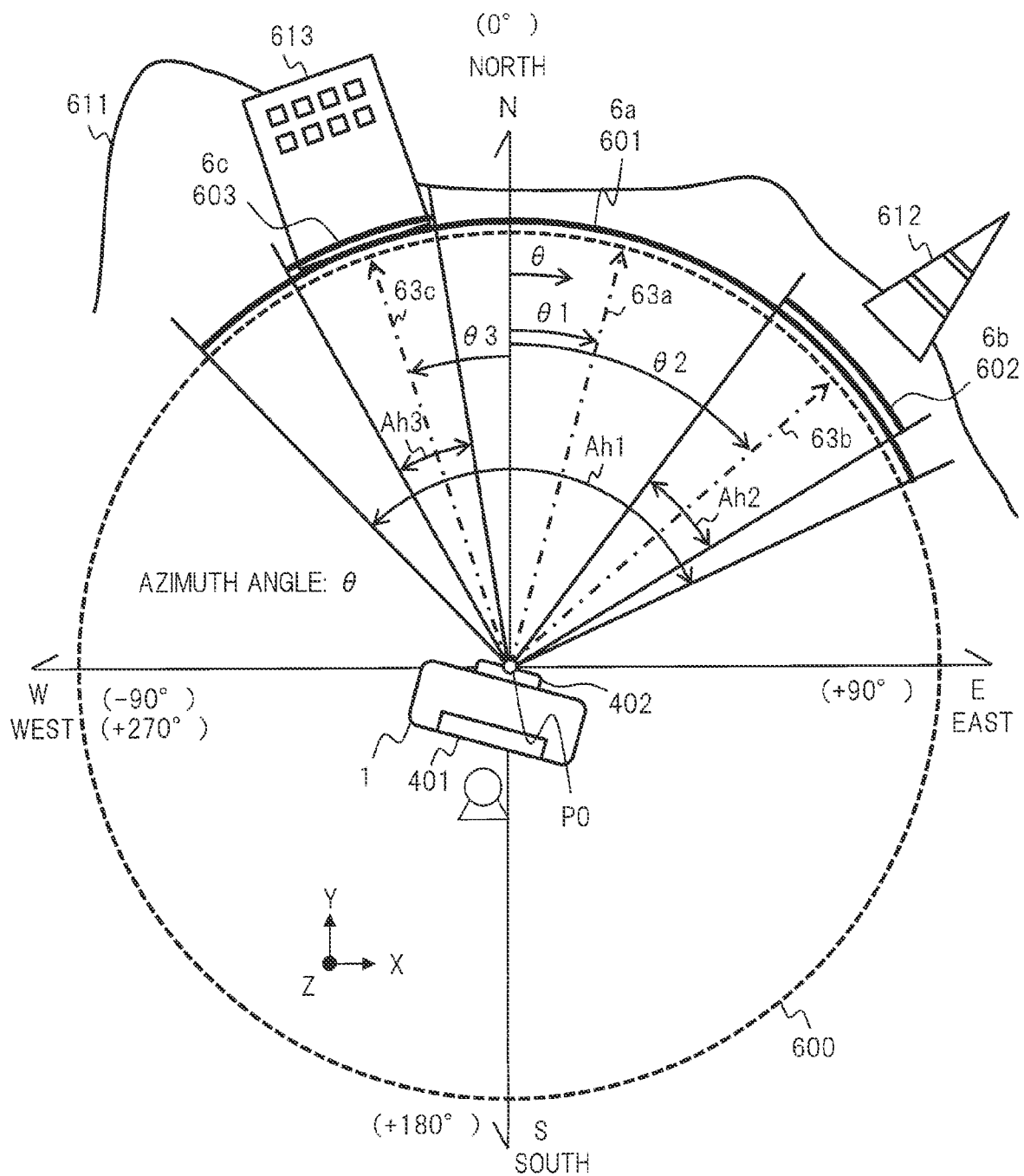
FIG. 7 is an explanatory diagram that shows a photographing direction and an angle of view, particularly, azimuth angle and horizontal angle of view relating to a plurality of images in the image capturing apparatus of the first embodiment.

FIG. 7 is an explanatory diagram that briefly shows a concept relating to a relationship between the photographing direction and the angle of view for the wide angle image and the narrow angle image that are the plurality of images used as a specific example in the image capturing apparatus 1 of the first embodiment. In FIG. 7, the azimuth angle and the horizontal angle of view are particularly shown.

A wide angle image 6a serving as a first image as well as a first narrow angle image 6b and a second narrow angle image 6c serving as the second images are prepared. It is supposed that these images were photographed at point PO that is the same photographing place by the user using the image capturing apparatus 1. It is supposed that the respective images were photographed in the order of the wide angle image 6a, the first narrow angle image 6b and the second narrow angle image 6c at date and time close to one another. It is supposed that, as the photographing date and time of the respective images, for example, the wide angle image 6a was photographed at 1:11:30 pm on Jan. 5, 2016, the first narrow angle image 6b was photographed at 1:14:40 pm on the same date, and the second narrow angle image 6c was photographed at 1:15:50 pm on the same date.

The wide angle image 6a has a photographing direction 63a indicated by an azimuth angle θ1 and a photographing range 601 corresponding to a horizontal angle of view Ah1. The first narrow angle image 6b has a photographing direction 63b indicated by an azimuth angle θ2 and a photographing range 602 corresponding to a horizontal angle of view Ah2. The second narrow angle image 6c has a photographing direction 63c indicated by an azimuth angle θ3 and a photographing range 603 corresponding to a horizontal angle of view Ah3. In FIG. 7, a photographing direction defined by an azimuth angle θ among the photographing directions of the image is shown by a one-dot chain line.

A point PO particularly indicates a center point of a lens 402 of the image capture part 103. A sphere 600 represents a spherical surface of an entire celestial sphere, which corresponds to a virtual sphere in which a point at infinity is mapped. The sphere 600 particularly shows a circumference portion corresponding to the azimuth angle θ and an X-Y plane. A symbol "N" represents north, a symbol "E" represents east, a symbol "S" represents south, and a symbol "W" represents west. The X direction corresponds to eastward, the Y direction corresponds to northward, and the Z direction corresponds to a zenithal direction. When it is supposed that a clockwise direction is a positive direction while N is 0° as reference, the azimuth angle θ is represented so that E is +90°, S is +180° and W is +270° (−90°).

A photographing range 601 indicated by an arch on the sphere 600 represents a portion corresponding to the horizontal angle of view Ah1 of the wide angle image 6a, and this also corresponds to a region projected onto the sphere 600 viewed from point PG. The present example schematically shows a case having a mountain 611, the sky, a tower 612 and a building 613, etc., as scenery projected as the wide angle image 6a on the sphere 600. The first narrow angle image 6b shows an example in which the tower 612 was photographed, and the second narrow angle image 6c shows an example in which the building 613 was photographed.

Specific value examples of the azimuth angle θ, the elevation angle φ, the horizontal angle of view Ah and the vertical angle of view Av of each image are shown below. The wide angle image 6a is supposed to have an azimuth angle θ1, an elevation angle φ1, a horizontal angle of view Ah1 and a vertical angle of view Av1, the first narrow angle image 6b is supposed to have an azimuth angle θ2, an elevation angle φ2, a horizontal angle of view Ah2 and a vertical angle of view Av2, and the second narrow angle image 6c is supposed to have an azimuth angle θ3, an elevation angle φ3, a horizontal angle of view Ah3 and a vertical angle of view Av3.

$$\theta1 = +10°, \phi1 = 0°, Ah1 = 120°, Av1 = 80°$$

$$\theta2 = +45°, \phi2 = 0°, Ah2 = 21°, Av2 = 14°$$

$$\theta3 = -20°, \phi3 = -10°, Ah3 = 21°, Av3 = 14°$$

Figure 8:
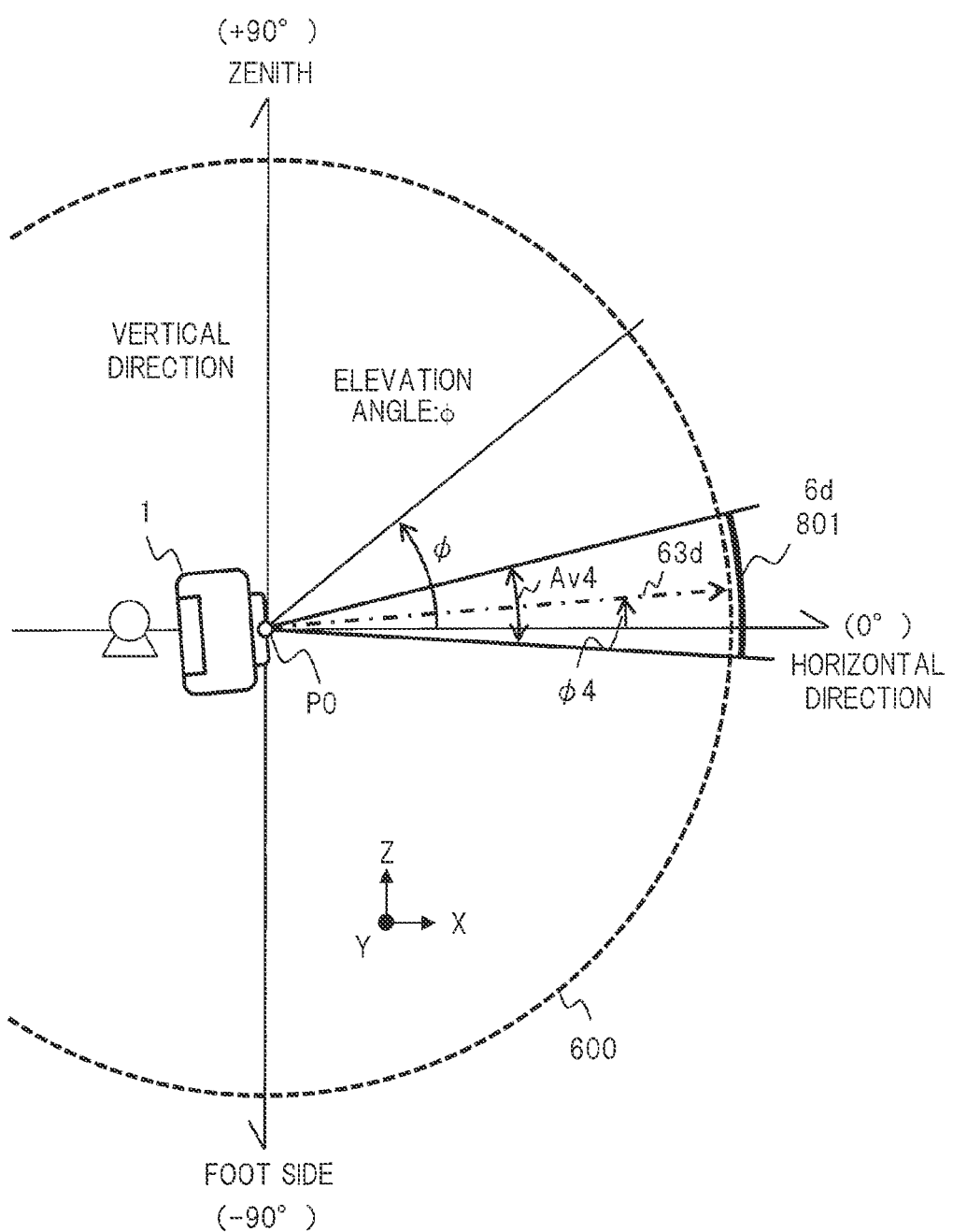
FIG. 8 is an explanatory diagram that shows, particularly, elevation angle and vertical angle of view in the image capturing apparatus of the first embodiment.

As similar to FIG. 7, FIG. 8 is an explanatory diagram that particularly shows the elevation angle φ and the vertical angle of view Av. In FIG. 8, another narrow angle image 6d is exemplified. In FIG. 8, the X direction corresponds to a horizontal direction, and the Z direction corresponds to a vertical direction. A positive direction in the Z direction corresponds to a head, that is, zenithal direction, and a negative direction corresponds to a foot direction. The elevation angle φ is supposed to be +90° in the zenithal direction serving as the Z direction and to be −90° in the foot direction when the horizontal direction is set to 0° as reference. The drawing shows a photographing range 801 corresponding to the vertical angle of view Av4 in the narrow angle image 6d. The photographing direction 63d of the narrow angle image 6d is shown as a portion corresponding to the elevation angle φ4.

[Angle of View and Angle-of-View Related Information]

Figure 9:
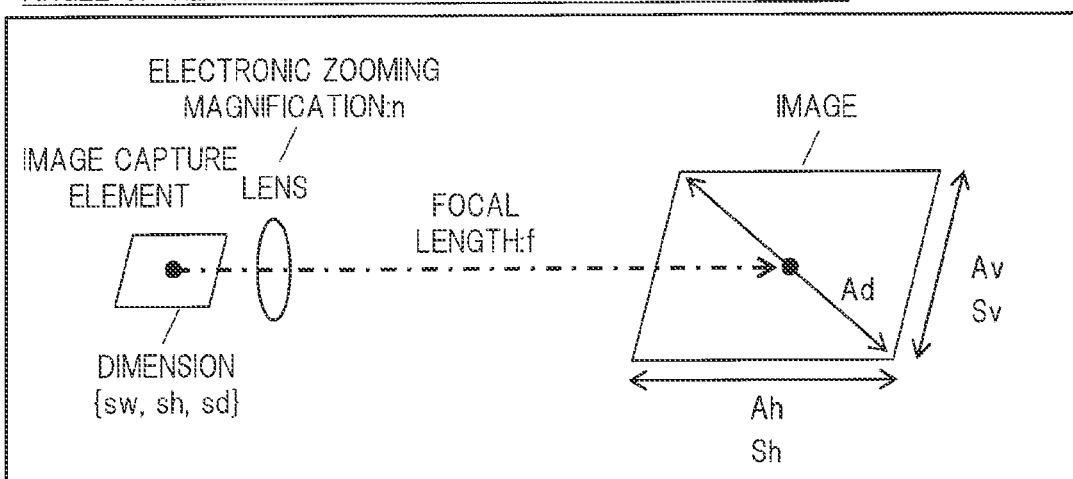
FIG. 9 is an explanatory diagram that shows angle-of-view related information in the image capturing apparatus of the first embodiment.

FIG. 9 briefly shows the angle of view and the angle-of-view related information. Moreover, FIG. 9 shows a case in which the angle of view and the angle-of-view related information are stored in the setting part 14 as the set information. As the angle of view of an image, {horizontal angle of view Ah, vertical angle of view Av} are shown. Moreover, the horizontal size Sh corresponding to the horizontal angle of view Ah in the image and the vertical size Sv corresponding to the vertical angle of view Av therein are shown. The horizontal size Sh is a size from the right end to the left end in the horizontal direction within the image frame. The vertical size Sv is a size from the upper end to the lower end in the vertical direction within the image frame. In the first embodiment, note that the horizontal angle of view Ah and the vertical angle of view Av are used. However, the present invention is not limited to them, and at least one of angles of view including a diagonal angle of view Ad may be used.

As the angle-of-view related information, the focal length "f" of the lens formed in consideration of the optical zooming, the electron zooming magnification "n", the dimensions of the image capture surface of the image capture element {horizontal size "sw", vertical size "sh", diagonal size "sd"} are used. In place of the dimension, the model type may be used. The focal length f is a 35-mm equivalent focal length.

The angle of view can be obtained by a calculation using the angle-of-view related information based on a relational expression. When there is sufficient angle-of-view related information for calculating the angle of view, the controller 101 may calculate and obtain the angle of view from the angle-of-view related information. The angle of view can be calculated by using, for example, the dimension of the image capture element, the focal length f and the electron zooming magnification n. For example, by using the information such as the 35-mm equivalent focal length or the dimension of the image capture element, etc., the angle of view can be calculated from a relational expression that is uniquely defined as "arctan (arc tangent)".

The calculation for the angle of view from the angle-of-view related information is as follows. The image capture controller 11 refers to the angle-of-view related information relating to the image. The image capture controller 11 can recognize the angle-of-view related information from the set information of the above-described setting part 14 or from the information written in the metadata 22 or management information 21. The angle of view {horizontal angle of view Ah, vertical angle of view Av, diagonal angle of view Ad} can be calculated, based on, for example, the following expression.

$$Ah = 2 \times \arctan(sw/(2 \times n \times f)) \quad (1)$$

$$Av = 2 \times \arctan(sh/(2 \times n \times f)) \quad (2)$$

$$Ad = 2 \times \arctan(sd/(2 \times n \times f)) \quad (3)$$

Note that the focal length f is normally represented to be 35-mm equivalent. This equivalently satisfies the above-described expression when the dimension of the image capture element is a 35-mm format {sw=35 mm, sh=24 mm}.

For example, when the electron zooming magnification n, the focal length f and the dimensions {horizontal size sw, vertical size sh} are given, the horizontal angle of view Ah1 and the vertical angle of view Av1 are determined. The controller 101 writes the information on the angle of view into the angle-of-view item of the metadata 22 or the management information 21. Moreover, since the angle of view can be calculated from the angle-of-view related information, the image capturing apparatus 1 may store the above-described angle-of-view related information as one of the metadata 22 or the like, in place of storing the above-described angle of view. Furthermore, since the dimension of the image capture element of the angle-of-view related information or the like can be recognized from the model type, the image capturing apparatus 1 may store the model type as one of the metadata 22 or the like, in place of the dimension of the image capture element or the like. For example, the image capturing apparatus 1 previously stores information indicating the corresponding relationship between the model type and the angle-of-view related information. Alternatively, the image capturing apparatus 1 can refer to information representing the corresponding relationship from an external apparatus through communication. Based on such information, the image capturing apparatus 1 can obtain the angle-of-view related information from the model type.

[Storage of Angle of View, Etc.]

Upon capturing an image, the image capturing apparatus 1 forms information including the photographing date and time, the photographing direction {azimuth angle θ, elevation angle φ}, the angle of view {horizontal angle of view Ah, vertical angle of view Av}, etc. The image capture controller 11 obtains the photographing date and time by using the inner clock 112. The image capture controller 11 obtains the positional information {latitude, longitude, altitude} by using the positional detection part 113. The image capture controller 11 obtains the photographing direction {azimuth angle θ, elevation angle φ} by using the photographing direction measuring part 111. The image capture controller 11 obtains the angle of view {horizontal angle of view Ah and vertical angle of view Av} by using the setting information of the setting part 14 or calculations. Moreover, the image capturing apparatus 1 writes these pieces of information into the corresponding items of the metadata 22 of FIG. 5 so as to be formed as the image file 24 together with the image data 23.

[Display Screen (1)—Display Mode]

Figure 10:
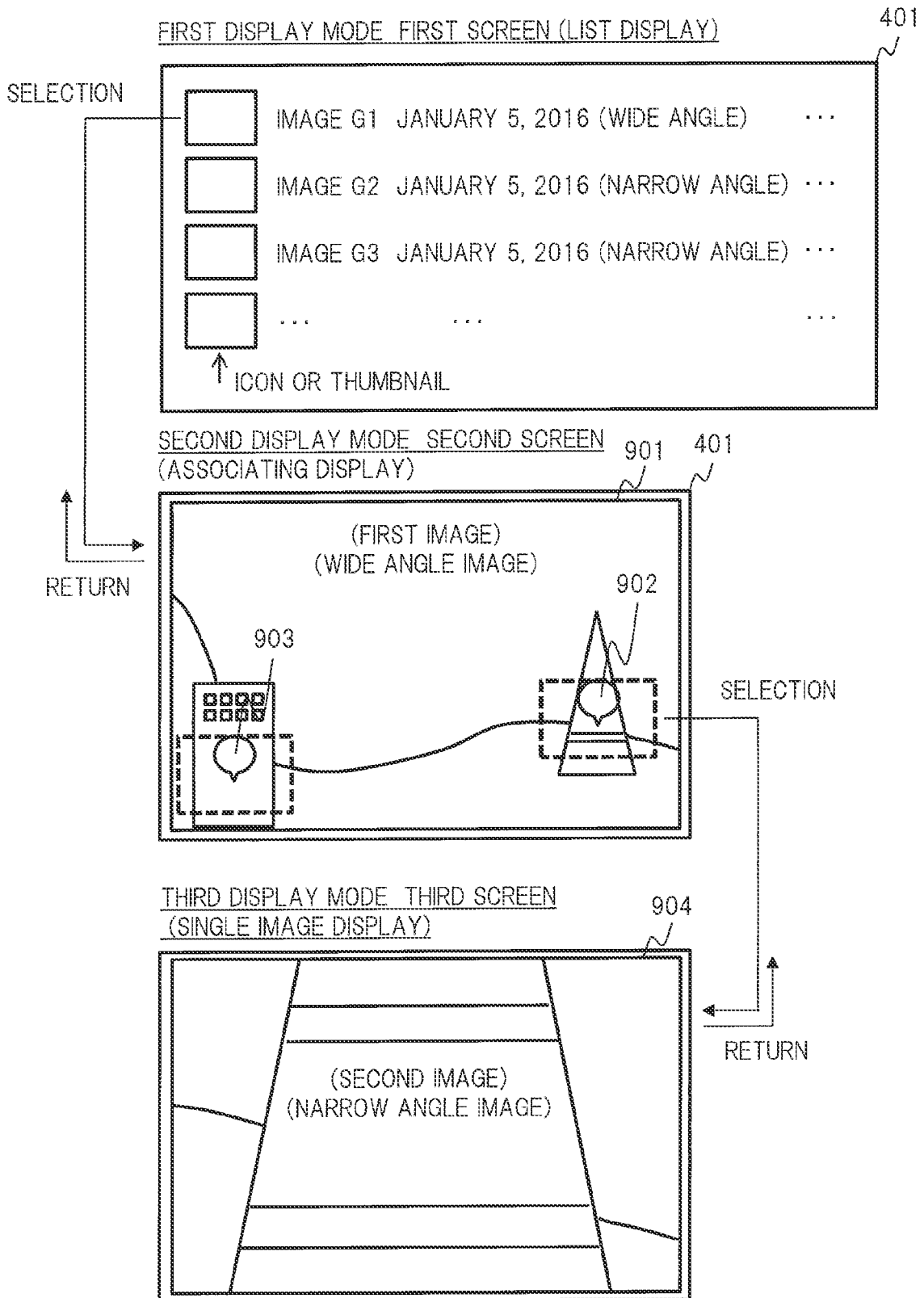
FIG. 10 is a diagram that shows a transition of a display mode of a display screen in the image capturing apparatus of the first embodiment.

FIG. 10 shows a display mode of the display screen 401 of the display part 41 and its transition. The image capturing apparatus 1 includes at least a first display mode, a second display mode and a third display mode as the display modes corresponding to the reproducing and displaying modes. For example, the image capturing apparatus 1 displays information in the first display mode first, and then, switches this display mode based on a user's operation.

The first display mode is a mode for displaying a list relating to information of all the images, which is a mode for displaying a folder screen. On the first screen of the first display mode, pieces of information relating to a plurality of images in the folder are displayed as a list in an order of the file name, the date and time or others as a key factor. In the present example, pieces of information relating to images G1, G2, G3 or the like are successively displayed as the plurality of images from above. In the line of each image, the icon or the thumbnail of the image, the file name, the photographing date and time, the type, and other information are displayed. As the other information, the attribute values such as the photographing direction {azimuth angle θ, elevation angle φ} and the angle of view {horizontal angle of view Ah, vertical angle of view Av} may be displayed. The user can display pieces of the information that are too many to be displayed on the first screen by scrolling the screen or the like. The first screen is not limited to this folder screen, and can take various publicly-known systems. For example, such a screen as to two-dimensionally dispose and display thumbnails of a plurality of images may be taken. On the first screen, a desired first image such as the image G1 (corresponding to the wide angle image 6*a*) is selected and operated by the user. In this case, when there is the second image to be associated with the selected first image, the image capturing apparatus 1 transits the screen to the second screen in the second display mode.

The second display mode is a unique mode for display of association among a plurality of images including the wide angle image and the narrow angle image. The second screen in the second display mode displays the wide angle image 6*a* that is the selected first image 901 as a whole, and displays the narrow angle image that is one or more second images having a predetermined relationship on the first image 901 so as to be overlapped in a state of a predetermined graphic 902 and associated. For example, a graphic 902 is a graphic representing the first narrow angle image 6*b*, and a graphic 903 is a graphic representing the second narrow angle image 6*c*. For easiness of explanation, note that a broken-line frame indicates a region having the corresponding narrow angle image. On the second screen, in accordance with a user's operation, a display state can be changed by an operation such as scrolling, enlarging/shrinking or the like.

On the second screen, a desired graphic of the second image is operated and selected by the user. The selecting operation is, for example, tapping the graphic. In this case, the image capturing apparatus 1 transits the screen to a third screen in the third display mode for displaying the selected second image. Moreover, when a predetermined operation to return to the first display mode is carried out on the second screen, the image capturing apparatus 1 returns the screen to the first screen in the first screen mode. The predetermined operation is, for example, input for assigning the first display mode, press of a return button, etc.

The third display mode is a mode that specifically displays an assigned single image such as the narrow angle image. The present example shows the example of display of the narrow angle image corresponding to a single second image 904 on the third screen. However, a single wide angle image may be similarly displayed. On the third screen in the third display mode, the display state may be changed by scrolling, enlarging/shrinking or the like in accordance with the user's operation. On the third screen, when a predetermined operation such as input for specifying the second display mode, or tapping of the region of the second image 904 is carried out by the user, the image capturing apparatus 1 returns the screen to the second screen in the second display mode.

Moreover, when the user wishes to view only the wide angle image, the image capturing apparatus 1 specifically displays only the first image on the display screen in accordance with a predetermined operation. For example, the image capturing apparatus 1 brings the graphic of the second image into a non-display state in accordance with a predetermined operation on the second screen, so that only the first image is displayed. The image capturing apparatus 1 returns the graphic of the second image to a display state again from this state in accordance with a predetermined operation. Alternatively, the image capturing apparatus 1 transits the screen to the third screen for specifically displaying the first image, in response to a predetermined operation on the second screen, such as tapping of a region without the graphic of the second image on the first image or the like.

[Display Screen (2)—Second Display Mode]

Figure 11:
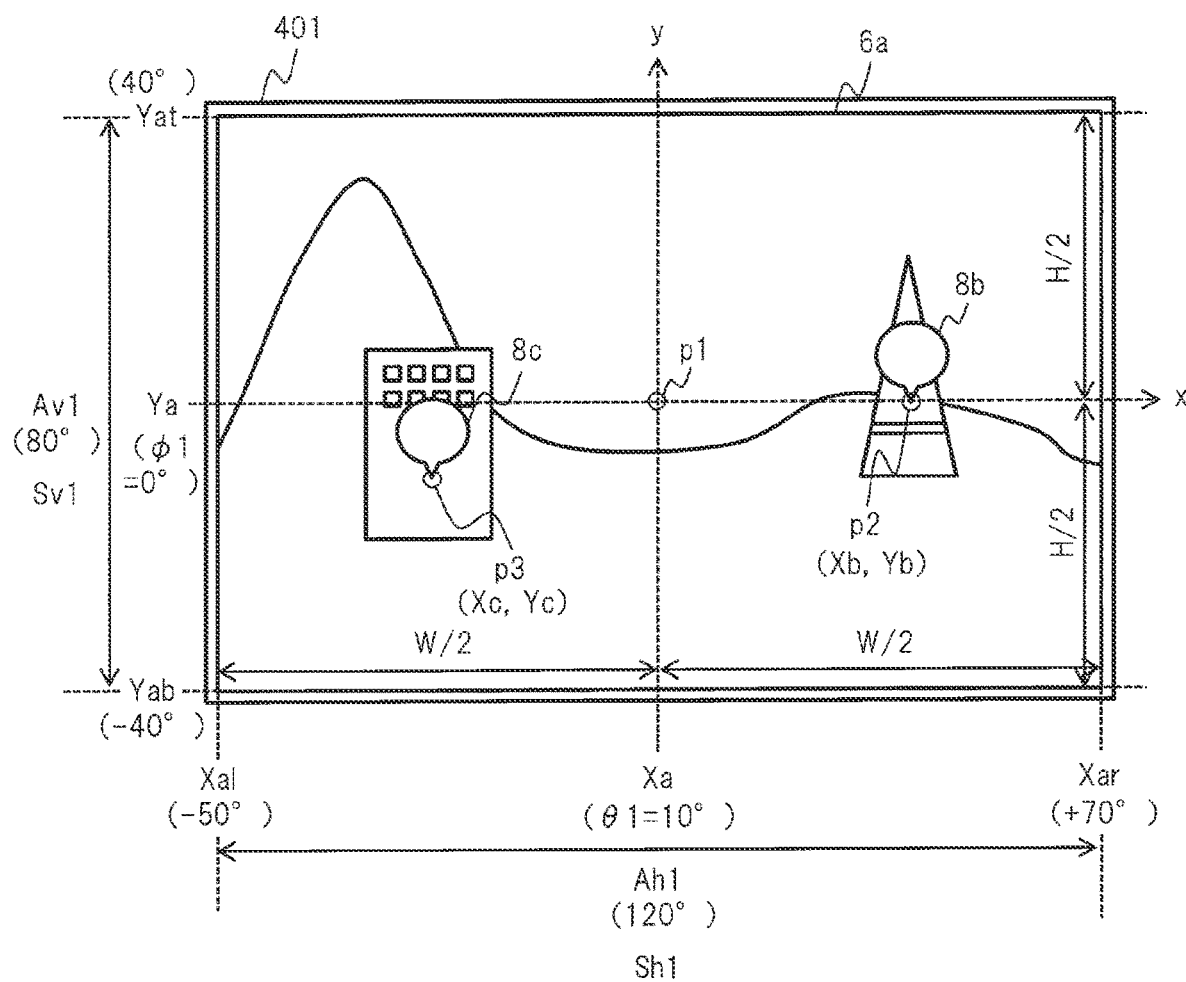
FIG. 11 is a diagram that shows a screen example of a second display mode in the image capturing apparatus of the first embodiment.

FIG. 11 shows an example of the second screen in the second display mode. The present example corresponds to a specific example of FIG. 7 or the like, and shows a case of selection and display of the wide angle image 6*a*. In this case, the first narrow angle image 6*b* and the second narrow angle image 6*c* are associated with the wide angle image 6*a*. The display controller 12 displays the second screen based on the image file 24 and the management information 21. The second screen displays the wide angle image 6*a* that is the first image as a whole, and displays graphics representing the narrow angles image that are the respective second images on the first image so as to be overlapped.

In FIG. 11, an in-plane horizontal direction corresponding to an azimuth angle within the display screen 401 is set to the x direction, and an in-plane vertical direction corresponding to an elevation angle is set to the y direction. The lateral width of the display screen 401 in the x direction is set to W, and the longitudinal width thereof in the y direction thereof is set to H.

A point p1 represents a center point of the display screen 401. First, when no operations such as scrolling, enlarging/shrinking or the like are performed, the entire wide angle image 6a is displayed within the display screen 401. First, at the point p1, positional coordinates (Xa, Ya) of the center point corresponding to a photographing direction 63a of the wide angle image 6a are displayed so as to be disposed. The positional coordinates (Xa, Ya) are represented by (azimuth angle, elevation angle), and indicate a point corresponding to ($\theta1=+10°$, $\phi1=0°$).

The horizontal angle of view Ah1 of the wide angle image 6a is 120°, and the vertical angle of view Av1 is 80°. The wide angle image 6a is displayed with a horizontal size Sh1 corresponding to the horizontal angle of view Ah1 and a vertical size Sv1 corresponding to the vertical angle of view Av1, so as to correspond to the lateral width W and the longitudinal width H of the display screen 401. A position Xar on the right end corresponds to 70° in the azimuth angle and a position Xal on the left end corresponds to −50° in the azimuth angle, while a position Yat on the upper end corresponds to 40° in the elevation angle and a position Yab on the lower end corresponds to −40° in the elevation angle.

On the wide angle image 6a, a mark that is a graphic representing the narrow angle image is displayed so as to be overlapped. As the marks, the present example shows a mark 8b representing the first narrow angle image 6b and a mark 8c representing the second narrow angle image 6c. As the marks, a case of a word balloon shape is particularly shown. The marks can be changed based on user settings. A center point p2 represents a position at which the mark 8b representing the first narrow angle image 6b is displayed. A center point p3 represents a position at which the mark 8c representing the second narrow angle image 6c is displayed. The position (Xb, Yb) of the center point p2 corresponds to (+45°, 0°) in (azimuth angle, elevation angle), and the position (Xc, Yc) of the center position p3 corresponds to (−20°, −10°) therein.

The display controller 12 determines the display position of the mark of the second image on the first image and displays the mark, based on information of the photographing direction, the angle of view of the second image or the like to be associated with the first image.

When a wide angle distortion and distortion are ignored, the position (Xb, Yb) of the center point p2 of the first narrow angle image 6b can be obtained by the following expression using a difference (35°) in azimuth angle and a difference (0°) in elevation angle from the point p1 of the wide angle image 6a.

$$Xb = (W/2) \times \tan 35° / \tan 60° \quad (4)$$

$$Yb = (H/2) \times \tan 0° / \tan 40° = 0 \quad (5)$$

When the wide angle distortion and the distortion are ignored, the position (Xc, Yc) of center point p3 of the second narrow angle image 6c can be obtained by the following expression using a difference (−30°) in azimuth angle and a difference (−10°) in elevation angle from point p1 of the wide angle image 6a.

$$Xc = (W/2) \times \tan(-30°) / \tan 60° \quad (6)$$

$$Yc = (H/2) \times \tan(-10°) / \tan 40° \quad (7)$$

The user operates to select a desired mark on the display screen 401 by, for example, tapping it. Thus, the second image corresponding to the mark can be selected and displayed on the third screen in the third display mode. Note that the example of FIG. 11 shows a case in which the entire wide angle image 6a can be displayed based on the size of the display screen 401 first. When the entire wide angle image cannot be displayed on the display screen 401, the display controller 12 may display a part of the wide angle image, that is, a part of the angle of image, or may shrink the wide angle image so that the image may be entirely fixed within the screen. Moreover, within the display screen 401, values of the photographing direction and the angle of view, etc., may be displayed as browsing auxiliary information, or icons or the like for the operations such as the scrolling and the enlarging/shrinking processes may be displayed.

[Display Screen (3)—Third Display Mode]

Figure 12:
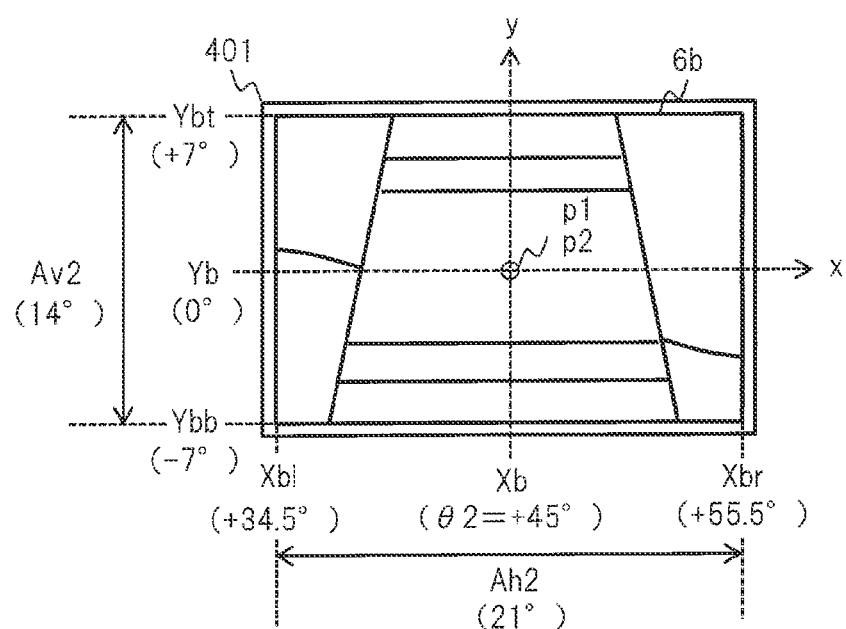
FIG. 12 is a diagram that shows a screen example of a first narrow angle image of a third display mode in the image capturing apparatus of the first embodiment.

As a display example of a third screen in the third display mode, FIG. 12 shows display of the first narrow angle image 6b carried out when the mark 8b of the first narrow angle image 6b is selected. First, the first narrow angle image 6b is displayed on the entire part within the display screen 401. At the point p1 that is the center of the display screen 401, the first narrow angle image 6b and the center point p2 of the mark 8b are disposed and displayed. The position (Xb, Yb) of the center point p2 corresponds to {$\theta2=45°$, $\phi2=0°$} showing a photographing direction 63b.

The horizontal angle of view Ah2 of the first narrow angle image 6b is 21° and the vertical angle of view Av2 thereof is 14°. On the display screen 401, a position Xbr on the right end corresponds to +55.5° in azimuth angle, and a position Xbl on the left end corresponds to +34.5° in azimuth angle, while a position Ybt on the upper end corresponds to +7° in elevation angle and a position Ybb on the lower end corresponds to −7° in elevation angle.

Figure 13:
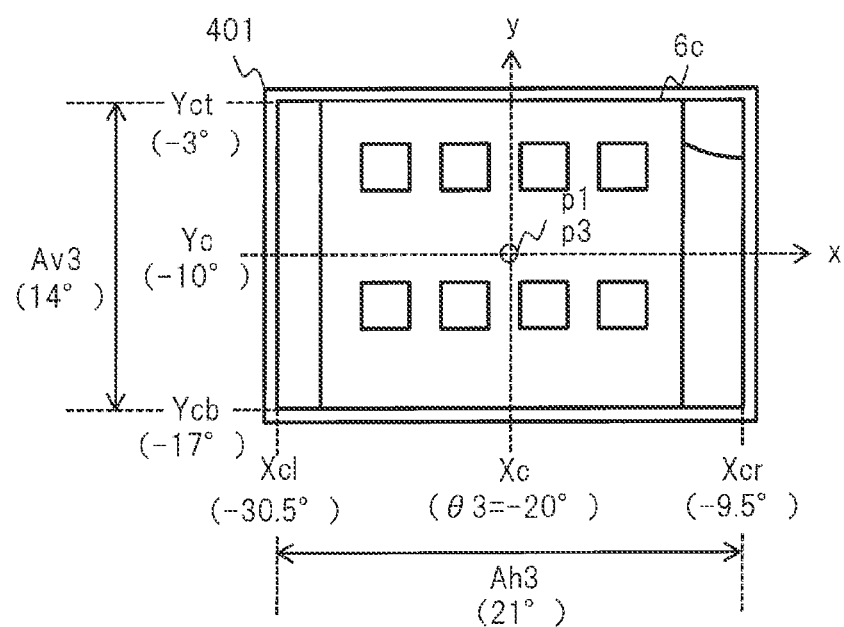
FIG. 13 is a diagram that shows a screen example of a second narrow angle image of the third display mode in the image capturing apparatus of the first embodiment.

As an example of the third screen in the third display mode, FIG. 13 shows display of the second narrow angle image 6c carried out when the mark 8c of the second narrow angle image 6c is selected. First, the second narrow angle image 6c is displayed on the entire part within the display screen 401. At the point p1 that is the center of the display screen 401, the second narrow angle image 6c and the center point p3 of the mark 8c are disposed and displayed. The position (Xc, Yc) of the center point p3 corresponds to {$\theta3=-20°$, $\phi3=-10°$} showing a photographing direction 63c.

The horizontal angle of view Ah3 of the second narrow angle image 6c is 21° and the vertical angle of view Av3 thereof is 14°. On the display screen 401, a position Xcr on the right end corresponds to −9.5° in azimuth angle, and a position Xcl on the left end corresponds to −30.5° in azimuth angle, while a position Yct on the upper end corresponds to −3° in elevation angle and a position Ycb on the lower end corresponds to −17° in elevation angle.

Note that, not limited to the transition from the second display mode to the third display mode, another transition may be carried out. An operation mode for transiting from the first display mode directly to the third display mode, without passing through the second display mode, can be available by a predetermined operation, and the operation mode can be selected depending on user's settings or the like.

[Associating System]

An associating system includes a first system and a second system relating to the timing for the associating process or the like. The first system is a system carrying out the associating process at the time of photographing, and the second system is a system carrying out the associating process at the time of reproducing/displaying. In the first embodiment, the image capturing apparatus 1 uses the first system, and the display apparatus 2 uses the second system.

In the first system, immediately after the image capture, the image capturing apparatus 1 carries out the associating process by using an associating part 15. As a result, the associating information is written into the metadata 22 or the management information 21. At the time of the image reproducing/displaying, the image capturing apparatus 1 can recognize the relationship among the plurality of images from the reference to the associating information in the metadata 22 or the management information 21, and displays the image in the second display mode on the display screen.

In the second system, at the time of reproducing/displaying on the display screen based on the image file 24, the display apparatus 2 carries out the associating process by using the associating part 215. As a result, the image is displayed in the second display mode on the display screen.

In the second system, the display apparatus 2 may carry out the associating process every time the reproducing/displaying process is carried out, so that the writing of the associating information into the metadata 22 or the management information 21 may be omitted. Alternatively, in the second system, the display apparatus 2 may write the associating information into the metadata 22 or the management information 21 by carrying out the associating process at the first reproducing/displaying process for a certain image, and then, may omit the associating processes at second and subsequent reproducing/displaying processes for the image by the reference to the associating information.

Note that the second system may be adopted to the image capturing apparatus 1 in other embodiments. As determination on which associating system should be adopted, a mode of a fixed associating system in terms of packaging or a mode of a selectable and settable associating system in accordance with user's settings may be adopted.

[Processing Flow (1)]

Figure 14:
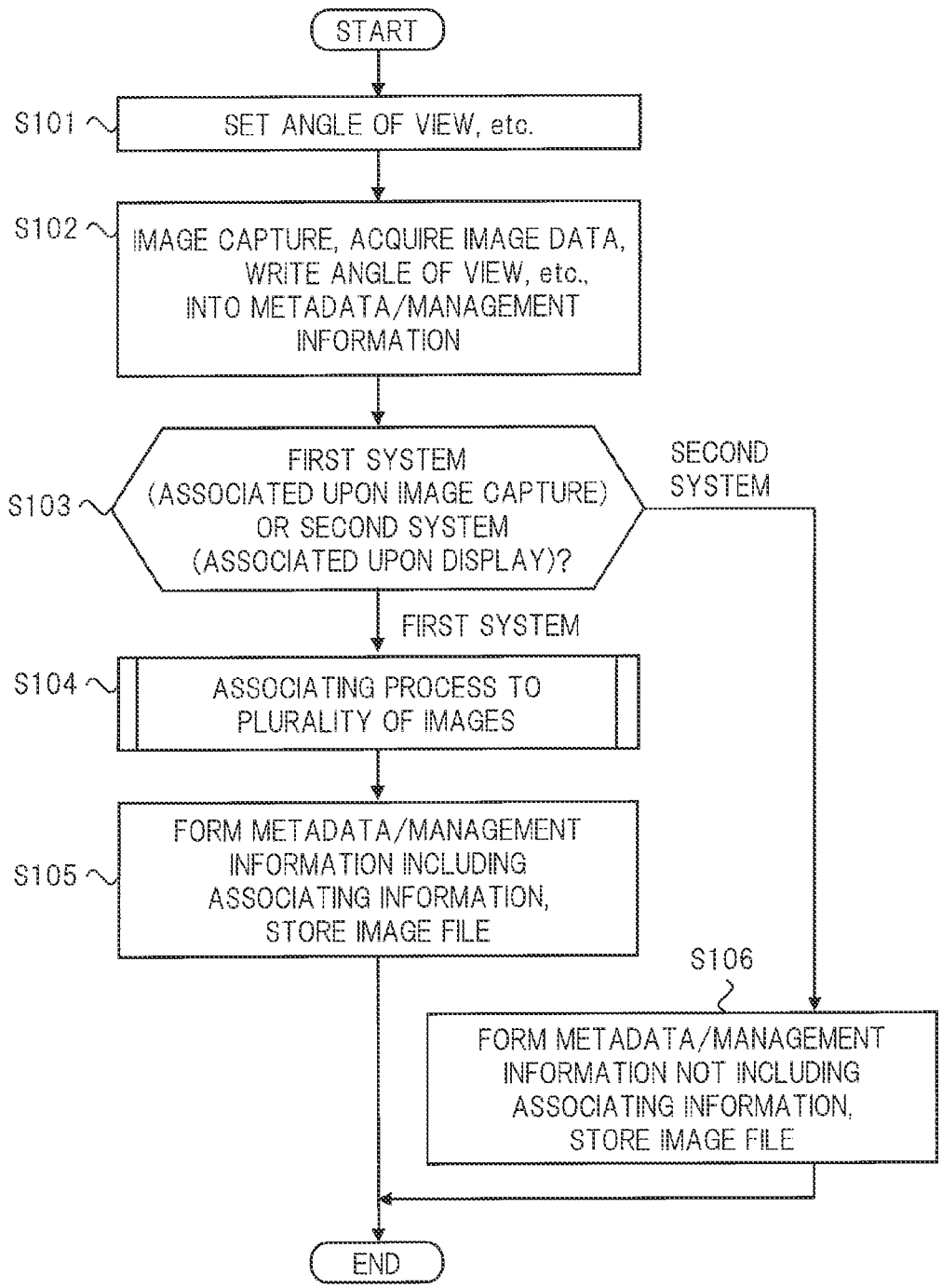
FIG. 14 is a diagram that shows a flow of control processes at the time of imaging in the image capturing apparatus of the first embodiment.
Figure 15:
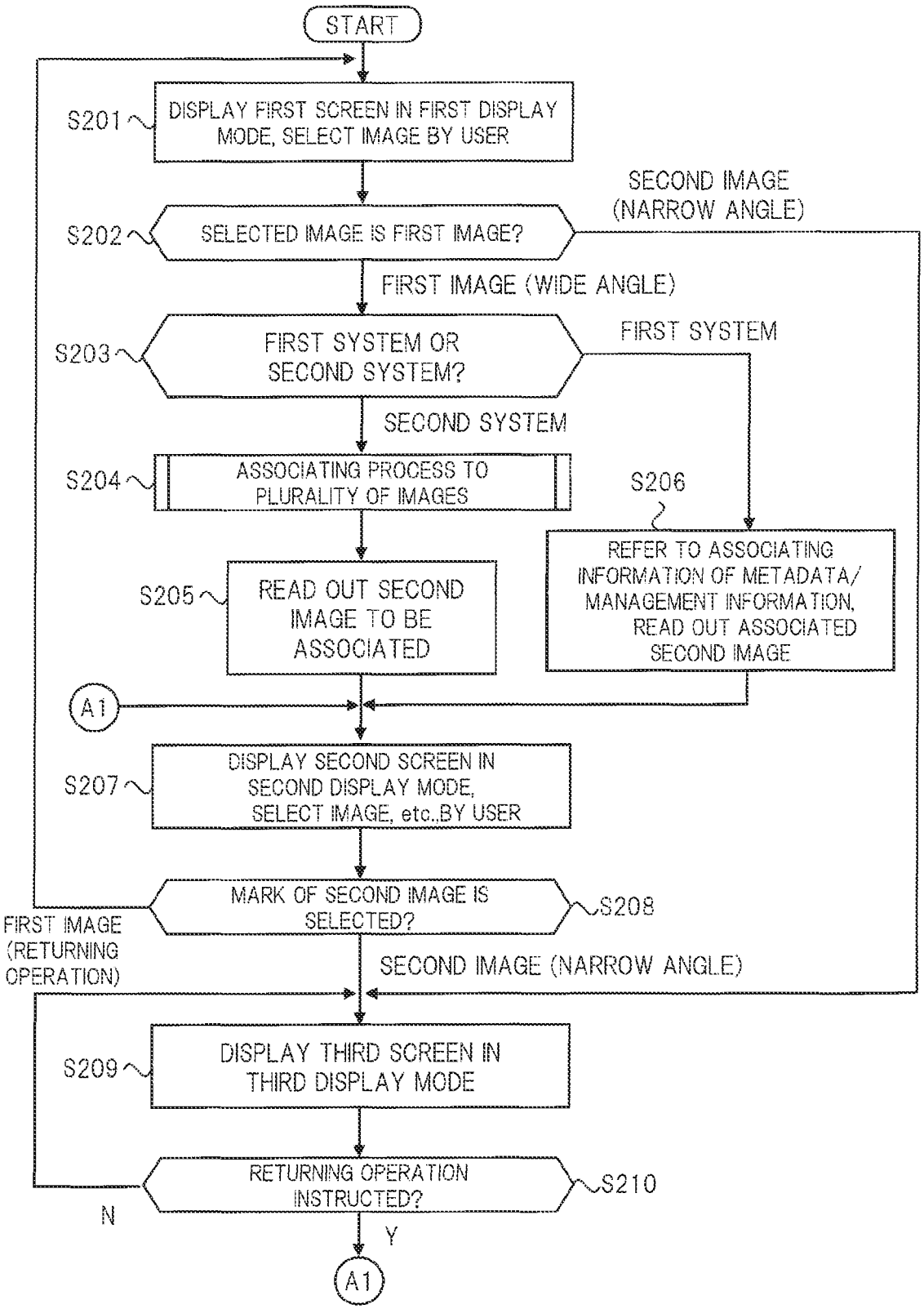
FIG. 15 is a diagram that shows a flow of control processes at the time of reproducing/displaying in the image capturing apparatus and the display apparatus of the first embodiment.

FIG. 14 and FIG. 15 show processing flows of the image capturing apparatus 1 and the display apparatus 2 in the first embodiment. FIG. 14 shows a flow of control processes at the time of capturing an image in the image capturing apparatus 1. FIG. 14 includes steps S101 to S106. The same processes are repeated for each image capturing. Explanation will be given below in the order of steps.

(S101) Based on a user's operation, the controller 101 sets an angle of view or the like onto the setting part 14. Based on the setting information of the setting part 14, the image capture controller 11 recognizes the angle of view or the like.

(S102) Based on a user's operation, the image capture controller 11 controls the image capture part 103 to capture an image, obtains the image data 23, and stores the data in the storage 102. The image capture controller 11 writes the angle of view or the angle-of-view related information into the metadata 22 of the image file 24 or the management information 21.

(S103) The sequence is branched to the first system carrying out the associating process at the time of photographing or the second system carrying out the associating process at the time of reproducing/displaying. The sequence proceeds to S104 in the case of the first system, or the sequence proceeds to S106 in the case of the second system. That is, the sequence proceeds to S104 since the first system is adopted in the image capturing apparatus 1 of the first embodiment, or the sequence proceeds to S106 when the second system is adopted in the image capturing apparatus 1 in other embodiments.

(S104) The associating part 15 carries out a predetermined associating process. Thus, a plurality of images including the first image and the second image are associated with one another.

(S105) As a result of the associating process, the associating part 15 forms the associating information, and writes the information into the metadata 22 of the image file 24 or the management information 21. The image capture controller 11 stores the image file 24 in the storage 102 so as to be recorded in the recording medium 107 of the recording part 106.

(S106) Since the associating process is not carried out at this time, the image capture controller 11 generates the metadata 22 or the management information 21 including no associating information. The controller 101 stores the image file 24 in the storage 102 so as to be recorded in the recording medium 107 of the recording part 106.

[Processing Flow (2)]

FIG. 15 shows a flow of control processes at the time of reproducing/displaying of an image in the image capturing apparatus 1 or the display apparatus 2. The control in FIG. 15 corresponds to a control process for transiting the display mode as shown in FIG. 10. FIG. 15 includes steps S201 to S210. Explanation will be given below in the order of steps. The following explanation is given in a case in which the image capturing apparatus 1 is a main body. However, the same is true in a case in which the display apparatus 2 is a main body.

(S201) Based on a user's operation, the controller 101 allows the display controller 12 to display the first screen in the first display mode as shown in FIG. 10, on the display screen 401 of the display part 41 of the display apparatus 104. The display controller 12 receives selection for an image within the first screen or the like in response to a user input operation.

(S202) The display controller 12 branches the sequence depending on whether the image selected on the first screen in the first display mode is the wide angle image that is the first image or the narrow angle image is the second image. The sequence proceeds to S203 in the case of the first image, or the sequence proceeds to S209 in the case of the second image.

(S203) The display controller 12 branches the sequence depending on the first system or the second system. The sequence proceeds to S204 in the case of the second system, or the sequence proceeds to S206 in the case of the first system. That is, the sequence proceeds to S206 in the case of the image capturing apparatus 1 of the first embodiment because of the first system, or the sequence proceeds to S204 in the case of the display apparatus 2 because of the second system.

(S204) Immediately before the reproducing/displaying, the display controller 12 carries out the associating process on a plurality of images by using the associating part 15.

(S205) As a result of S204, the display controller 12 reads out the image data 23 of the second image to be associated with the first image.

(S206) In the case of the first system, the associating process has already been carried out. The display controller 12 refers to the associating information in the metadata 22 of the image file 24 or the management information 21 on the first image, and checks the association. The display controller 12 reads out the image data 23 on the second image to be associated with the first image.

(S207) By using the image data 23 generated as a result of S205 or S206, the display controller 12 displays the image in the second display mode on the display screen. That is, as shown in the second screen in FIG. 11, the display controller 12 displays the graphic of the second image so as to be overlapped on the first image associated therewith. The display controller 12 receives selection for the graphic of the second image within the second screen or the like in accordance with a user's input operation. For example, the user taps the mark when the user wishes to view the second image, or the user taps the region of the first image when the user wishes to return to the first screen.

(S208) The display controller 12 branches the sequence depending on whether the image selected on the second screen in the second display mode is a mark representing the second image. The sequence proceeds to S209 in the case of the mark representing the second image. In the case of another operation such as an operation for the region of the first image, the sequence returns to S201 in response to the returning operation.

(S209) By using the image data 23 on the second image corresponding to the mark selected at S208, the display controller 12 displays the second image in detail on the display screen in the third display mode as shown in the third screen of FIG. 12 or the like. In accordance with a user's input operation, the display controller 12 receives the returning operation or the like within the third screen. For example, when the user wishes to return to the second screen, the user taps the region of the second image.

(S210) The display controller 12 returns the sequence to S207 as shown in A1 when an input operation corresponding to the returning operation is carried out on the third screen in the third display mode, or the display in the third display mode is continued in S209 when the input operation is not carried out. Note that the screen may return from the third display mode to the first screen in the first display mode in accordance with a predetermined input operation.

[Associating Process (1)]

The associating part 15 carries out the associating process among the plurality of images. The associating process includes a first process and a second process. The first process is a process for selecting an image to be a candidate for the association based on selection conditions of a predetermined selection system. As the predetermined selection systems, the following first selection system, second selection system and third selection system are listed. In the first embodiment, the first selection system is used. In a modified example, the second selection system or the third selection system is used. As determination on which selection system should be adopted, a mode of a fixed selection system in terms of packaging or a mode of a variably selectable selection system in accordance with user's settings may be adopted.

[First Selection System—Photographing Place]

Figure 16:
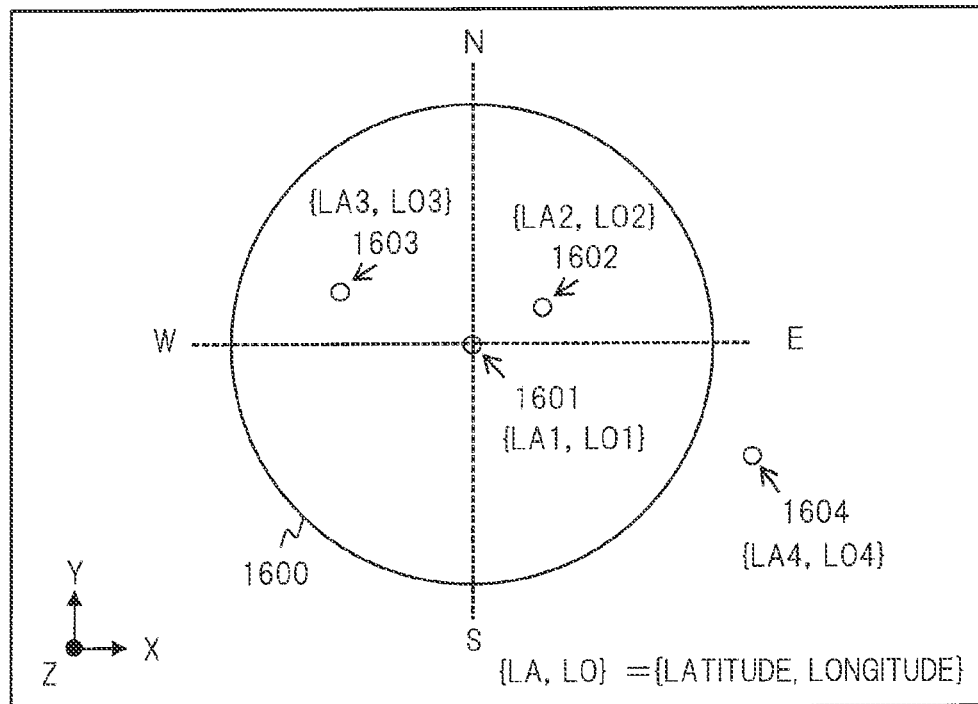
FIG. 16 is an explanatory diagram that shows a first selection system in the image capturing apparatus of the first embodiment.

FIG. 16 is an explanatory diagram that shows the first selection system. In the first selection system, conditions relating to the photographing place are used as the selection conditions. In the first selection system, images that are determined to schematically have the same photographing place as one another are selected as the candidates. In the first selection system, for the determination on the photographing place, positional information {latitude, longitude, altitude} obtained by the position detecting part 113 is used. In the association, the associating part 15 refers to, for example, the positional information {latitude, longitude} written in the photographing place item of the metadata 22 at the time of image capturing. The {latitude, longitude} are represented by {LA, LO}.

As shown in FIG. 16, based on the wide angle image that is the first image as reference, in a space, for example, on an X-Y plane, the associating part 15 takes a position 1601 indicating the photographing place of the first image as a center point. The position 1601 is represented by {LA1, LO1}. A positional range 1600 corresponds to a threshold value of conditions, and indicates a circular region with a predetermined radial distance centered on the position 1601. Note that the radial distance that defines the positional range 1600 may have a fixed setting value in designing or a variably settable value by the user's setting.

The associating part 15 compares positions of respective narrow angle images serving as the second images with one another with reference to the position 1601 of the first image. The present example shows a case in which there are a position 1602 {LA2, LO2} of the first narrow angle image, a position 1603 {LA3, LO3} of the second narrow angle image and a position 1604 {LA4, LO4} of the third narrow angle image around the wide angle image. The associating part 15 searches images included within the positional range 1600 based on the position 1601 of the first image. In the present example, within the positional range 1600, the position 1602 of the first narrow angle image and the position 1603 of the second narrow angle image are included although the position 1604 of the third narrow angle image is not included.

The associating part 15 determines that the second image whose position is included within the positional range 1600 is an image that has been captured at the schematically same photographing place as that of the first image, and selects the second image as the candidate for the association. As an example of the same photographing place, a case in which the user has photographed images in the respective directions of 360° while going along a handrail around a circumference of a certain observation deck can be listed.

[Second Selection System—Photographing Date and Time]

Figure 17:
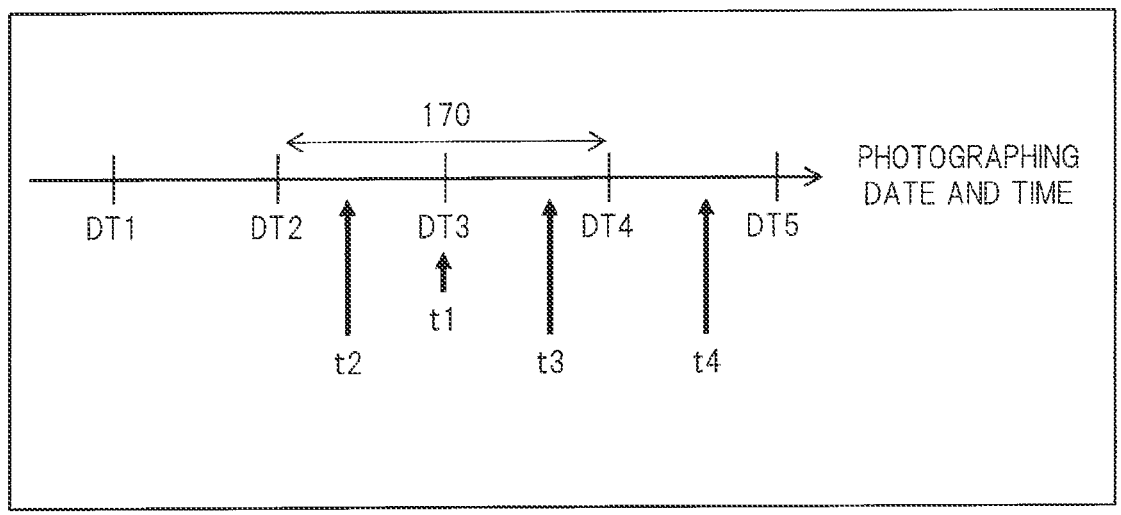
FIG. 17 is an explanatory diagram that shows a second selection system in the image capturing apparatus of the first embodiment.

FIG. 17 is an explanatory diagram that shows the second selection system. In the second selection system, conditions relating to the photographing date and time are used as the selection conditions. In the second selection system, images that are determined to schematically have the same photographing date and time as one another are selected as the candidate. At the time of the association, the associating part 15 refers to, for example, the photographing date and time (year, month, date, hours, minutes, and seconds) written in the photographing date and time item of the metadata 22.

In a time series of the photographing date and time, the associating part 15 takes a moment t1 indicating the photographing date and time of the first image based on the wide angle image that is the first image as reference. In the present example, the moment t1 is supposed to be a date and time DT3. A date-and-time range 170 corresponds to a threshold value of conditions, and shows a range of predetermined time including time before and after the moment t1 serving as a center point. Note that the time defining the date-and-time range 170 may have a fixed set value in designing or a variably settable value by the user. The date-and-time range 170 is settable as, for example, one day (24 hours), one hour, five minutes or the like.

The associating part 15 searches the second images included within the predetermined date-and-time range 170 based on the moment t1 that is the photographing date and time of the first image. The associating part 15 compares the photographing dates and time of the respective narrow angle images corresponding to the second images with one another based on the moment t1 that is the photographing date and time of the first image. The present example shows a case in which there are a moment t2 that is the photographing date and time of the first narrow angle image, a moment t3 that is the photographing date and time of the second narrow angle image and a moment t4 that is the photographing date and time of the third narrow angle image around the moment t1. In the present example, within the date-and-time range 170, the moment t2 of the first narrow angle image and the moment t3 of the second narrow angle image are included although the moment t4 of the third narrow angle image is not included. The controller 101 determines that the second image whose moment is included within the date-and-time range 170 is an image that has been captured on the schematically same photographing date and time as those of the first image, and selects the second image as the candidate for the association.

[Third Selection System—Setting Character String]

FIG. 18 is an explanatory diagram that shows the third selection system. In the third selection system, as selection conditions, conditions relating to a setting character string that is optionally settable by the user are used. In the third selection system, images that are determined to schematically have the same setting character string as one another are selected as the candidates. At the time of the association, the associating part 15 refers to the character string set as, for example, the setting character string of the associating management information after the image capturing.

FIG. 18 shows an example of the list display of information on the plurality of images on the first screen in the first display mode. In this example, the file name, the photographing date and time, a tag, the type and the like are displayed as information for each of images. The "tag" item corresponds to the setting character string. In an editing job, the user can optionally set a character string to the "tag" item. In the present example, the user sets a character string indicating the photographing place to the "tag" item. For example, images G1, G2 and G3 are images photographed at the same park as one another, and a character string "park A" is set to the images. Images G4 and G5 are images photographed at the same observation deck as each other, and a character string "observation deck B" is set to the images. In the "type" item, note that a "wide angle" or a "narrow angle" is displayed as the type of the angle of view of the image.

Based on the first image selected by the user such as the image G1 as reference, the associating part 15 refers to the setting character string in the "tag" item of this first image. The associating part 15 refers to and compares the setting character strings of the respective narrow angle images that are other second images based on the setting character string of the first image, and searches images having, for example, a setting character string including the same character string as one another. For example, the setting character strings of the images G1, G2 and G3 are the same as one another. The associating part 15 determines these images as images captured at the same photographing place as one another, and selects these images as the candidates for the association.

As a modified example, at the time of photographing or the like, the controller 101 may automatically set a character string indicating the photographing place, regardless of the user's operation. For example, based on the positional information {latitude, longitude}, the controller 101 may determine the character string indicating the photographing place. The controller 101 may set a character string in the "file name" item of the image or the like. The controller 101 may automatically add, for example, a file name including a setting character string based on a predetermined rule. As an example of the rule for the file name, "[photographing date and time]+[setting character string (photographing place)]+[individual order number]" is listed.

The above-described selection systems may be applicable in combination. For example, a combination condition of the condition for the photographing place in the first selection system and the condition on the photographing date and time in the second selection system may be applicable. The condition can be specified as, for example, "up to the past one year at the same photographing place".

[Associating Process (2)]

The second process in the associating process of the associating part 15 is explained as follows. In the second process, based on the images selected as the candidates in the first process, the determination for the association is carried out by using information on the photographing direction and the angle of view, and the associating process is carried out in accordance with the result of the determination. The associating part 15 refers to the information on the photographing direction and the angle of view in the metadata 22 of the image file 24 or the management information 21. As conditions, the associating part 15 determines whether or not the photographing direction {azimuth angle θ, vertical angle of view φ} of the candidate image is included within the range of the angle of view {horizontal angle of view Ah, vertical angle of view Av} of the wide angle image that is the first image serving as the reference. The associating part 15 determines that an image satisfying these conditions is an image to be associated.

In the above-described example of FIG. 7, within the range (−50° to +70°) of the horizontal angle of view Ah1 of the wide angle image 6a, the azimuth angle "θ2=450" of the photographing direction 63b of the first narrow angle image 6b is included, and the azimuth angle "θ3=−20°" of the photographing direction 63c of the second narrow angle image 6c is also included. Moreover, although not illustrated, within the range (−40° to +40°) of the vertical angle of view Av1 of the wide angle image 6a, the elevation angle "φ2=0°" of the photographing direction 63b of the first narrow angle image 6b is included, and the elevation angle "φ3=−10°" of the photographing direction 63c of the second narrow angle image 6c is also included. Therefore, the first narrow angle image 6b and the second narrow angle image 6c are associated with the wide angle image 6a.

When the first image and the second image are associated with each other, the associating part 15 may write the associating management information into the management information 21 or write the same information into the metadata 22 of each image as described above.

[Motion Image]

The above-described explanation has been given mainly to the case of the still image. However, basically, the same is true for a motion image. When the motion image is captured, the image capture controller 11 obtains the image data 23 of the motion image while photographing the image with changing the electronic zooming magnification, the angle of view or the like in a continuous photographing mode. Into the metadata 22 or the management information 21, the image capture controller 11 writes the information on the image file 24 of the motion image such as the electronic zooming magnification and the angle of view in accordance with the moment. Moreover, at the time of reproducing/displaying the motion image, the display controller 12 may display the mark or the like on the second screen in the second display mode in accordance with, for example, the image frame at the time of starting the motion image and the position of the image frame in a temporarily stopped state.

When the motion image is reproduced/displayed on the second screen in the second display mode, the display controller 12 determines a display position of a graphic, based on the photographing direction or the like that is changed in accordance with the photographing date and time, the positional information and the time written in the metadata 22 or the like. The display position may be set to, for example, one fixed display position in accordance with the photographing direction of the first image frame constituting the motion image or the like or to a display position determined from statistic values of a plurality of image frames. The display position may be set to a display position corresponding to the photographing direction that is changed in accordance with the image frame.

[Effects, Etc.]

As described above, according to the image capturing apparatus 1 and the display apparatus 2 of the first embodiment, the relationship among the plurality of images including the wide angle image and the narrow angle image can be easily recognized, and more convenient use can be achieved. On the display screen, the narrow angle image having the relationship is automatically overlapped on the wide angle image, and therefore, the user can easily identify and intuitively recognize the plurality of images having the relationship, and can favorably view the images. The user can identify the narrow angle image within the angle of view of the wide angle image, and can refer to and quickly view the associated narrow angle image. The user can favorably view many images while switching the display modes.

As modified examples of the first embodiment, following modified examples are listed. As the modified examples, for the type of the image, a relationship in the angle of view may be relatively determined. That is, the image capturing apparatus 1 or the display apparatus 2 refers to the angles of view of the plurality of images, and sets an image having the largest angle of view among them to the first image that is the wide angle image, and also sets an image that is different from the first image to the second image that is the narrow angle image.

Modified Example (1)—Second Display Mode

Figure 19:
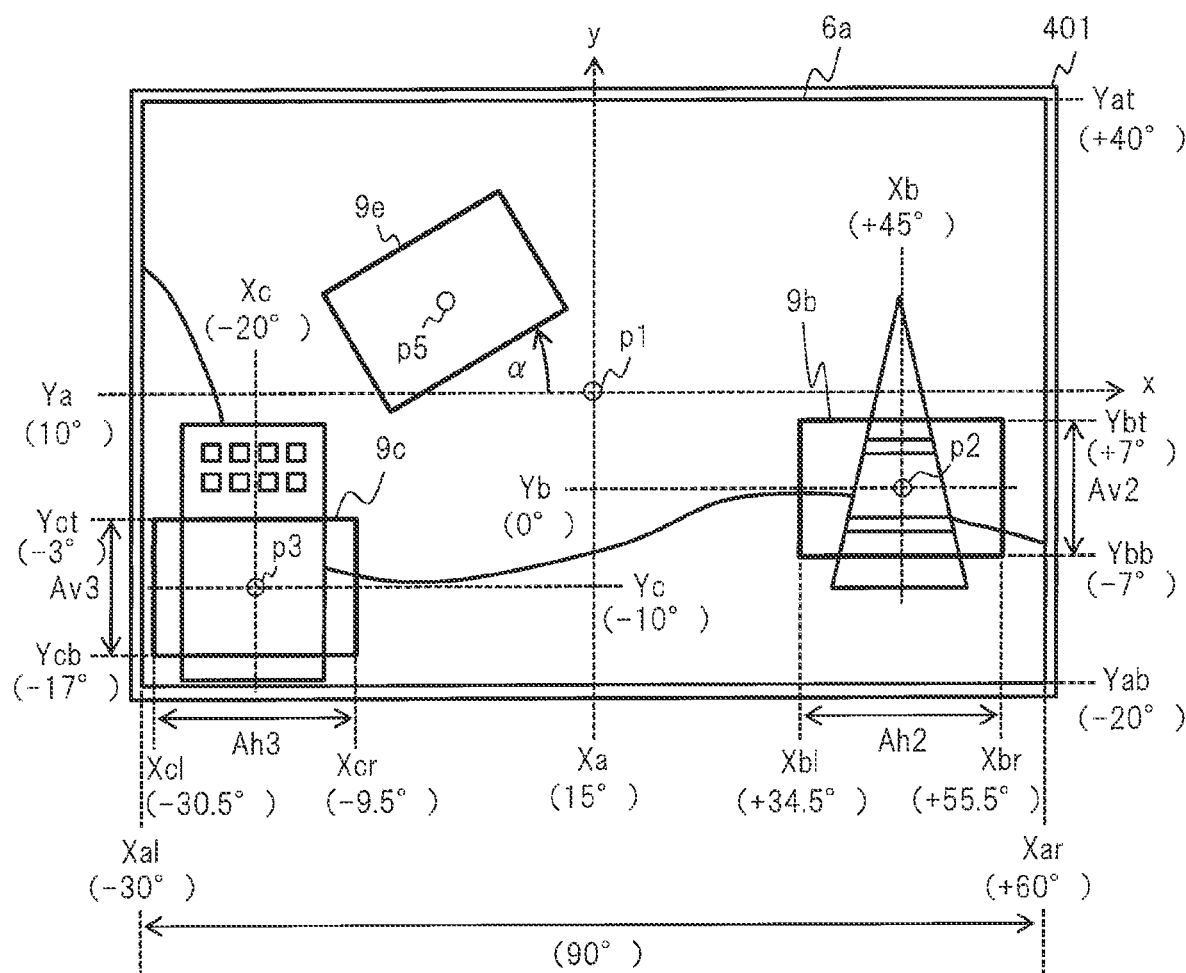
FIG. 19 is a diagram that shows a screen example of the second display mode in an image capturing apparatus according to a modified example of the first embodiment.

FIG. 19 shows an example of a second screen in a second display mode in an image capturing apparatus 1 according to a modified example of the first embodiment. FIG. 19 corresponds to a specific example of FIG. 7. On a display screen 401 of FIG. 19, not a mark but a transparent frame is used as a graphic indicating the second image. For example, a transparent frame 9b represents a first narrow angle image 6b, and a transparent frame 9c represents a second narrow angle image 6c. As the transparent frame, four sides of a rectangular shape are displayed with a line and a color, and an inside region of the four sides is a transparent region so that the first image on the background is displayed as it is. The size of the region of the transparent frame on the display is particularly determined in accordance with the size of the angle of view of the second image. Thus, the relationship among the narrow angle images within the wide angle image can be more easily recognized.

Note that the example of FIG. 19 shows a state in which a wide angle image 6a is scrolled or enlarged/shrunk based on the user's operation after being displayed first at the same reference position as that in FIG. 11 on the display screen 401 so that the center point on the display and the angle of view range are moved and changed. In FIG. 19, at the center point p1 on the display screen, a point corresponding to (+15°, +10°) in (azimuth angle, elevation angle) is disposed as the position (Xa, Ya) of the viewing point of the wide angle image 6a. On the display screen 401, a range of 90 within the range of 120° in the horizontal angle of view of the wide angle image 6a and a range of 60° within the range of 80° in the elevation angle are displayed so as to be enlarged. The position Xa is at 15° in the azimuth angle, and the position Ya is at 10° in the elevation angle. On the display screen 401, the position Xar on the right end corresponds to 60°, the position Xal on the left end corresponds to −30°, the position Yat on the upper end corresponds to 40°, and the position Yab on the lower end corresponds to −20°.

The positional coordinates (Xb, Yb) of the center point p2 of the transparent frame 9b correspond to (+45°, 0°) in (azimuth angle, elevation angle). The lateral width of the transparent frame 9b is a size corresponding to the horizontal angle of view of "Ah2=21°", and is located within a range of 45°±10.5° in azimuth angle, and the position Xbl on the left end corresponds to +34.5° and the position Xbr on the right end corresponds to +55.5°. The longitudinal width of the transparent frame 9b is a size corresponding to the vertical angle of view of "Av2=14°", and is located within a range of 0°±7° in elevation angle, and the position Ybt on the upper end corresponds to +7° and the position Ybb on the lower end corresponds to −7°.

The position and the size of the transparent frame 9c are also similarly determined. The positional coordinates (Xc, Yc) of the center point p3 of the transparent frame 9c correspond to (−20°, −10°). The lateral width of the transparent frame 9c is a size corresponding to the horizontal angle of view of "Ah3=21°", and is located within a range of −20°±10.5° in azimuth angle, and the position Xcl on the left end corresponds to −30.5° and the position Xcr on the right end corresponds to −9.5°. The longitudinal width of the transparent frame 9c is a size corresponding to the vertical angle of view of "Av3=14°", and is located within a range of "−10°±7°" in elevation angle, and the position Yct on the upper end corresponds to −3° and the position Ycb on the lower end corresponds to −17°.

When the wide angle distortion and the distortion are ignored, the display position of the transparent frame 9b {Xbr, Xbl, Ybt, Ybb} and the display position of the transparent frame 9c {Xcr, Xcl, Yct, Ycb} are obtained by the following expression. Note that the expression has a coefficient Kw and a coefficient Kh.

$$Xbr = (W/2) - Kw(\tan 50° - \tan 55.5°) \tag{8}$$

$$Xbl = (W/2) - Kw(\tan 50° - \tan 34.5°) \tag{9}$$

$$Kw = W/(\tan 50° + \tan 40°) \tag{10}$$

$$Ybt = (H/2) - Kh(\tan 40° - \tan 7°) \tag{11}$$

$$Ybb = (H/2) - Kh(\tan 40° - \tan(-7°)) \tag{12}$$

$$Kh = H/(\tan 40° + \tan 20°) \tag{13}$$

$$Xcr = (W/2) - Kw(\tan 50° - \tan(-9.5°)) \tag{14}$$

$$Xcl = (W/2) - Kw(\tan 50° - \tan(-30.5°)) \tag{15}$$

-continued $$Yct = (H/2) - Kh(\tan 40° - \tan(-3°)) \quad (16)$$

$$Ycb = (H/2) - Kh(\tan 40° - \tan(-17°)) \quad (17)$$

Moreover, the example of FIG. 19 is an example relating to the rotation angle of the image by using a transparent frame 9e indicating a narrow angle image located at a point p5. This narrow angle image has an angle "a" relative to the x direction.

By using information of a photographing direction and an angle of view of an image of the image data 23, the display controller 12 determines the size of the transparent frame. When scrolling or enlarging/shrinking for supporting a viewing point change in the display of the wide angle image is carried out, the display controller 12 determines the position and the size of the transparent frame so as to support the display state after the change.

This modified example has an advantage that is easiness in recognition of the range and the positional relationship of the narrow angle image because of the display of the transparent frame. As another modified example, in place of the transparent frame, a thumbnail with the same size may be displayed.

Modified Example (2)—Second Display Mode

Figure 20:
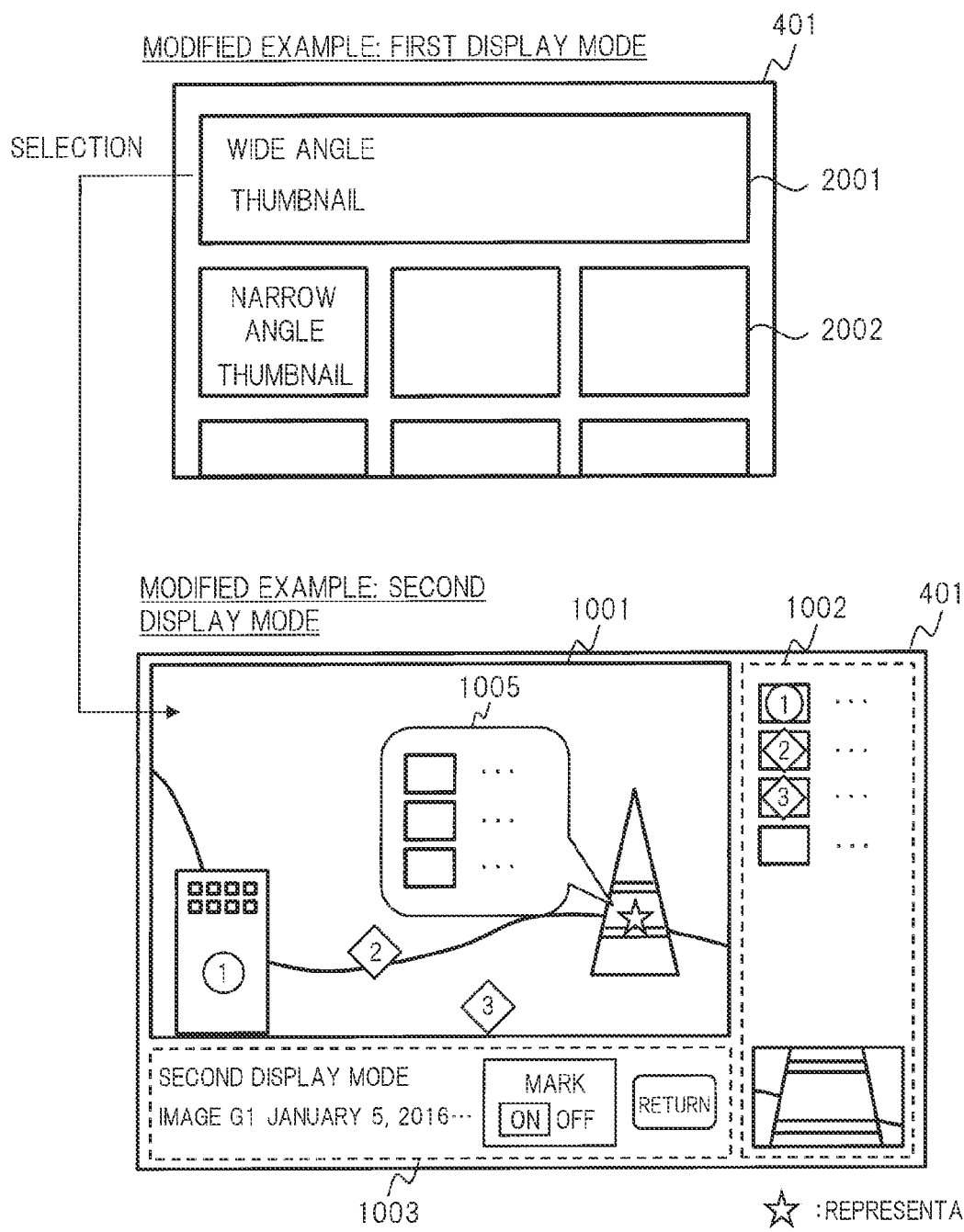
FIG. 20 is a diagram that shows screen examples of the first display mode and the second display mode in the image capturing apparatus according to the modified example of the first embodiment.

FIG. 20 shows an example of a display screen in an image capturing apparatus 1 in a modified example of the first embodiment. On the upper side of FIG. 20, an example of a first screen in a first display mode is shown, and thumbnails of wide angle images and thumbnails of narrow angle images are longitudinally and laterally disposed on this first screen in parallel with one another as a list. At this time, the longitudinal and lateral sizes of thumbnails on the display are determined in accordance with the sizes of the angle of view of the image sizes. The thumbnail 2001 of the wide angle image of the present example is shown as a thumbnail of a panorama image having a large horizontal angle of view that is 180° or more. The thumbnail 2002 of the narrow angle image is shown as a thumbnail of an image having a horizontal angle of view that is less than 180°. Note that the number of images in the parallel layout is variable in one direction, to be 2, 3, 4 or the like. The user may distinguish the wide angle and the narrow angle from each other by using the sizes of thumbnails.

The lower side of FIG. 20 shows an example of a second screen in the second display mode. Within the display screen 401, a main region 1001 and a region other than the main region 1001 are provided. In the present example, a region 1002 on the right side and a region 1003 on the lower side are provided. In the main region 1001, on the first image in the second display mode, marks of the second images or the like are displayed so as to be overlapped. When the entire first image is not sufficiently displayed in the region 1001, a range of a part of an angle of view is displayed first so that a photographing direction is as the center point. In the present example, a range corresponding to a part of the horizontal angle of view of the wide angle image selected on the first screen is displayed in the region 1001. The user can change the display state of the first image in the region 1001 by carrying out the scrolling or enlarging/shrinking process or the like in accordance with the change of the viewing point or the like.

As the graphic of the second image, a different graphic may be displayed depending on difference in the type, the photographing date and time, etc., of the image. As the graphics in the present example, circular, rhombic and star marks are shown. As the type of the image, a type depending on, for example, the angle of view may be set based on the user settings or the like. Moreover, the graphic may be added with information and be displayed. In the present example, an identification number is added to the mark. Moreover, as the information of the graphic, an attribute value of the photographing date and time or the like based on the metadata 22 or the management information 21 may be displayed, or only the attribute value may be displayed.

In the region 1002 on the right side, pieces of information of all of a plurality of second images that are associated with the first image, such as the mark or the attribute, are displayed in the parallel layout. In the region 1001, the marks of some of the second images are displayed in accordance with the display state, while the marks of the other second images are not display. In the region 1002, the information of the second image not displayed in the region 1001 can be displayed. When a mark of the second image is selected in the region 1001, or when a mark of the second image is selected in the region 1002, the sequence may transit to the third display mode. Moreover, in the right below region, the thumbnail of the second image selected lastly is displayed as a preview image.

In the region 1003 on the lower side, the display mode, the information of the first image, operation buttons, set information and the like are displayed. For example, pieces of information showing that the current display mode is the second display mode and information about attribute values such as the photographing date and time of the first image or the like are displayed. Moreover, a button for switching the display state and the non-display state of the mark of the second display mode is provided. The mark is displayed in an "ON" state. The mark is not displayed in an "OFF" state, in other words, only the first image is displayed. Moreover, a return button or the like for use in returning from the second display mode to the first display mode is provided.

Moreover, when there are a plurality of associated second images that are close to each other in the same region at the schematically same position on the first image within the second screen in the second display mode, individual marks are not displayed so as to be overlapped, but one representative mark is displayed. In the present example, the star mark is used as the representative mark. When the user selects and operates the representative mark, information of a plurality of second images associated with the position of the representative mark is displayed. As a system for displaying the information of the plurality of second images at this time, for example, a pop-up region 1005 is displayed on the first image, and the information of the plurality of second images is displayed within the pop-up region 1005. When the user selects and operates a desired second image from the inside of the pop-up region 1005, the sequence transits to a third display mode that displays the selected second image in detail.

As another system, in the region 1002 on the right side or the like, the information of the plurality of second images associated with the representative mark may be displayed. Moreover, as still another system, in response to the selection of the representative mark, the plurality of associated second images may be successively displayed in a predetermined region, that is, may be displayed therein in a slide show form. For example, when there are a plurality of images that have been photographed at the same place in the same photographing direction but on different date and time, these images can be associated with one another and continuously reproduced and displayed.

Moreover, still another system may have a display state in which the marks of the plurality of second images can be distinguished from one another by enlargement and display of a region where the plurality of second images are close to one another in response to selection and operation of the representative mark.

Modified Example (3)—Cooperation with External Apparatus

In the image capturing apparatus 1 and the display apparatus 2, the image file 24 may be stored in an external apparatus, or the image file 24 may be read from an external apparatus and reproduced and displayed. In the image capturing apparatus 1 and the display apparatus 2, the associating process may be carried out to the image file 24 as a target to be transmitted to an external apparatus, and then, the image file 24 including the associating information may be transmitted to an external apparatus. Moreover, in the image capturing apparatus 1 and the display apparatus 2, the associating process may be carried out to the image file 24 as a target received from an external apparatus, and then, the image may be reproduced and displayed so as to be associated based on the associating information. That is, an associating system other than the above-described first system and second system may include a system carrying out the associating process before the transmission of the image file 24 to the external apparatus and a system carrying out the associating process after the reception of the image file 24 from the external apparatus. Furthermore, in the image capturing apparatus 1 and the display apparatus 2, when a plurality of image file 24 are transmitted to an external apparatus, the angle of view information and the associating information may be written as the metadata 22 for each of the image files 24, or may be written into a different managing file from those of the plurality of image files 24 so as to be provided.

For example, in the system of FIG. 1, the image capturing apparatus 1 carries out the associating process before the transmission of the plurality of captured images to a server 3, forms the image file 24 including information about the angle of view and the associating process, transmits the information to the server 3 through a communication network 4, and stores the information in the image data DB. The image capturing apparatus 1 or the display apparatus 2 accesses to the server 3 through the communication network 4, and acquires the image file 24 from the image data DB of the server 3. At this time, note that, for example, the photographing date and time, the photographing place, or the like, is assigned as the search conditions, so that a plurality of the image files 24 can be collectively acquired. The image capturing apparatus 1 or the display apparatus 2 reproduces and displays the image data 23 of the plurality of acquired image files 24 so as to be associated, based on the reference to the associating information.

Moreover, for example, the image capturing apparatus 1 does not carry out the associating process to the plurality of captured images, but transmits the image file 24 including not the associating information but the angle of view to the server 3, and stores the image file in the image data DB. The image capturing apparatus 1 or the display apparatus 2 accesses the server 3 through the communication network 4 and acquires the image file 24 from the image data DB of the server 3. The image capturing apparatus 1 or the display apparatus 2 carries out the associating process to the plurality of acquired image files 24, and reproduces/displays the files so as to be associated, based on the angle of view and the associating information.

Furthermore, the server 3 may carry out the associating process to a plurality of image data 23 in the image data DB as a target. The server 3 carries out the associating process so as to store the resulting data as the image file 24 including the associating information. The image capturing apparatus 1 or the display apparatus 2 reproduces/displays the plurality of image files 24 acquired from the server 3 by the reference to the associating information.

Moreover, for example, the image capturing apparatus 1 carries out the associating process to the plurality of captured images, and transmits an image file 24 including the angle of view and the associating information to the display apparatus 2. The display apparatus 2 acquires the image file 24, and reproduces/displays the image data 23 of the acquired image file 24 so as to be associated, based on the reference to the associating information.

Moreover, for example, the image capturing apparatus 1 does not carry out the associating process to a plurality of captured images but transmits the image file 24 including not the associating information but the angle of view to the display apparatus 2. The display apparatus 2 acquires the image file 24, carries out the associating process to the image data 23 of the acquired image file 24, and reproduces/displays the data so as to be associated, based on the associating information.

Furthermore, the image capturing apparatus 1 or the display apparatus 2 may read out the respective image files 24 from a plurality of apparatuses of the same user, and may manage them so as to be unified. For example, each of a first image capturing apparatus 1A and a second image capturing apparatus 1B of FIG. 1 does not carries out the associating process to the image file 24 of the captured image, but transmits the image file to a first display apparatus 2A. The first display apparatus 2A carries out the associating process to the image file 24, and reproduces/displays it so as to be associated.

According to this modified example, an association display function can be achieved by a system in which the plurality of apparatuses are cooperated with one another, so that the user to can carry out the associating process, the storage process or the like to a large number of images.

Modified Example (4)—Editing Function

The image capturing apparatus 1 and the display apparatus 2 of a modified example may be provided with an editing function in which the association among the plurality of images can be manually set and edited by the user's determination. By using the editing function, the user can add, remove and change the associated image within the display screen, and also can change the display position of each of the images.

Figure 21:
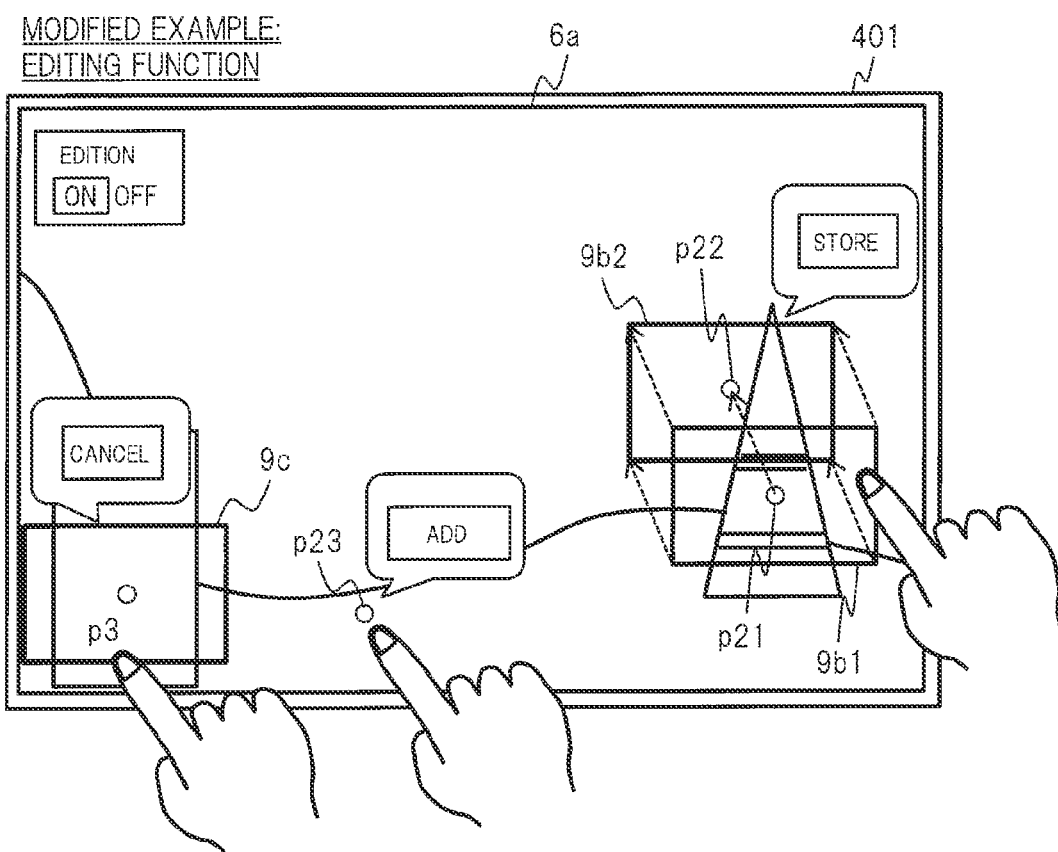
FIG. 21 is a diagram that shows an example of a display screen of an editing function in the image capturing apparatus according to the modified example of the first embodiment.

FIG. 21 shows an example of a second screen in the second display mode in the image capturing apparatus 1 and the display apparatus 2 of the modified example. The following shows a case of the image capturing apparatus 1 having the editing function. However, the same is also true for the display apparatus 2 having the editing function. Based on a user setting or input operation, an "ON" state in which the editing is valid and an "OFF" state in which the editing is invalid can be switched from each other. In the case of "ON" state, the image capturing apparatus 1 can variably set the association of the second image with the first image and set the display position of the graphic of the second image or the like on the second screen in the second display mode, based on the user input operation. The controller 101 stores and manages the display position of the graphic of the second image as one piece of the metadata 22 or the management information 21. At the time of reproducing/displaying, the controller 101 refers to the information and determines the display position of the graphic.

The present example shows a case of display of a transparent frame as the graphic of the second image. As similar to the first embodiment, first, the image capturing apparatus 1 automatically determines the display position of the second image, and display the image. For example, a transparent frame 9b1 indicating the first narrow angle image 6b is displayed. The user moves the transparent frame 9b1 that is the second image to desired direction and position by, for example, touching it. In accordance with the user operation, the controller 101 updates the display state so as to move the display position of the graphic. In the present example, the state of the transparent frame 9b1 after the movement is shown as a transparent frame 9b2. The center point of the first narrow image 6b changes from a point p21 before the movement to a point p22 after the movement. The controller 101 updates the managing value so as to store the position of the graphic of the second image after the movement as a new display position.

Moreover, after the movement of the graphic of the second image, the controller 101 may display information for checking the change of the display position so as to allow the user to check whether the change or the storage is carried out. For example, the controller 101 displays a pop-up region near the position after the movement so that a message such as "The display position was moved. Store/Not Store" is displayed. The user checks this, and pushes, for example, a "Store" button. Thus, the controller 101 stores the display position after the movement.

Moreover, as the editing function, a function for adding a second image to be associated and a function for cancelling the association of the second image are prepared. In the case of the addition, the user touches a desired position within the display screen, for example, a point p23, and assigns the addition. For example, an addition button in the pop-up region is prepared, so that a second image to be added can be selected by the user. The controller 101 displays the graphic relating to the selected second image at this position, and stores the display position of the second image as its managing value.

In the case of the cancellation, the user selects the graphic of the second image displayed within the display screen, and assigns the cancellation. For example, the user touches a transparent frame 9c of a second narrow angle image 6c, and pushes a cancellation button in the pop-up region. The controller 101 cancels the association of the second image to which the cancellation has been assigned, and erases the display, and then, updates the managing value.

According to this modified example, by using the editing function, the user can freely edit the association display of the plurality of images in the second display mode so that the display is easily viewed or recognized for the user himself/herself.

Second Embodiment

With reference to FIG. 22 to FIG. 25, an image capturing apparatus and a display apparatus according to a second embodiment of the present invention will be explained. The parts in the configuration of the second embodiment that are different from those of the first embodiment will be explained below. The image capturing apparatus 1 in the second embodiment has a function of capturing a celestial sphere image as a wide angle image, and has a function of displaying the wide angle image as the first image so as to be associated.

[Celestial Sphere Image]

In the present specification, a virtual sphere 600 having positions of a user who is a photographer and an image capturing apparatus set as a center point as shown in FIG. 7 is referred to as celestial sphere. In the present specification, the celestial sphere image is defined as an image taking 360° as at least one of the horizontal angle of view and the vertical angle of view.

Figure 22:
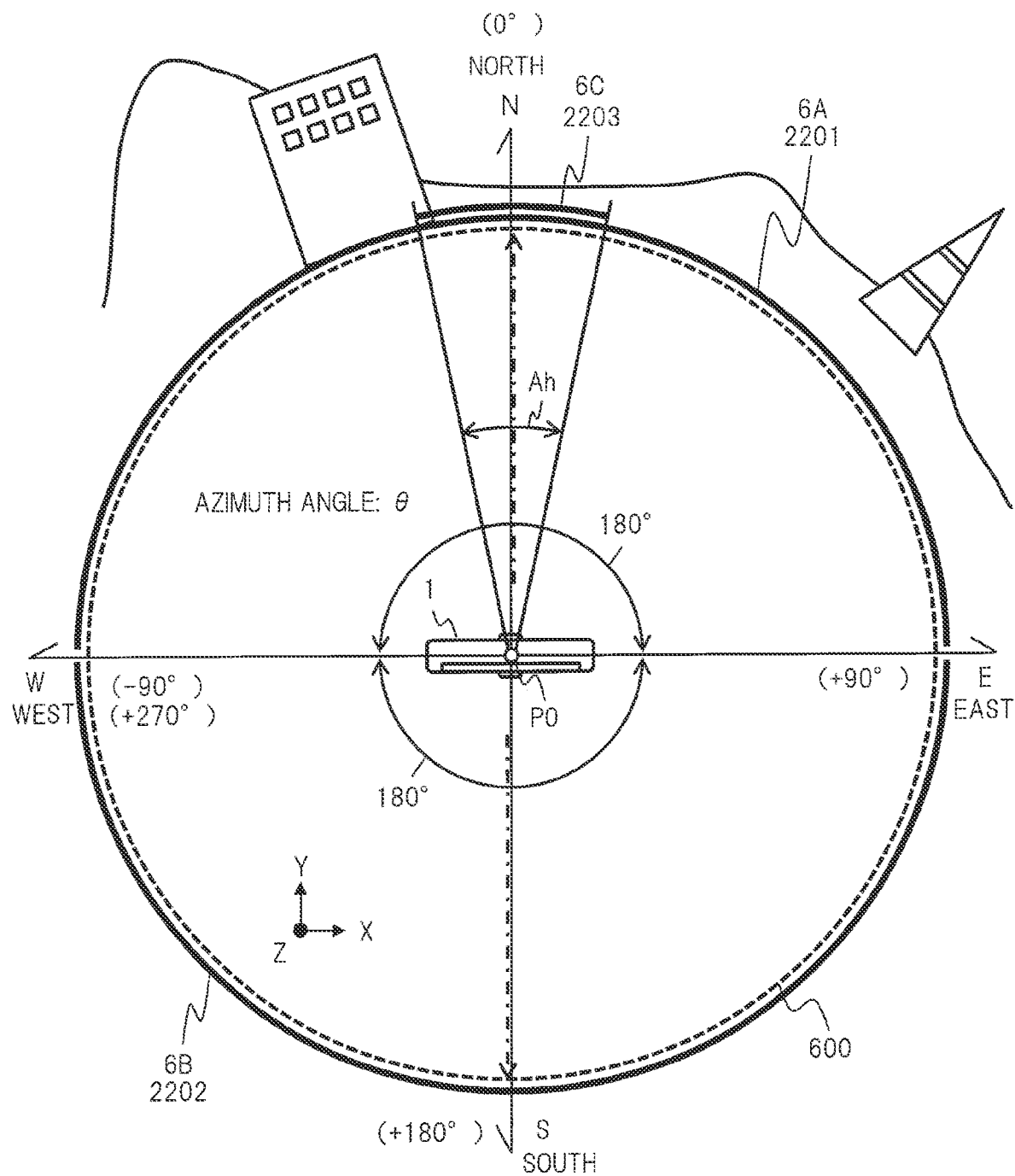
FIG. 22 is an explanatory diagram showing a celestial sphere image in an image capturing apparatus and a display apparatus according to a second embodiment of the present invention.

FIG. 22 shows the celestial sphere image according to the second embodiment in a horizontal angle of view. The sphere 600 corresponding to the celestial sphere has a first wide angle image 6A, a second wide angle image 6B and a narrow angle image 6C. The first wide angle image 6A corresponds to a wide angle image having a photographing range 2201 of 180° in the horizontal angle of view when viewed in a photographing direction (for example, northward direction) that goes frontward from a front face camera of the image capturing apparatus 1. The second wide angle image 6B corresponds to a wide angle image having a photographing range 2202 of 180° in the horizontal angle of view when viewed in a photographing direction (for example, southward direction) that goes backward from a back face camera thereof. The narrow angle image 6C corresponds to a narrow angle image having a photographing range 2202 with the horizontal angle of view Ah when viewed in a desirable photographing direction (for example, northward direction) that goes from the front face camera thereof. By composition of the first wide angle image 6A and the second wide angle image 6B with each other, a celestial sphere image corresponding to the wide angle image having a photographing range of 360° in the horizontal angle of view is formed. Although not illustrated, the same is true for the vertical angle of view Av, and the first wide angle image 6A has a photographing range of, for example, 180° in the vertical angle of view.

[Image Capturing Apparatus]

Figure 23:
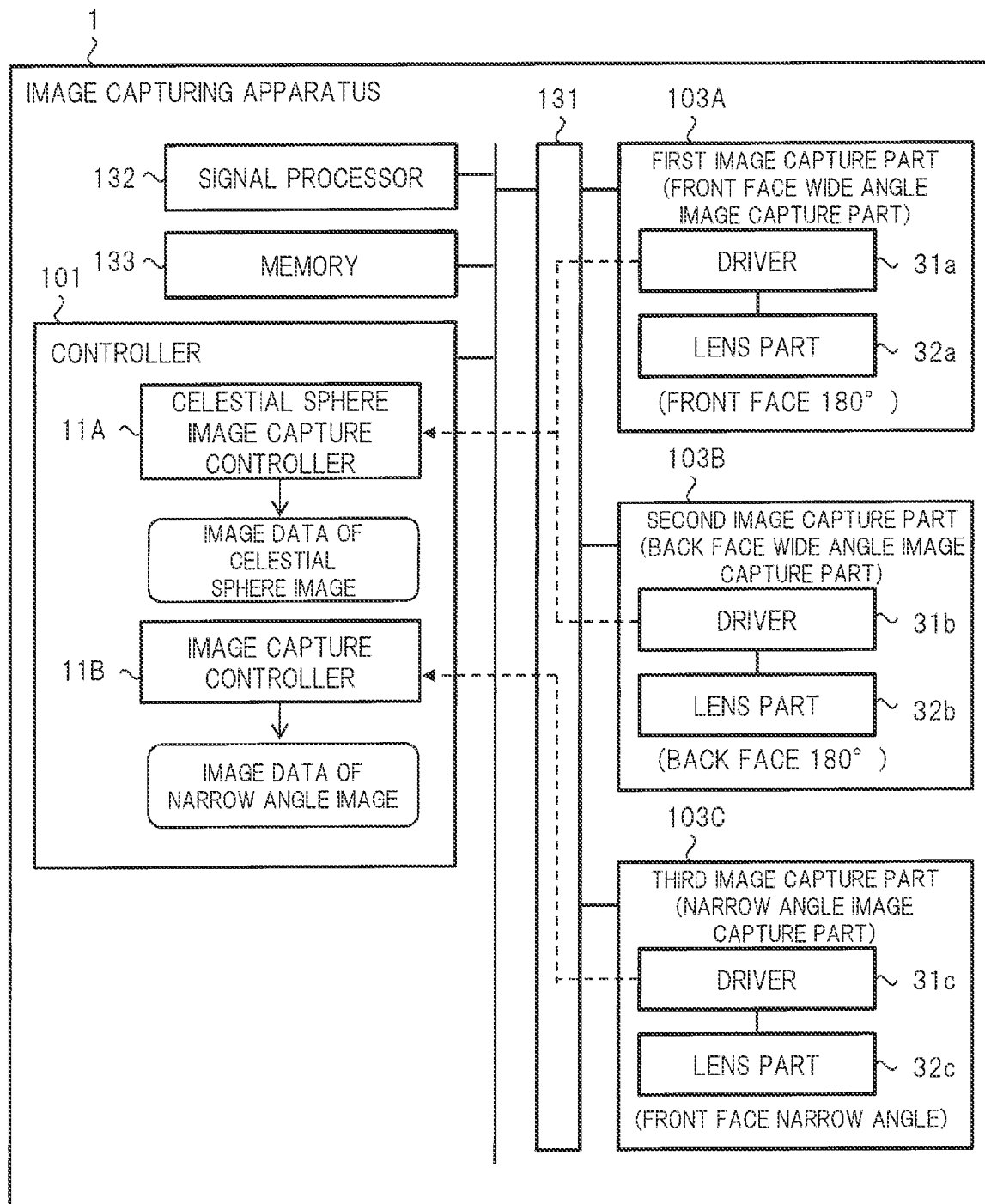
FIG. 23 is a diagram that shows a configuration relating to an image capture part in the image capturing apparatus of the second embodiment.

FIG. 23 shows a configuration of a part of the image capturing apparatus 1, the part relating to an image capture part 103. The image capturing apparatus 1 has a first image capture part 103A, a second image capture part 103B and a third image capture part 103C as the image capture part 103, and these parts are connected to an interface circuit 131.

The first image capture part 103A is an image capture part corresponding to the front face camera which includes a driver 31a and a lens part 32a. The lens part 32a is provided with a first lens as an ultra wide angle lens capable of capturing the first wide angle image 6A in the photographing range (that is, half celestial sphere) of 180° in the horizontal angle of view and the vertical angle of view on the front face. The second image capture part 103B is an image capture part corresponding to the back face camera which includes a driver 31b and a lens part 32b. The lens part 32b is provided with a second lens as an ultra wide angle lens capable of capturing the second wide angle image 6B in the photographing range (that is, half celestial sphere) of 180° in the horizontal angle of view and the vertical angle of view on the back face.

The third image capture part 103C has the same configuration as that of the image capture part 103 of the first embodiment, and includes a driver 31c and a lens part 32c. The lens part 32c is provided with a third lens capable of capturing a narrow angle image 6C within a set range of an angle of view that is less than 180° in the horizontal direction and the vertical direction on the front face. The angle of view at the time of capturing an image by the image capture part 103C can be set by a user operation within a predetermined range of the angle of view that is less than 180°. For example, it is supposed that the narrow angle image 6C having 50° as the horizontal angle of view Ah is captured.

The controller 101 includes a celestial sphere image capture controller 11A and an image capture controller 11B. The celestial sphere image capture controller 11A carries out driving control for the first image capture part 103A and the second image capture part 103B so that a celestial sphere image is photographed. The celestial sphere image capture controller 11A carries out control so that the first wide angle image 6A and the second wide angle image 6B are captured in the first image capture part 103A and the second image capture part 103B at the same timing as each other, respectively. The celestial sphere image capture controller 11A inputs these first wide angle image 6A and second wide angle image 6B through a signal processor 132 or the like so that these images are composed with each other to capture a celestial sphere image having a range of an angle of view of 360°.

Note that the configurations of the image capture part 103 and the controller 101 or the like including an optical system capable of capturing the celestial sphere image as described above can be achieved by using a related art.

As similar to the first embodiment, the celestial sphere image capture controller 11A stores the image data 23 of the captured celestial sphere image in the storage 102 as the image file 24 together with the metadata 22 or the like including information such as the angle of view or the like. As similar to the case of the first embodiment, the image capture controller 11B stores the image data 23 of the captured narrow angle image in the storage 102 as the image file 24 together with the metadata 22 or the like including information of the angle of view or the like.

In the photographing mode of the image capturing apparatus 1, an image can be captured by using any of the image capture parts in accordance with the control of the controller 101. Based on the control from the controller 101, the image capture part 103A, the image capture part 103B and the image capture part 103C can simultaneously capture images at one time. Moreover, based on the control from the controller 101, the image capture part 103A, the image capture part 103B and the image capture part 103C can capture images at individually different timings from one another. By the simultaneous photographing between and the composition of images in the image capture part 103A and the image capture part 103B, the celestial sphere image can be captured. Moreover, by the photographing using either the image capture part 103A or the image capture part 103B, the half celestial sphere image formed of the first wide angle image 6A or the second wide angle image 6B can be captured. Furthermore, simultaneous photographing in the image capture part 103C and either the image capture part 103A or the image capture part 103B can be also carried out. In this case, the either one of the wide angle images and the narrow angle image 6C have the same photographing date and time as each other, and therefore, can be automatically associated to each other. The controller 101 may add information of the type or the like indicating the celestial sphere image, the half celestial sphere image or the narrow angle image 6C to the metadata 22 or the management information 21 of the captured image. The controller 101 may add the associating information of the plurality of simultaneously captured images to the metadata 22 or the like.

[Image Capturing Apparatus—Appearance]

Figure 24:
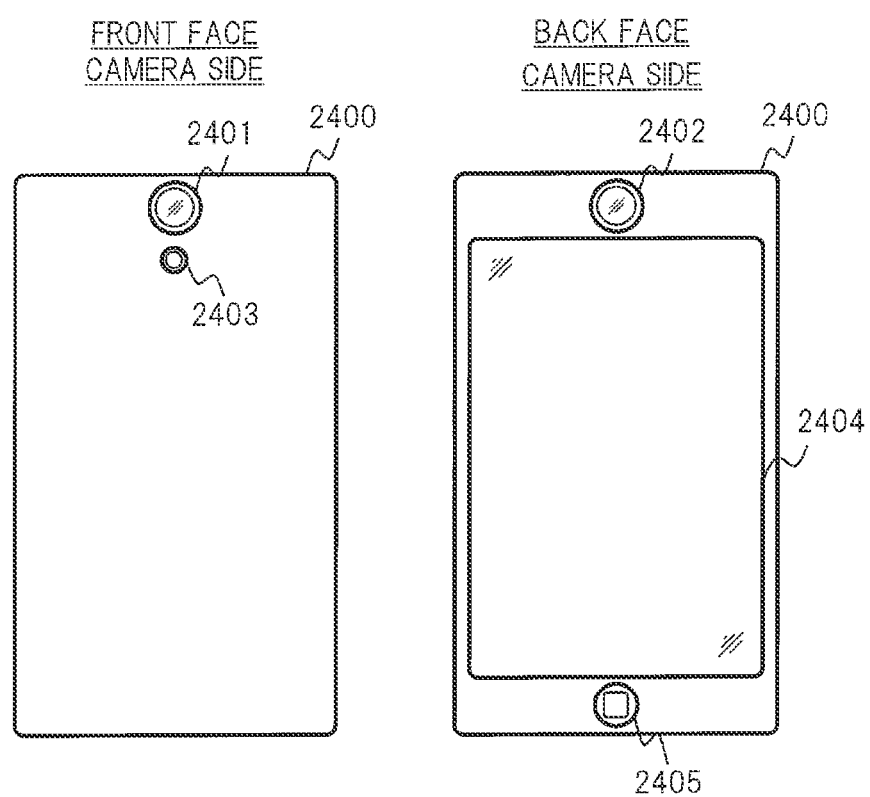
FIG. 24 is a diagram that shows an appearance configuration in the image capturing apparatus of the second embodiment.

FIG. 24 shows an appearance of a packaged example of the image capturing apparatus 1. In the present example, a smartphone is used as the image capturing apparatus 1. The left side of FIG. 24 shows a front face camera side of a package 2400 of the image capturing apparatus 1, and the right side shows a back face camera side thereof. On the front face camera side, a first lens 2401 is provided at a predetermined position of the package 2400, and a third lens 2403 is provided at a predetermined position. On the back face camera side, a second lens 2402 is provided at a predetermined position on an opposite side corresponding to the position of the first lens 2401 on the front face camera side. Moreover, on the back face camera side, a display screen 2404 of the display apparatus 104 and an operation button 2405 or the like are provided.

[Display Screen—Second Display Mode]

Figure 25:
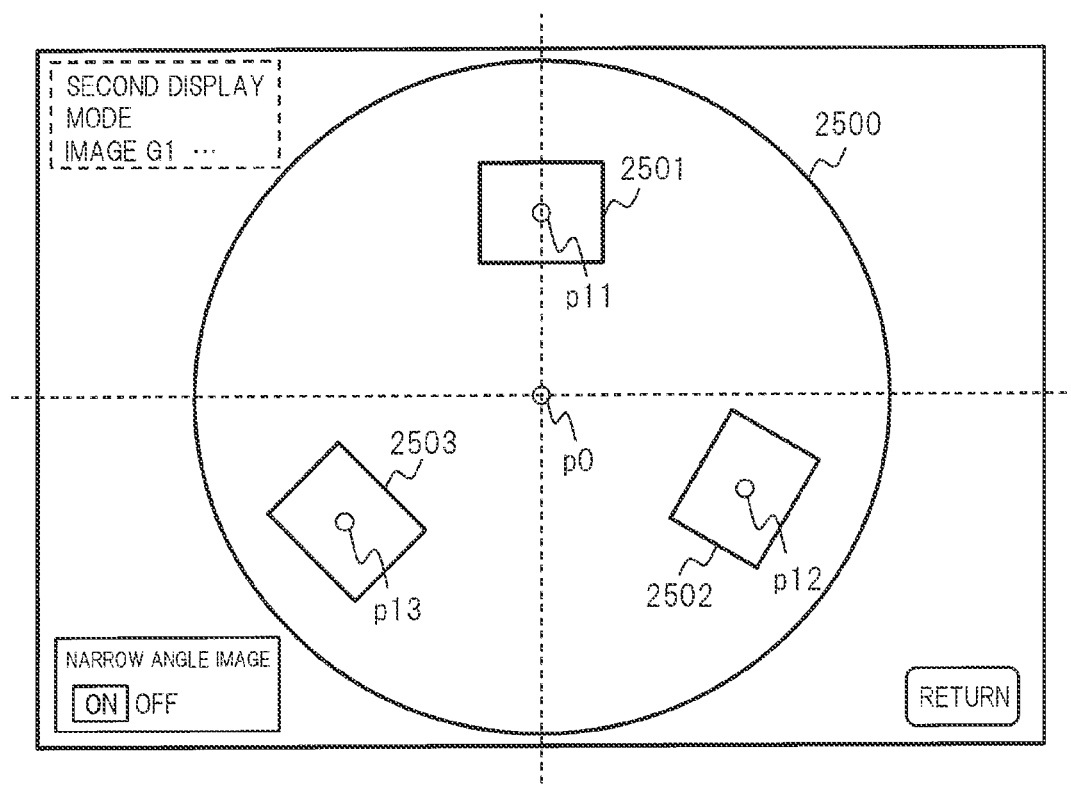
FIG. 25 is a diagram that shows a screen example of a second display mode in the image capturing apparatus of the second embodiment.

FIG. 25 shows an example of a second screen in a second display mode according to the second embodiment. The first screen in the first display mode is the same as that of the first embodiment, and can display information of the celestial sphere image and the narrow angle image as a list. When the celestial sphere image is selected and operated on the first screen in the first display mode, the display controller 12 displays the second screen in the second display mode as shown in FIG. 25.

The display controller 12 displays the celestial sphere image within the second screen as shown in a circular region 2500. First, the display controller 12 displays the region 2500 in a display state in which the photographing direction (azimuth angle and elevation angle: for example, a northward direction of FIG. 22) of the celestial sphere image is positioned at a center point p0. In accordance with a touch input operation by the user or the like, the operations such as scrolling and enlarging/shrinking or the like can be carried out to the region 2500 so as to change the display state in response to the viewing point change. For example, when the user carries out a swiping operation leftward within the region 2500, the display state within the region 2500 is updated so that the viewing point within the celestial sphere image is moved rightward, that is, moved in a positive direction in the horizontal angle of view. The controller 101 carries out an image process for changing the display state at this time. Note that the image process for changing the display state of the celestial sphere image is a related art. Moreover, particularly, the position of the viewing point in the first display state of the celestial sphere image may be set to 0° in the elevation angle, that is, to the horizontal direction, or may be set to 90°, that is, to a zenithal direction.

When there are narrow angle images that are associated with the celestial sphere image is present, the controller 101 displays the narrow angle images on the region 2500 of the celestial sphere image so as to be a predetermined graphic, a shrunk image or the like as similar to the first embodiment. The present example shows a case of display using a transparent frame. A case of three associated narrow angle images on the region 2500 of the celestial sphere image is shown. A transparent frame 2501 representing a first narrow angle image is placed at a point p11, a transparent frame 2502 representing a second narrow angle image is placed at a point p12, and a transparent frame 2503 representing a third narrow image is placed at a point p13. In accordance with a change in the display state within the region 2500 of the celestial sphere image, each position, shape, and size of the graphics of the narrow angle images or the like are also changed. Note that the regions of the narrow angle images corresponding to the transparent frames are disposed within the sphere surface of the celestial sphere, and therefore, each have a distorted shape in the circumferential direction, that is, each have an arc portion. In the present example, each transparent frame is simply shown as a rectangular shape.

Moreover, as similar to the first embodiment, based on a predetermined operation on the second screen in the second display mode, ON/OFF switching of the graphic display of the narrow angle image, the operation for returning to the first display mode or the like can be also carried out. When the graphic representing the narrow angle image is selected and operated on the second screen, the controller 101 displays the narrow angle image in detail in the third display mode as similar to the first embodiment.

[Effects, Etc.]

According to the second embodiment, when the celestial sphere image is displayed as the wide angle image, the narrow angle images having the predetermined relationship such as the same photographing place or the like are displayed in association with one another, and therefore, the user can easily recognize the relationship among the plurality of images, and can favorably view the images.

The following mode is available as a modified example of the second embodiment. The modified example may be a mode of capturing a semi-celestial sphere image having a range of an angle of view of 180° on the front side by eliminating the second image capture part 103B on the back face camera side but using the first image capture part 103A.

On the second screen in the second display mode, the region 2500 of the celestial sphere image may be displayed as not the circular shape but being converted into a rectangular region. In the rectangular region, an image corresponding to a part of the range of the angle of view of the celestial sphere image is displayed, and the display state is changed based on a user operation.

The image capturing apparatus 1 may capture the celestial sphere image inside itself, and take a narrow angle image captured by an external apparatus into itself, and carry out an association display operation. In contrast, the image capturing apparatus 1 may capture a narrow angle image inside itself, take a celestial sphere image captured by an external apparatus into itself, and carry out an association display operation. For example, the second image capturing apparatus 1B shown in FIG. 1 may capture a celestial sphere image, and acquire a narrow angle image captured by the first image capturing apparatus 1A and a narrow angle image registered in the server 3 into itself, and carry out an association display operation.

Note that an image having an angle of view of 360° has an angle of view in all directions regardless of the camera photographing direction. For this reason, it is not necessarily required to change the display direction within the display screen in accordance with the photographing direction. Therefore, when a motion image of the celestial sphere image is reproduced/displayed in the second display mode or the third display mode, the following two types of display methods may be selected. First, as similar to the reproducing/displaying of the narrow angle image, an image that changes in accordance with the photographing direction at the time of photographing is reproduced and displayed as it is. Alternatively, second, based on information of the photographing direction recorded in the metadata at the time of photographing a motion image, the image is rotated only by an angle corresponding to, for example, an azimuth angle so as to fix the image direction regardless of the photographing direction, and the image is reproduced and displayed in the fixed direction.

Moreover, regardless of whether the image is the motion image or the still image, when the image is displayed, the direction of the image capturing apparatus 1 (the same as the display apparatus 2) may be detected by using an image capture direction measuring part 111 and a position detecting part 113, and the image may be displayed so that the detected direction and the image photographing direction are made coincident with each other.

Third Embodiment

Figure 26:
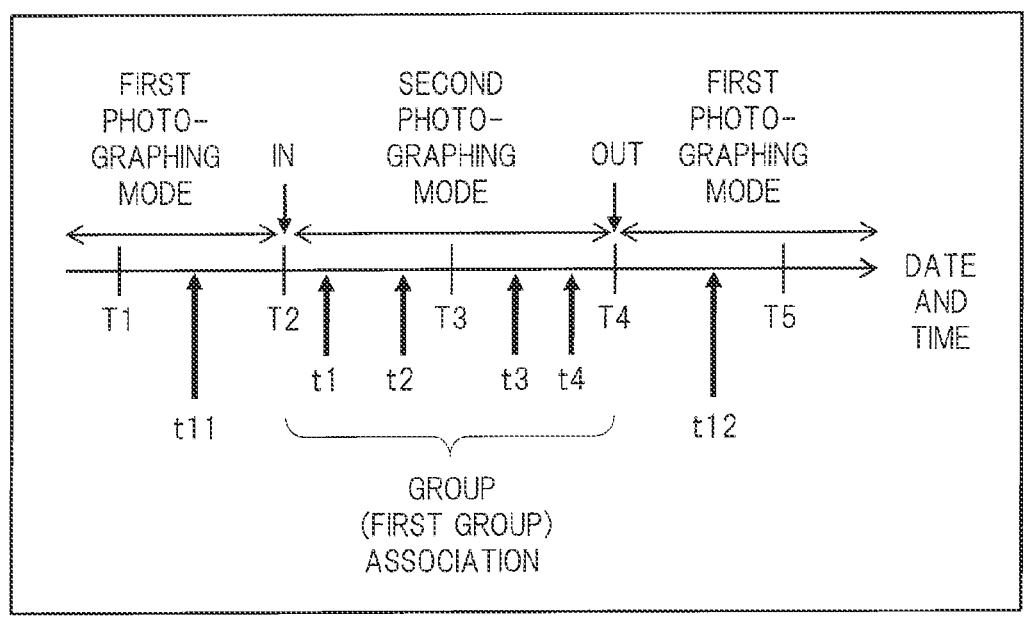
FIG. 26 is an explanatory diagram that shows a photographing mode in an image capturing apparatus according to a third embodiment of the present invention.

With reference to FIG. 26, an image capturing apparatus and a display apparatus according to the third embodiment of the present invention will be explained. Only parts in the configuration of the third embodiment that are different from those of the first embodiment will be explained below. The image capturing apparatus 1 of the third embodiment is provided with a unique photographing mode for association among a plurality of images.

[Photographing Mode]

The image capturing apparatus 1 of the third embodiment has a first photographing mode that is a normal photographing mode and a second photographing mode for use in carrying out an associating operation as photographing modes. Based on user input operation and user settings, the image capturing apparatus 1 switches the photographing modes. The user carries out a predetermined operation for switching the first photographing mode and the second photographing mode through the operation input part 105 or the like at an optional timing. As the predetermined operation, for example, a pushing down operation of a mode switching button may be applied.

FIG. 26 shows the switching of the photographing modes in a time axis or the like in the image capturing apparatus 1 of the third embodiment. First, the image capturing apparatus 1 is set to the state of the first photographing mode, and does not carry out the associating process to individual images captured in the first photographing mode. For example, the associating process is not carried out to an image captured at a moment t11, and its associating information is not written into the metadata 22 or the like.

The user switches the photographing mode from the first photographing mode to the second photographing mode at a desired timing such as a moment T2. In the state of the second photographing mode, the image capturing apparatus 1 automatically carries out the associating process to the individual images as a target that have been captured during a period. For example, the respective images are captured at moments t1 to t4 during the second photographing mode. The controller 101 carries out the associating process to the respective images by using the associating part 15, and writes the associating information into the metadata 22 or the management information 21. At this time, the associating part 15 associates the plurality of images with one another as a group. In the present example, the respective images at the moments t1 to t4 are associated with one another as a first group. The associating part 15 writes group identification information as one piece of the metadata 22 or the management information 21. The group identification information may be, for example, a character string using a starting date and time and a finishing date and time during the period of the second photographing mode, or a character string using the number of occurrences of the second photographing mode. Moreover, to each file name of these images and the metadata 22, a character string in combination of the group identification information and the photographing date and time and an order number of each image may be added.

The user carries out the switching operation to change from the second photographing mode to the first photographing mode at a desired timing such as a moment T4. The image capturing apparatus 1 does not carry out the associating process to the individual images captured in the first photographing mode, for example, the image captured at a moment t12. The controller 101 may carry out the associating process at a moment at which the photographing mode returns to the first photographing mode.

Moreover, the associating part 15 determines types of a plurality of images captured during the period of the second photographing mode as the wide angle image or the narrow angle image. When there is only either the wide angle image or the narrow angle image, the associating part 15 does not carry out the associating process. When there are both of the wide angle image and the narrow angle image, the associating part 15 associates the second image that is the narrow angle image with the first image that is the wide angle image.

At the time of a reproducing/displaying process, with reference to the image files 24 and the group identification information in the management information 21 or the like, the display controller 12 checks the associating state, and carries out the association display.

[Effects, Etc.]

According to the third embodiment, the user can easily switch the photographing mode, and carry out the associating process based on the determination of the user himself/herself. The third embodiment corresponds to a mode automating the determination relating to the photographing date and time in the above-described second selection system by using the unique photographing mode.

As a modified example of the third embodiment, the following mode is possible. The image capturing apparatus 1 automatically switches the photographing mode in accordance with the determination. At the time of imaging, the image capturing apparatus 1 determines the type of the angle of view of the image, for example, classification of the type into the wide angle or the narrow angle. Then, when the captured image is a wide angle image, the image capturing apparatus 1 automatically switches the photographing mode from the first photographing mode to the second photographing mode. The image capturing apparatus 1 determines a narrow angle image captured in the second photographing mode, and associates this narrow angle image with the first wide angle image. After elapse of predetermined time based on settings from, for example, the start of the second photographing mode, the image capturing apparatus 1 returns the photographing mode from the second photographing mode to the first photographing mode.

Fourth Embodiment

With reference to FIG. 27 to FIG. 45, an image capturing apparatus and a display apparatus according to a fourth embodiment of the present invention will be explained. The basic configuration of the fourth embodiment is the same as that of the first embodiment. The image capturing apparatus and the display apparatus of the fourth embodiment have functions for displaying a plurality of images having different photographing directions and angles of view at the time of imaging so as to be associated with one another.

[Image Capturing and Display System, Image Capturing Apparatus, Display Apparatus]

A configuration of an image capturing and display system constituted by an image capturing apparatus and a display apparatus of the fourth embodiment is the same as that shown in the above-described FIG. 1. The configuration of the image capturing apparatus 1 of the fourth embodiment is the same as that shown in the above-described FIG. 2. The configuration of the display apparatus 2 of the fourth embodiment is the same as that shown in the above-described FIG. 3. The configuration example of the appearance of the image capturing apparatus 1 is the same as that shown in the above-described FIG. 4. The image capturing apparatus 1 will be mainly explained as a main apparatus below. However, functions and operations other than those relating to the image capture process can be similarly achieved even when the display apparatus 2 is used as the main apparatus.

[Management Information and Image File]

FIG. 5 described above shows configuration examples of the management information 21 and the image file 24 in the storage 102. For example, the types of images include two types, that is, a wide angle image and a narrow angle image. A reference identifier may be a group identifier to which the first image and the second image belong. Regarding the rotational angle, in a case of so-called lateral photographing, the rotation angle is in a state close to 0 degree based on the standard state. In a case of an image having a horizontal angle of view larger than a vertical angle of view as a ratio of the angle of view, the image is a laterally long image. In a case of so-called longitudinal photographing, the rotation angle is in a state close to 90 degrees based on the standard state.

[Management of Relationship Among Plurality of Images]

Figure 27:
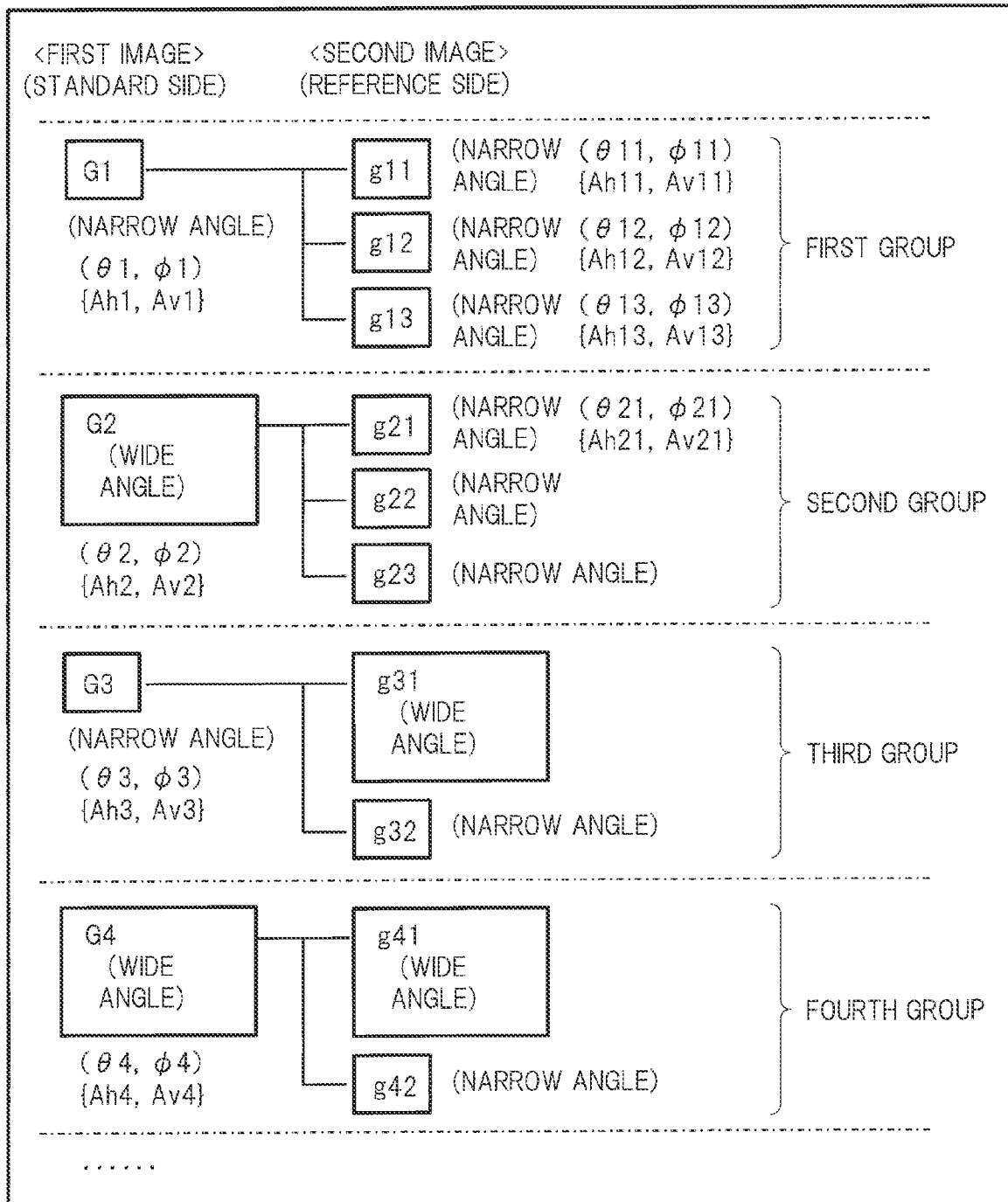
FIG. 27 is a diagram that shows managements in a relationship among a plurality of images in an image capturing apparatus of a fourth embodiment.

FIG. 27 shows an associating management relating to a relationship among a plurality of images. The controller 101 manages the relationship as shown in FIG. 27 in, for example, the associating management information of the management information 21 shown in FIG. 5. In the fourth embodiment, for convenience of explanation, it is supposed that a standard side image is a first image, and that a reference side image having a relationship with the first image is a second image. In the example of FIG. 27, as the first images, images G1, G2, G3, G4, etc., are prepared (note that the images are different from the image G1, etc., as the example of the first embodiment). The first image is the wide angle image in some cases, and is the narrow angle image in other cases. The second image is the wide angle image in some cases, and is the narrow angle image in other cases.

The image G1 is the narrow angle image whose type is the "narrow angle", and has an azimuth angle θ1, an elevation angle φ1, a horizontal angle of view Ah1, and a vertical angle of view Av1, etc. As the second images associated with image G1, image g11, image g12, and image g13 are prepared. The images g11, g12 and g13 are narrow angle images whose types are narrow angles. For example, image g11 has an azimuth angle 11, an elevation angle φ11, a horizontal angle of view Ah11, and a vertical angle of view Av11, etc. These image G1 as well as images g11, g12 and g13 are associated with one another as a plurality of images having a predetermined relationship. These images are associated with one another as an image group belonging to the same image group such as a first group.

The image G2 is a wide angle image whose type is "wide angle", and has an azimuth angle θ2, an elevation angle φ2, a horizontal angle of view Ah2, and a vertical angle of view Av2, etc. As the second images associated with the image G2, images g21, g22 and g23 are prepared. The images g21, g22 and g23 are narrow angle images. For example, the image g21 has an azimuth angle θ21, an elevation angle ϕ21, a horizontal angle of view Ah21, and a vertical angle of view Av21, etc. These images belong to a second group.

The image G3 is a narrow angle image, and has an azimuth angle θ3, an elevation angle ϕ3, a horizontal angle of view Ah3 and a vertical angle of view Av3, etc. As the second images associated with the image G3, images g31 and g32 are prepared. The image g31 is a wide angle image, and the image g32 is a narrow angle image. These images belong to a third group.

The image G4 is a wide angle image, and has an azimuth angle θ4, an elevation angle ϕ4, a horizontal angle of view Ah4 and a vertical angle of view Av4, etc. As the second images associated with the image G4, images g41 and g42 are prepared. The image g41 is a wide angle image, and the image g42 is a narrow angle image. These images belong to a fourth group.

For example, when the image g11 is regarded as the standard side first image, note that the image G1 becomes the reference side second image. Moreover, in some cases, for example, the image g11 is set to the standard side first image, still another image is associated with this image g11 as the second image.

As an example of the associating information, an image file name of each of the second images is used as a reference identifier included in the image file of the first image. Moreover, an image file name of the first image is used as a reference identifier included in the image file of each of the second images. Furthermore, a group identifier is used as a reference identifier included in each of the associated images. In this manner, images having a relationship can be mutually referred to one another.

As one display mode, note that information representing a relationship among a plurality of image as shown in FIG. 27 may be displayed on the display screen. In this case, as shown in FIG. 27, the first image and the second images may be displayed as a tree structure, or the images may be displayed so that nodes of the second images are connected around the node of the first image by link lines although not illustrated.

[Photographing Direction and Angle of View of Image]

Figure 28:
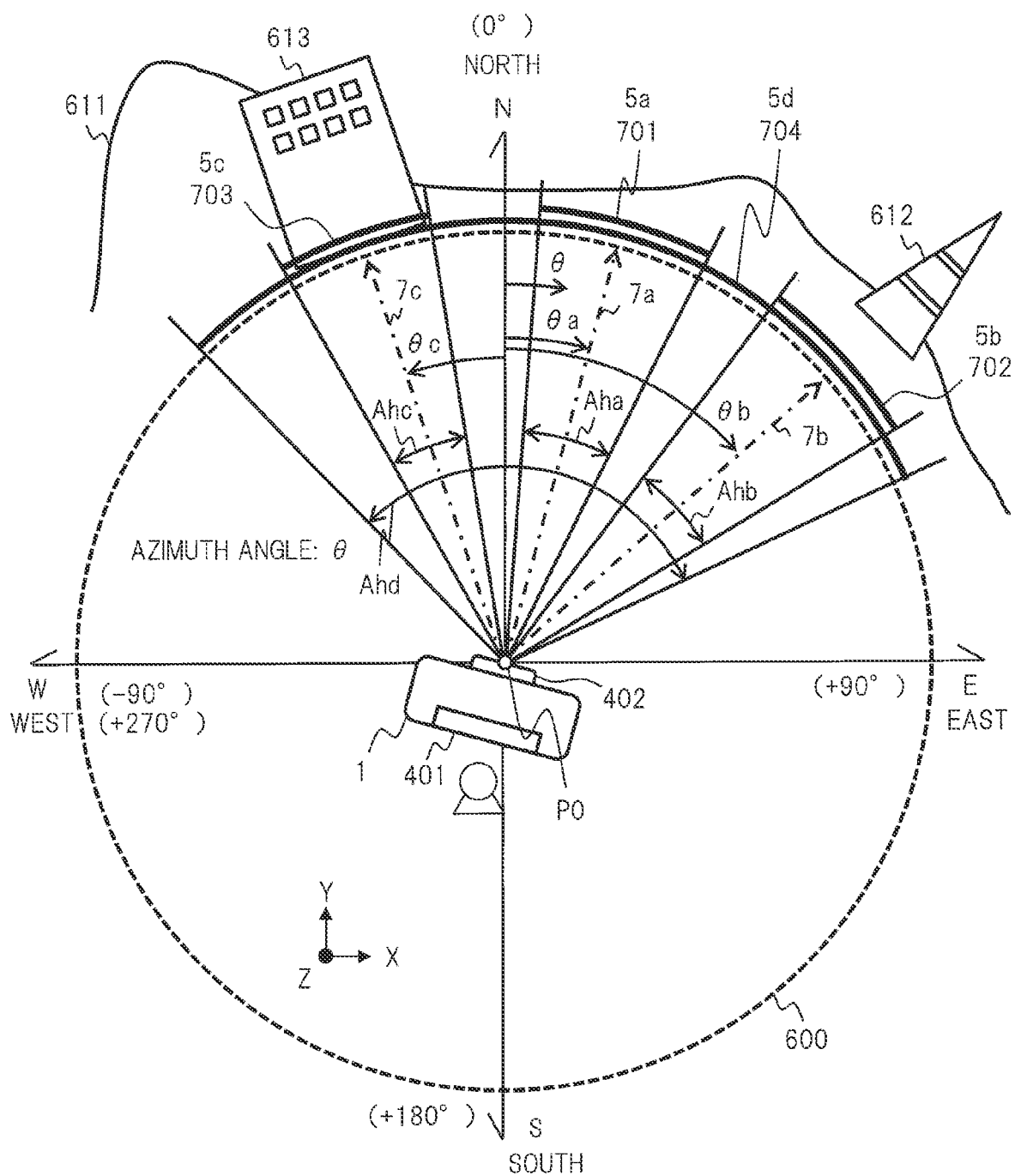
FIG. 28 is an explanatory diagram that shows a photographing direction and an angle of view, particularly, azimuth angle and horizontal angle of view relating to a plurality of images in the image capturing apparatus of the fourth embodiment.

FIG. 28 schematically shows a concept of a relationship in a photographing direction and an angle of view between a wide angle image and a narrow angle image, as a specific example of a plurality of images. FIG. 28 particularly shows an azimuth angle and a horizontal angle of view. In the present example, images 5a, 5b, 5c and 5d are provided. The images 5a, 5b and 5c are narrow angle images, and the image 5d is a wide angle image. It is supposed that these images have been photographed by the user using the image capturing apparatus 1 at a point PO serving as a photographing point that is the same place. It is supposed that the respective images have been photographed on, for example, dates and time that are close to one another in an order of the image 5d, the image 5a, the image 5b and the image 5c. The photographing dates and times of the respective images are, for example, the image 5d has been photographed at 1:10:00 pm on Jan. 5, 2016, the image 5a has been photographed at 1:11:30 pm on the same date, the image 5b has been photographed at 1:14:40 pm on the same date, and the image 5c has been photographed at 1:15:50 pm on the same date.

The image 5a has a photographing direction 7a indicated by an azimuth angle θa, and a photographing range 701 corresponding to a horizontal angle of view Aha. The image 5b has a photographing direction 7b indicated by an azimuth angle θb, and a photographing range 702 corresponding to a horizontal angle of view Ahb. The image 5c has a photographing direction 7c indicated by an azimuth angle θc, and a photographing range 703 corresponding to a horizontal angle of view Ahc. The image 5d has the same photographing direction as the photographing direction 7a of the image 5a, and a photographing range 704 corresponding to a horizontal angle of view Ahd. In FIG. 28, among the photographing directions of images, the photographing direction defined by an azimuth angle θ is shown by a one dot chain line.

The photographing range 701 shown by an arc on a sphere 600 shows a part corresponding to the horizontal angle of view Aha of the image 5a, and corresponds to a region projected on the sphere 600 and viewed from a point PG. The image 5b is an image example in which a tower 612 has been photographed, and the image 5c is an image example in which a building 613 is has been photographed.

A specific example of values of the azimuth angle θ, the elevation angle ϕ, the horizontal angle of view Ah and the vertical angle of view Av of each image is as follows. It is supposed that the image 5a has an azimuth angle θa, an elevation angle ϕ a, a horizontal angle of view Aha and a vertical angle of view Ava, the image 5b has an azimuth angle θb, an elevation angle ϕ b, a horizontal angle of view Ahb and a vertical angle of view Avb, and the image 5c has an azimuth angle θc, an elevation angle ϕ c, a horizontal angle of view Ahc and a vertical angle of view Avc. Moreover, it is supposed that the image 5d has an azimuth angle θd=θa, an elevation angle ϕd=ϕa, a horizontal angle of view Ahd and a vertical angle of view Avd.

$$\theta a = +10°, \phi a = 0°, Aha = 21°, Ava = 14°$$

$$\theta b = +45°, \phi b = 0°, Ahb = 21°, Avb = 14°$$

$$\theta c = -20°, \phi c = -10°, Ahc = 21°, Avc = 14°$$

$$\theta d = +10°, \phi d = 0°, Ahd = 120°, Avd = 80°$$

Figure 29:
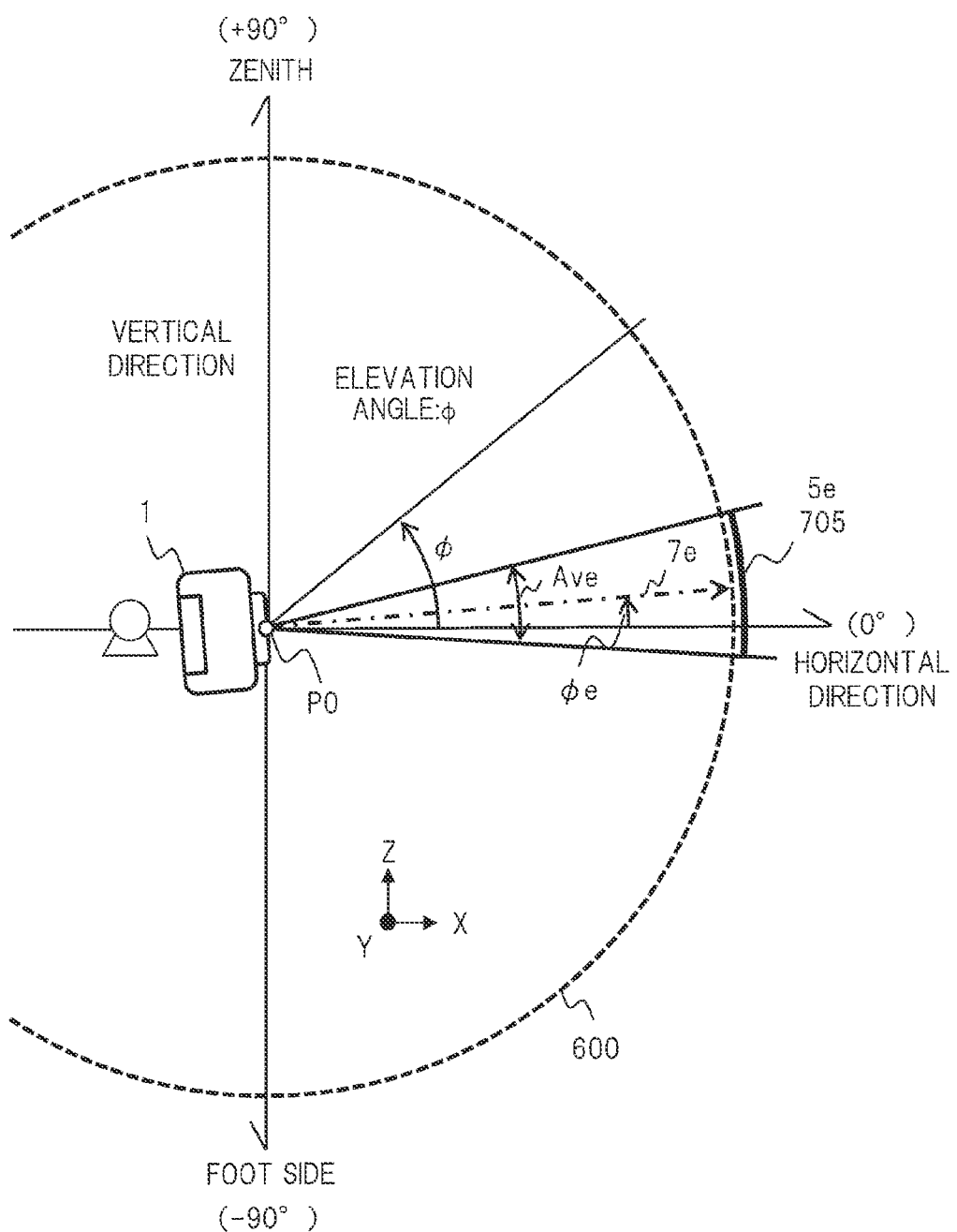
FIG. 29 is an explanatory diagram that shows, particularly, elevation angle and vertical angle of view in the image capturing apparatus of the fourth embodiment.

FIG. 29 is an explanatory diagram that particularly shows an elevation angle ϕ and a vertical angle of view Av as similar to FIG. 28. FIG. 29 shows an example of a narrow angle image that is a different image 5e. It is supposed that the image 5e has an azimuth angle θe, an elevation angle ϕ e, a horizontal angle of view Ahe and a vertical angle of view Ave. A photographing range 705 corresponding to the vertical angle of view Ave of the image 5e is shown. As a photographing direction 7e of the image 5e, a part corresponding to the elevation angle ϕ e is shown.

[Display Screen—Display Mode]

Figure 30:
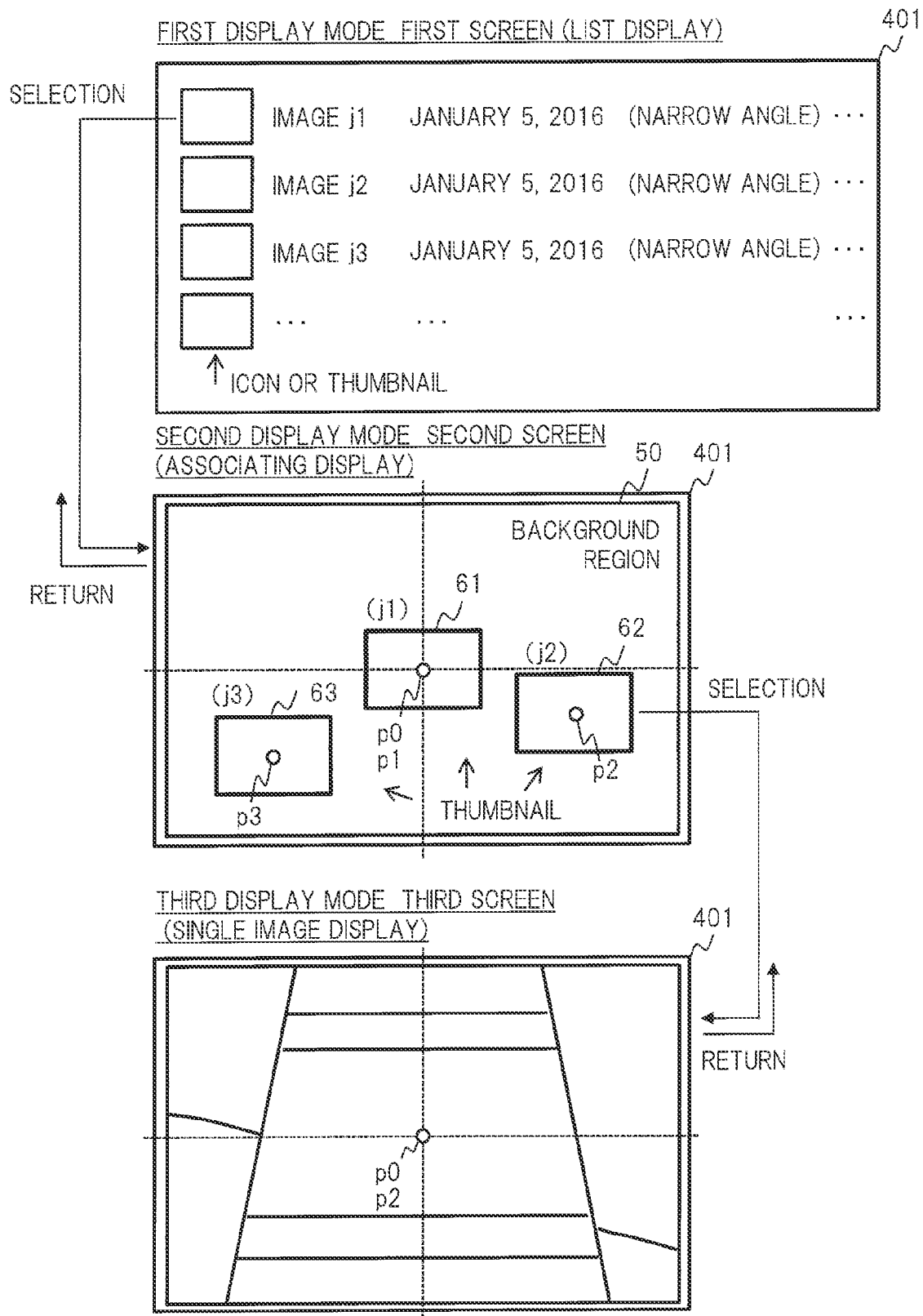
FIG. 30 is a diagram that shows a transition of a display mode on a display screen in the image capturing apparatus of the fourth embodiment.

FIG. 30 shows a display mode of a display screen 401 of a display part 41 and its transition. The image capturing apparatus 1 has at least a first display mode, a second display mode and a third display mode as display modes corresponding to reproducing/displaying modes. For example, the image capturing apparatus 1 displays the first display mode first, and switches the display mode based on a user operation. After the photographing or at the time of reproducing/displaying, the image capturing apparatus 1 makes association among a plurality of images based on the determination on a photographing place, photographing date and time of an image or the like and the determination on the photographing direction, the angle of view or the like, sets a group to the plurality of images, and forms the associating management information. At the time of reproducing/displaying the image, the image capturing apparatus 1 displays a plurality of images having a relationship in the same group based on the metadata 22 (at least the photographing direction information) and the associating management information within the display screen 401 so as to be associated as described below.

[First Display Mode—First Screen]

The first display mode is a mode for list display relating to information of all the images, which is a mode displaying a folding screen. On the first screen in the first display mode, information of a plurality of images in a folder is displayed as a list in an order of, for example, the file name, the date and time, or the like as a key item. In the present example, respective pieces of information of images j1, j2, j3 and the like serving as the plurality of images are displayed as a list in an order from an upper side. In a row for each image, an icon, a thumbnail, a file name, photographing date and time or a type of the image or other information is displayed. In the present example, each type of the images j1, j2 and j3 is a narrow angle. As other information, an attribute value such as a photographing direction {azimuth angle $\theta$, elevation angle $\phi$} or an angle of view {horizontal angle of view Ah, vertical angle of view Av} or the like may be displayed. The first screen may be not limited to such a folder screen, and various publicly-known systems may be used. For example, the first screen can be a screen or the like on which thumbnails of a plurality of images are disposed in parallel and displayed in a predetermined direction or in a two-dimensional form such as lateral and longitudinal directions.

On the first screen, a desired first image such as the image j1 is selected and operated by the user. It is supposed that the image j1 corresponds to the image G1 in FIG. 27 or the image 5a in FIG. 28. When there is a second image to be associated with the selected first image, the image capturing apparatus 1 transits the screen to the second screen in the second display mode. It is supposed that, for example, the images j2, j3 and the like are associated with the image j1. It is supposed that the images j2, j3 and the like correspond to the images g11 and g12 in FIG. 27 and the images 5b and 5c in FIG. 28. A relationship among the images j1 to j3 corresponds to the first group of FIG. 27.

[Second Display Mode—Second Screen (1)—Thumbnail, First Group]

The second display mode is a unique mode for association display among a plurality of images. The display controller 12 displays the second screen based on the image file 24 and the management information 21. On the second screen in the second display mode, first, a predetermined background region 50 is formed as a whole. The background region 50 is a black color region or the like, which can be set by the user. The background region 50 has sizes larger than the longitudinal and lateral sizes of the display screen 401, and has a sufficiently large size including a range of angles of view of a plurality of images.

The display controller 12 displays a plurality of images having a relationship so as to be associated with one another on the background region 50 within the display screen 401. The center points of the display screen 401 and the background region 50 are set to a point p0. At the point p0 on the background region 50, a graphic 61 indicating the image j1 that is the selected first image is displayed. A center point p1 of the graphic 61 is disposed at the point p0. In the fourth embodiment, the graphic 61 of the first image is a thumbnail. Around the graphic 61 of the image j1 on the background region 50, a graphic 62 indicating the image j2 and a graphic 63 indicating the image j3 are displayed as graphics indicating the second images having a relationship. A center point p2 of the graphic 62 and a center point p3 of the graphic 63 are shown. The graphic 62 and the graphic 63 that are the second images are, for example, thumbnails. The display position of the graphic 62 that is the second image or the like is determined with reference to the display position of the graphic 61 that is the first image in accordance with the relationship of the photographing direction and the angle of view. Moreover, the display size of each thumbnail is determined to a size depending on the angle of view.

On the second screen, the display mode can be changed by an operation such as scrolling, enlarging/shrinking or the like, in accordance with the user's operation. For example, by an operation such as swiping or the like within the second screen, the images can be scrolled or enlarged/shrunk within a range corresponding to the background region 50. At the time of changing the display state, a positional relationship among the plurality of images or the like can be maintained.

On the second screen, the graphic of the desired first image or second image is selected and operated by the user. The selecting operation is such as tapping on the graphic or the like. In this case, the image capturing apparatus 1 transits the screen to a third screen in a third display mode for displaying the selected image. The present example shows a case of selection of the graphic 62 of the image j2 that is the second image. Moreover, when a predetermined operation for returning to the first display mode is carried out on the second screen, the image capturing apparatus 1 returns the screen to the first screen in the first display mode. A predetermined operation is such as input for assigning the first display mode, pushing down of a return button, tapping on the background region 50 or the like.

In this manner, on the second screen, a plurality of images having a relationship are displayed in the thumbnail state so that a relationship including a mutual positional relationship, a photographing direction, an angle of view or the like is clearly recognized. The user can intuitively recognize the relationship among the plurality of images, and easily refer to the second image from the first image. Note that the center points and center lines or the like that are illustrated for explanation are not displayed. However, they may be displayed within the screens as viewing auxiliary information.

[Third Display Mode—Third Screen]

The third display mode is a mode for detailed display relating to a narrow angle image or a wide angle image that is an assigned single image. The present example shows an example of enlarged display of the image j2 that is a narrow angle image on the third screen as a whole. A single wide angle image can be similarly displayed as well. First, a display is carried out in a state in which a center point p2 corresponding to a photographing direction ($\theta$, $\phi$) of the image j2 serving as a target image is disposed at a center point p0 of the display screen 401. When the entire image cannot be displayed within the display screen 401, the display controller 12 may display a part of the image, that is, the image may be displayed as a part of the angle of view, or displayed so that the image is shrunk to be entirely fitted within the screen. On the third screen, the display state may be changed by scrolling, enlarging/shrinking or the like in accordance with the user's operation. In the display case of the wide angle image, when the entire wide angle image cannot be displayed, a part of the wide angle image is displayed first so that the photographing direction of the wide angle image coincides with the point p0, and then, the display state is changed in accordance with the scrolling or the like. Similarly, when the graphic 61 of the image j1 that is the first image is selected on the second screen, the image capturing apparatus 1 carries out the detailed display of only the image j1 on the third screen. When a predetermined operation such as input for assigning the second display mode, pushing down of a return button, tapping on the image region or the like is carried out on the third screen, the image capturing apparatus 1 returns the screen to the second screen in the second display mode. Note that this process is not limited to the transition from the second display mode to the third display mode.

[Second Display Mode—Second Screen (2)—Mark]

Figure 31:
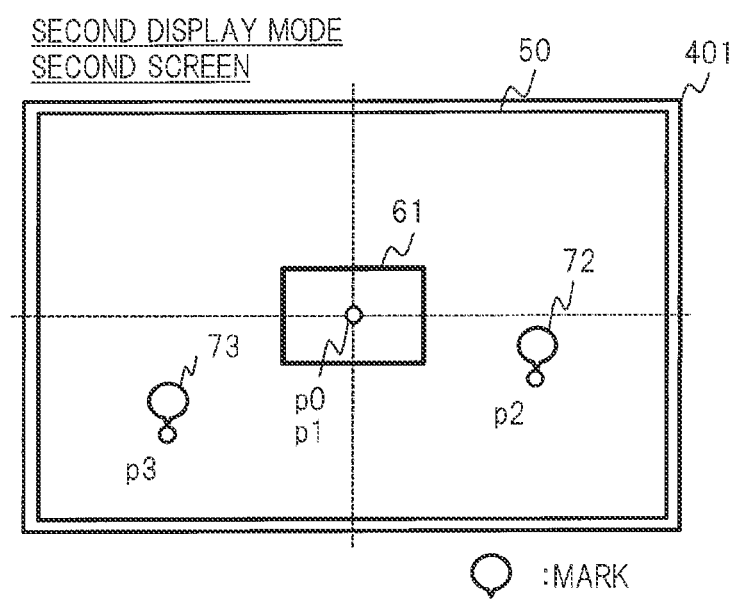
FIG. 31 is a diagram that shows a screen example of a second display mode in an image capturing apparatus according to a modified example of the fourth embodiment.

FIG. 31 shows another display example of the second screen in the second display mode as a modified example. On this second screen, it is assumed that the graphic 61 of the first image is similarly a thumbnail, and that a graphic indicating the second image is a predetermined mark. A case of a word balloon shape is particularly shown as the mark. The mark is variable based on user's setting. For example, a mark 72 indicating the image j2 is displayed at a center point p2, and a mark 73 indicating the image j3 is displayed at a center point p3. When the user selects and operates a mark, an image corresponding to this mark is displayed on the third screen in the third display mode. Alternatively, in accordance with the user's selection/operation of the mark, a thumbnail or the like may be displayed at a position of the mark. The display position of each mark is determined in accordance with the photographing direction (azimuth angle θ, elevation angle ϕ) of the image. In such a mode as displaying the mark, the screen display contents are simplified.

[Second Display Mode—Second Screen (2)—Transparent Frame]

Figure 32:
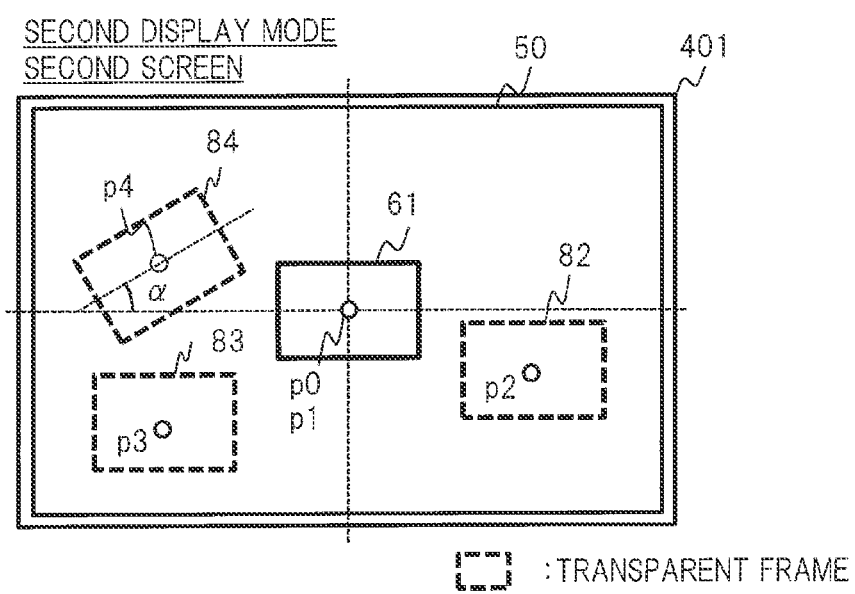
FIG. 32 is a diagram that shows a screen example of the second display mode in the image capturing apparatus according to a modified example of the fourth embodiment.

FIG. 32 shows another display example of a second screen in the second display mode as a modified example. On this second screen, it is assumed that the graphic 61 of the first image is similarly a thumbnail, and that a graphic indicating the second image is a transparent frame. As the transparent frame, four sides of a rectangular shape are displayed with a line and a color, and an inside of the transparent frame is a transparent region so that a background region 50 is displayed as it is. For example, a transparent frame 82 indicating the image j2 is displayed at a center point p2, and a transparent frame 83 indicating the image j3 is displayed at a center point p3. When the user selects and operates a transparent frame, an image corresponding to this transparent frame is displayed on the third screen in the third display mode. Alternatively, in accordance with the user's selection/operation of the transparent frame, a thumbnail or the like may be displayed at a position of the transparent frame. The display position of each transparent frame is determined in accordance with the photographing direction of the image, a display size of the transparent frame is determined in accordance with an angle of view of the image.

When the enlarging/shrinking process or the like is carried out on the second screen, the display controller 12 updates the display sizes of the thumbnail and the transparent frame so as to correspond to the display state after the change. In the mode in which the thumbnail and the transparent frame are displayed as described above, a relationship in the angle of view among the plurality of images can be easily recognized.

Moreover, as an example relating to a rotation angle of the second image, FIG. 32 shows a transparent frame 84 representing a narrow angle image located at a point p4. This narrow angle image has an angle α relative to the x-direction as the rotation angle. Furthermore, the display controller 12 may switch a display state in response to a predetermined operation on a graphic of the second image, for example, double tapping or the like, within the second screen, so as to bring the second image to the center of the display screen 401 as a new first image, or may further refer to and display a new second image in addition to the switching.

[Second Display Mode—Second Screen (4)—Second Group]

Figure 33:
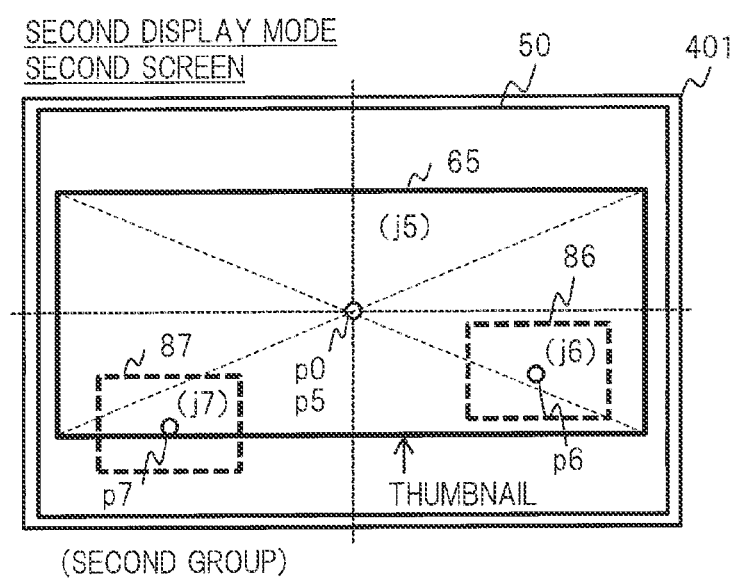
FIG. 33 is a diagram that shows another image example of the second display mode screen in the image capturing apparatus of the fourth embodiment.

FIG. 33 shows a case of other plurality of images as another display example of the second screen. In the present example, an image j5 that is the first image selected on the first screen is a wide angle image. Image j6 and image j7 are prepared as the second images that are associated with the first image, and are narrow angle images. A relationship among the plurality of images in the present example corresponds to the second group of FIG. 27.

A thumbnail that is a graphic 65 indicating the image j5 is displayed so that a center point p5 corresponding to the photographing direction of the image j5 is placed at a center point p0 on the background region 50. The display size of the thumbnail that is the graphic 65 is determined in accordance with the angle of view of the wide angle image. The present example shows a case in which the entire thumbnail that is the graphic 65 is fitted within the display screen 401 and the background region 50. When the entire thumbnail that is the graphic 65 cannot be fitted therein, a part of the thumbnail corresponding to a part of the angle of view of the wide angle image is displayed. The entire thumbnail that is the graphic 65 can be displayed by the scrolling process or the like.

On the graphic 65, a transparent frame 86 that is a graphic indicating the image j6 is displayed at a center point p6 so as to be overlapped thereon, and a transparent frame 87 that is a graphic indicating the image j7 is displayed at a center point p7 so as to be overlapped thereon. In this manner, even when the first image has a wide angle and the second image has a narrow angle, the relationship among the plurality of images can be recognized on the second screen.

[Second Display Mode—Second Screen (5)—Third Group]

Figure 34:
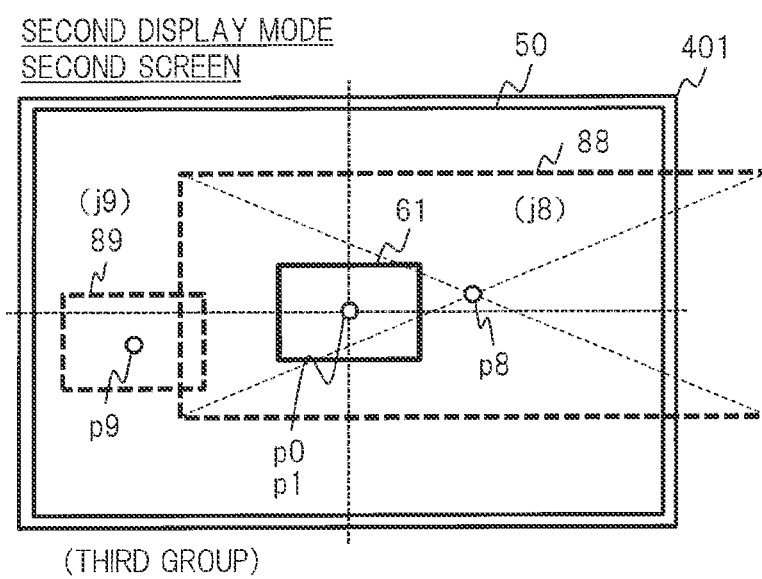
FIG. 34 is a diagram that shows still another image example of the second display mode screen in the image capturing apparatus of the fourth embodiment.

FIG. 34 shows a case of other image as another display example of the second screen. In the present example, an image j1 that is the first image selected on the first screen is a narrow angle image. Image j8 and image j9 are prepared as the second images that are associated with the first image, and the image j8 is a wide angle image. A relationship among the plurality of images in the present example corresponds to the third group of FIG. 27.

A thumbnail that is a graphic 61 indicating the image j1 is displayed at a center point p0 on the background region 50. A transparent frame 88 that is a graphic indicating the image j8 is displayed at a center point p8 on the background region 50. A transparent frame 89 that is a graphic indicating the image j9 is displayed at a center point p9. In the present example, on the outside of the thumbnail that is the image j1, the transparent frame 88 that is the image j8 is expanded. A case in which the transparent frame 88 that is the image j8 cannot be fitted within the display screen 401 and is partially displayed on the background region 50 is shown. Other part of the transparent frame 88 can be displayed by the scrolling process or the like. In this manner, even when the first image has a narrow angle and the second image has a wide angle, the relationship among the plurality of images can be recognized on the second screen.

[Second Display Mode—Second Screen (6)—Fourth Group]

Figure 35:
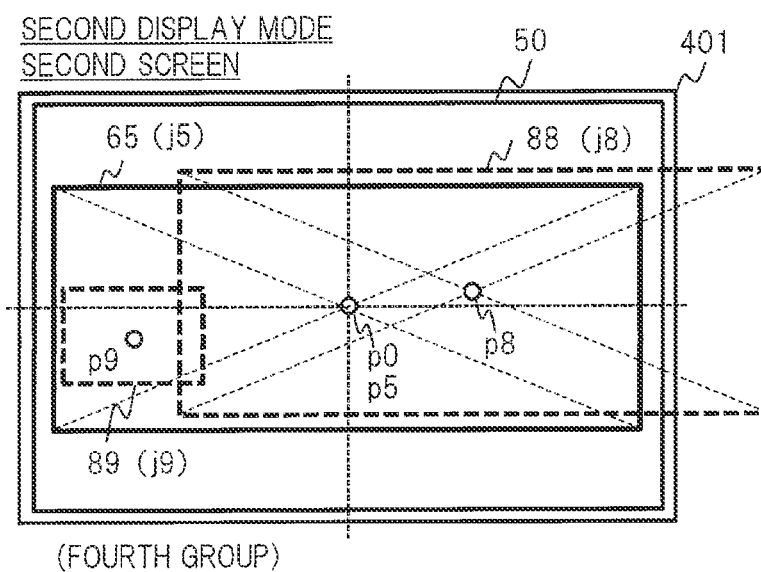
FIG. 35 is a diagram that shows still another image example of the second display mode screen in the image capturing apparatus of the fourth embodiment.

FIG. 35 shows a case of other image as still another display example of the second screen. In the present example, an image j5 that is the first image selected on the first screen is a wide angle image. Image j8 and image j9 are prepared as the second images that are associated with the first image, and the image j8 is a wide angle image. A relationship among the plurality of images in the present example corresponds to the fourth group of FIG. 27.

A thumbnail that is a graphic 65 indicating the image j5 is displayed at a center point p0 on the background region 50. A transparent frame 88 that is a graphic indicating the image j8 is displayed at a center point p8 on the background region 50. In the present example, the thumbnail that is the image j5 and the transparent frame 88 that is the image j8 are partially overlapped each other. A case in which the transparent frame 88 that is the image j8 cannot be fitted within the display screen 401 and is partially displayed on the background region 50 is shown. In this manner, even when both the first image and the second image have wide angles, the relationship among the plurality of images can be recognized on the second screen.

[Second Display Mode—Second Screen (7)—Scrolling]

Figure 36:
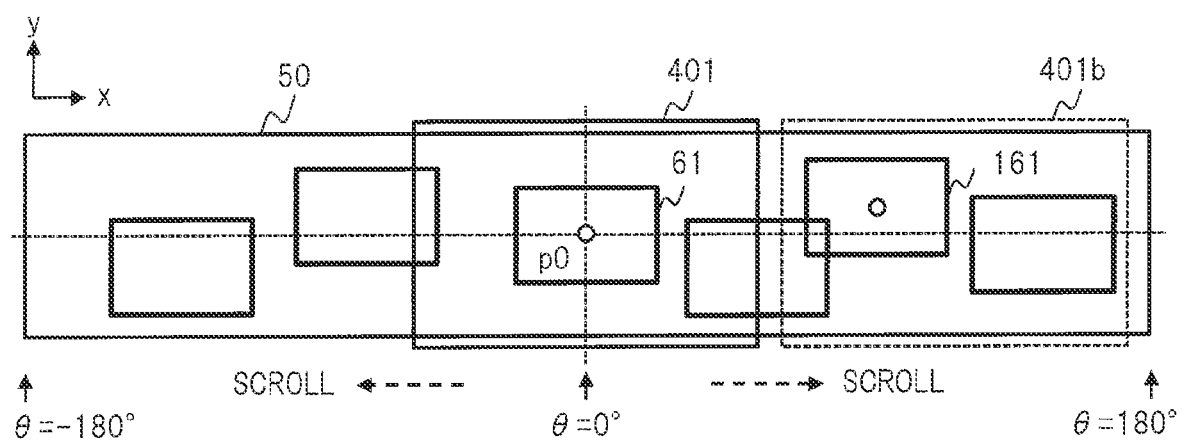
FIG. 36 is a diagram that shows a scrolling process, etc., of the second display mode screen in the image capturing apparatus of the fourth embodiment.

FIG. 36 shows a scrolling example as still another example of the second screen in the second display mode. On this second screen, the background region 50 has a width in the x-direction corresponding to a range of 360° as an azimuth angle θ and a horizontal angle of view Ah. A part corresponding to a part of the angle of view range of the background region 50 is displayed within the display screen 401, and the display state thereof can be changed by a scrolling process in the x-direction or the like. On the background region 50, a plurality of images are disposed at positions corresponding to the photographing direction and the angle of view. First, a graphic 61 of the first image is disposed at a point p0 and displayed. The right end of the background region 50 of FIG. 36 corresponds to θ=180° while the left end thereof corresponds to −180°. The right and left ends may be connected to each other so that the display is looped. A display screen 401b shows an example after the scrolling in the x-direction. Thus, on the display screen 401b, a graphic of an image included in a part of the background region 50 such as a graphic 161 is displayed.

[Second Display Mode—Second Screen (8)—Enlarging/Shrinking]

FIG. 37 shows an enlarging/shrinking example as still another example of the second screen in the second display mode. An upper side of FIG. 37 shows a state before the enlarging while a lower side thereof shows a state after the enlarging. A thumbnail is displayed as a graphic 1701 of an image r1 that is the first image at a center point p0 on the background region 50. As the second images that are associated with the first image, for example, images r2, r3 and r4 are prepared. The image r2 is a wide angle image having the same photographing direction as that of the image r1, and the transparent frame thereof is disposed as a graphic 1702 at a point p0. The image r3 is a narrow angle image having a photographing direction close to that of the image r1, and a graphic 1703 thereof is disposed at a center point pr3. Since an overlapping part of the image r3 with the thumbnail of the first image becomes larger, the graphic 1703 of the image r3 is prepared as the transparent frame. At a center point pr4, the transparent frame is disposed as a graphic 1704 of the image r4. The display size of each graphic is determined based on the angle of view and the enlarging/shrinking rate.

From the above-described state, in accordance with a pinching operation or the like by the user, a desired part is enlarged and displayed. An enlarged part is shown by a frame 1700. On the second screen on the lower side, the part corresponding to the frame 1700 is displayed on the entire display screen 401. Each image is enlarged and displayed while the relationship in the angle of view or the like is maintained. The graphic 1701 of the image r1 is displayed as not the thumbnail but an enlarged image 1701b by the enlarging process. The enlarged image 1701b is generated based on the original image data 23 or the thumbnail of the image r1, or is generated by using the original image data 23 in a case of high definition display.

[Second Display Mode—Second Screen (9)—Celestial Sphere Background]

Figure 38:
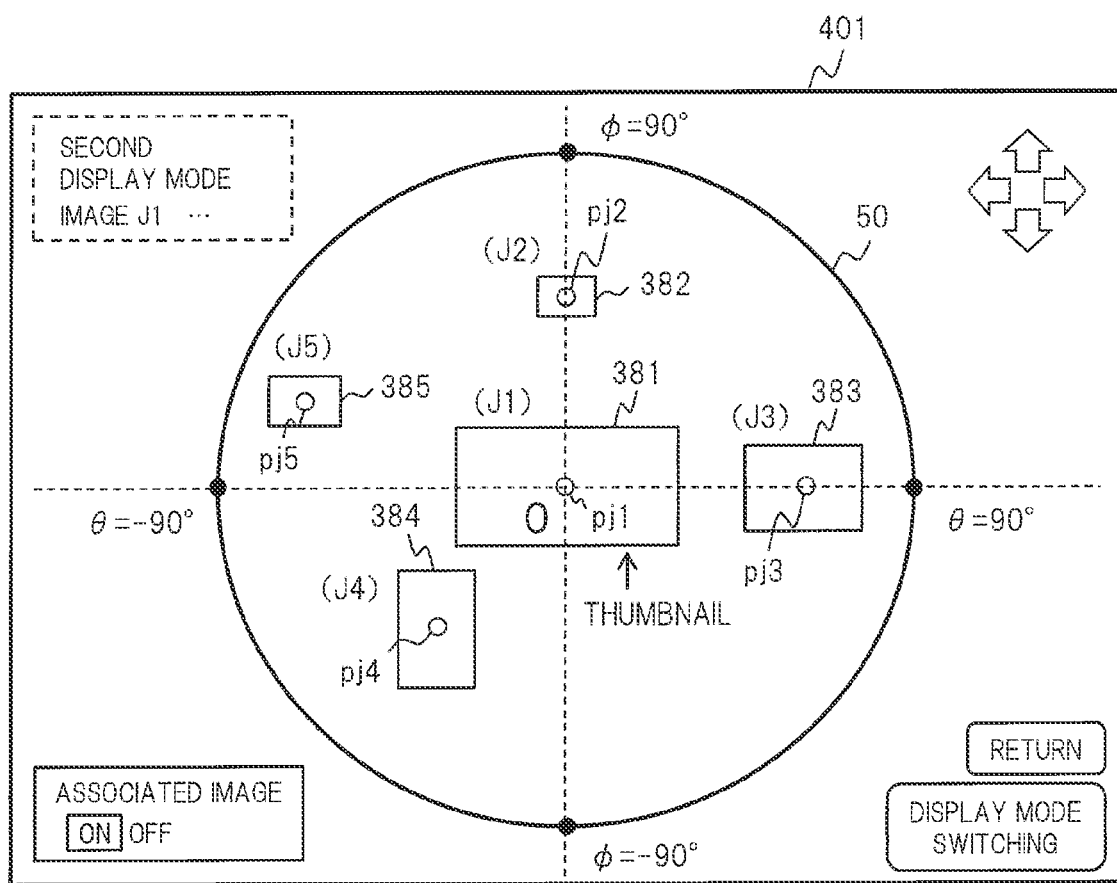
FIG. 38 is a diagram that shows an example of the second display mode screen in the image capturing apparatus of the fourth embodiment.

FIG. 38 shows still another display example of the second screen in the second display mode according to the fourth embodiment. On this second screen, within the display screen 401, not a rectangular region but a circular region corresponding to a spherical surface of a half celestial sphere is formed as the background region 50. Within the circular background region 50 of the second screen, a plurality of images having a relationship are displayed. As an example of the plurality of images having a relationship, images J1 to J5 are prepared. The center point of the circular shape of the background region 50 is set to a point O. At the point O, first, a thumbnail corresponding to a graphic 381 indicating the first image such as the image J1 is displayed. The point O is a point corresponding to the photographing direction (azimuth angle θ, elevation angle φ) of the first image. A point of an optional position on the spherical surface of the half celestial sphere that is the background region 50 can be represented by (azimuth angle θ, elevation angle φ). The present example shows a case in which the point O corresponds to (θ=0°, φ=0°). Moreover, on the upper end, lower end, left end and right end on the circular shape of the background region 50, orientation information for use in assisting the viewing is displayed. However, this may be omitted. In the present example, as the orientation information, the azimuth angle that changes depending on the viewing point direction inside the sphere is displayed. A point on the upper end corresponds to (0°, 90°), a point on the lower end corresponds to (0°, −90°), a point on the right end corresponds to (90°, 0°) and a point on the left side corresponds to (0°, −90°).

The image capturing apparatus 1 generates a projection image region formed by projecting each image of a plurality of images having a relationship onto the sphere of the background region 50 in accordance with a direction from the photographing position to the viewing point, based on information such as the photographing direction and the angle of view or the like, as a graphic indicating the corresponding image. In the present example, images J2 to J5 are prepared as the second images to be associated with the image J1, and graphics 382 to 385 indicating the respective second images are shown. Although each of the graphics 382 to 385 is, for example, a thumbnail, this may be the above-described transparent frame, mark or the like.

The user can view the sphere surface of the celestial sphere from an optional viewing point direction in accordance with an operation on the second screen. In accordance with an operation for the viewing point change, the image capturing apparatus 1 changes the display states of the plurality of images within the half celestial sphere that is the back ground region 50 in real time by using a publicly-known image processing. The operation for the viewing point change may be a scrolling operation by swiping or the like within the background region 50, an operation on longitudinal or lateral scrolling buttons located on the outside of the background region 50, an operation on hardware buttons of the similarly type, or the like. Moreover, the image of the background region 50 can be enlarged/shrunk in accordance with an operation such as pinching or the like.

The user can view the relationship among the plurality of images on this second screen while viewing the spherical surface of the celestial sphere that is the background region 50 in a desired viewing line direction.

On the upper left side of the display screen 401, pieces of information indicating that the current display mode is the second display mode and that the first image at the center is the image J1 are displayed. On the lower left side of the display screen 401, an item for use in switching the display of the second image that is an associated image is provided. When this item is in the ON state, the first image and the second image are displayed as shown in the drawing. When this item is in the OFF state, only the first image is displayed while the second image is not displayed. On the lower right side of the display screen 401, a return button and a display mode switching button are provided. The display state can be returned to the original state of the first screen by the return button, and the display mode can be selected and transited by the display mode switching button. Also on this second screen, in accordance with the selection/operation of a single image, the detailed display can be achieved on the third screen in the third display mode can be performed, and the display state can be returned to the original state of the second screen in accordance with a predetermined operation on the third screen.

Specific examples of the photographing direction and the angle of view of each of the images J1 to J5 are shown below. The image J1 is set to $(\theta, \phi)=(0°, 0°)$, {horizontal angle of view Ah, vertical angle of view Av}={74°, 53°}. Similarly, the image J2 is set to (0°, 40°), {140, 7°}. The image J3 is set to (45°, 0°), {54°, 38°}. The image J4 is set to (340°,−30°), {27°, 4°}. The image J5 is set to (310°, 20°), {17°, 11°}. The image J1 is an image that has been photographed in the north direction in FIG. 28 and the horizontal direction in FIG. 29, which is an image that has been laterally photographed (rotation angle=0°) in a 35-mm equivalent focal length "f" of about 24 mm. The image J4 is an image that has been longitudinally photographed (rotation angle=90°).

The display sizes of the thumbnail and the transparent frame of each of images displayed on the background region 50 are determined based on a predetermine relational equation expressing that each size is proportional to the angle of view or the like based on the angle-of-view information of the images. However, when the focal length is large, which results in a small angle of view, the size of the thumbnail also becomes small. For this reason, a minimum value may be previously set to the display size of the thumbnail or the like, and the display size may be determined to be equal to or more than the minimum value.

Note that the graphic of the projection image to be displayed on the half celestial sphere surface of the background region 50 is correctly not the rectangular shape but a graphic having a distortion in accordance with the radial direction, that is, a graphic having an arc in the circumferential direction. In the present example, the graphic of the projection image is simply illustrated as the rectangular shape. The graphic of the projection image may be displayed as the rectangular shape as shown in the present example, or correctly displayed as the graphic having the distortion. The processing method in the display case with the graphic having the distortion is shown below. When a graphic to be displayed on the half celestial sphere of the background region 50 is generated, the display controller 12 loads the image data 23 of the target image or the thumbnail inside the metadata 22 to the memory 133. Based on the image data or the thumbnail, the display controller 12 generates a projection image onto the half celestial sphere face by carrying out a publicly-known image processing using the signal processor 132. The display controller 12 displays the projection image or a transparent frame corresponding to its outer frame line. The processing method in the case in which the graphic of the projection image is simply displayed as the rectangular shape is shown below. The display controller 12 omits the generating process for the production image, and calculates the positional coordinates of the center point for use in displaying the graphic of the image on the half celestial sphere surface of the background region 50, based on the photographing direction $(\theta, \phi)$ of the image. The display controller 12 pastes and displays the thumbnail or the transparent frame of the image onto the calculated center point.

Figure 39:
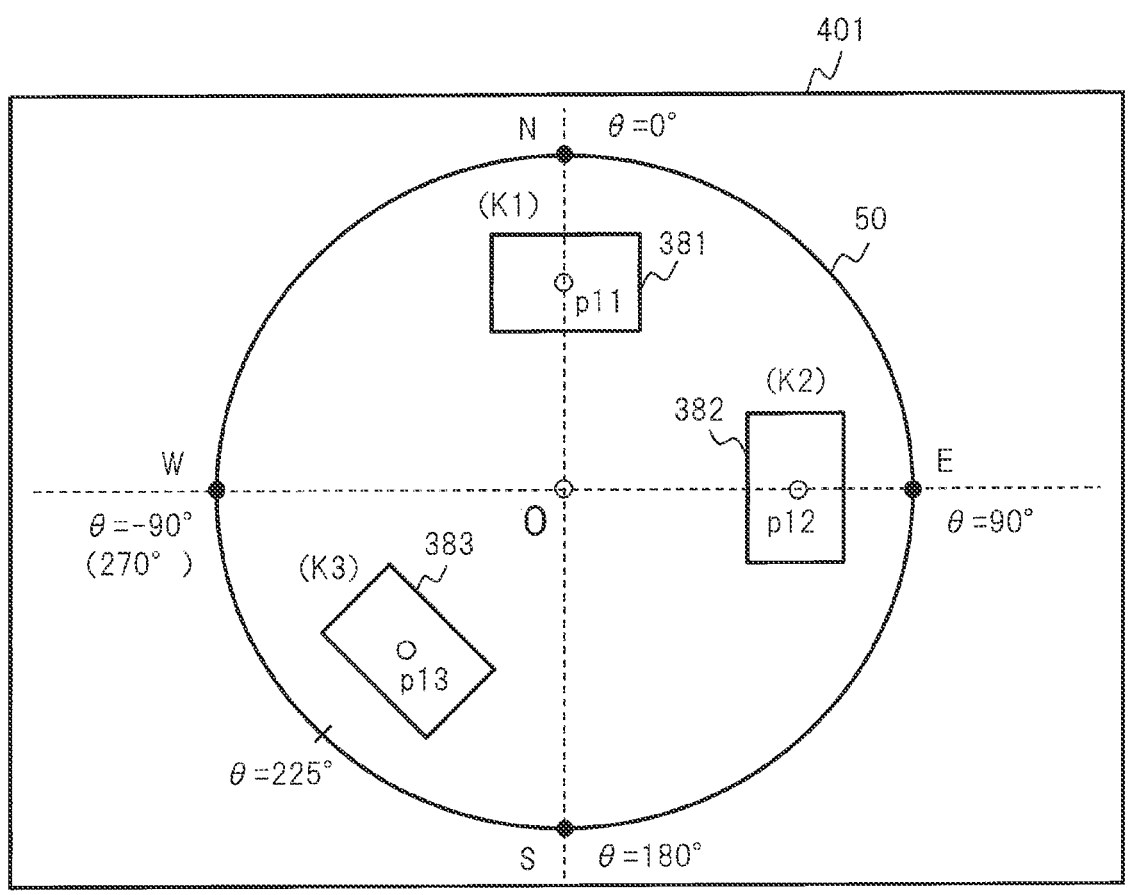
FIG. 39 is a diagram that shows an example of the second display mode screen in the image capturing apparatus of the fourth embodiment.

As still another display example of the above-described second screen having the circular background region 50, FIG. 39 shows a display state generated when the viewing point direction is set to the zenithal direction. As an example of a plurality of images having a relationship, images K1, K2 and K3 are prepared. For example, it is assumed that the image K1 has an azimuth angle $\theta$ in the photographing direction is 0°, the image K2 has $\theta$=90°, and the image K3 has $\theta$=225°. On this second screen, first, a thumbnail of the selected first image is disposed and displayed at a position corresponding to, for example, $\theta$=0° in the north direction. When image K2 is selected as the first image, the display is made in a state in which the azimuth angle $\theta$ is rotated by −90° while the relationship in the angle of view among the plurality of images is maintained so that the upper end of the circular background region 50 is set to $\theta$=90°. In this display state, the relationship in the azimuth angle $\theta$ among the plurality of images can be easily checked.

Note that the above-described plurality of display examples may be configured so as to be suitably combined with one another or so that the plurality of display examples transit to one another. For example, the scrolling display example on the second screen in the second display mode in FIG. 36 and the enlarging/shrinking display example in FIG. 37 can be applied on an optional screen that is either the second screen or the third screen. Moreover, by carrying out the shrinking display/operation on the second screen, the display state may gradually transit from the display in the narrow angle range to the display in the wide angle range, and besides, continuously to the display in the celestial sphere background on the second screen in FIG. 39. In contrast, by carrying out the enlarging display/operation, the display state may gradually transit from the display in the celestial sphere background in FIG. 39 to the display in the wide angle range.

Moreover, on the second screen in FIG. 36, an image that is not displayed within the screen can be displayed within the screen by the scrolling process. However, in place of this operation, the following operation may be used. While the photographing direction measuring part 111 or the like is operated even during the display mode, orientation of the image capturing apparatus 1 or the display apparatus 2 is detected. Thus, an image is displayed in accordance with the orientation of the apparatus so as to cause a display state in which the orientation of the apparatus and the photographing direction of the image coincident with each other. In other words, the scrolling operation is automatically carried out so as to make the photographing direction coincident with the orientation of the apparatus.

[Fourth Display Mode—Fourth Screen]

Figure 40:
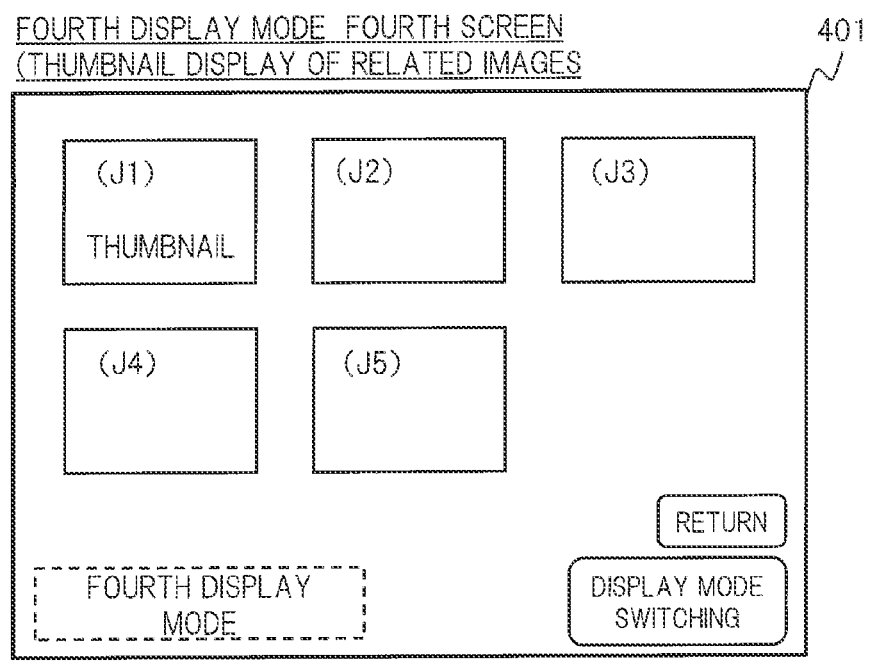
FIG. 40 is a diagram that shows an example of a fourth display mode screen in the image capturing apparatus of the fourth embodiment.

FIG. 40 shows a fourth screen in a fourth display mode as a modified example. The fourth display mode is a modified example of the first display mode. For example, the fourth screen is displayed when the fourth display mode is assigned by a predetermined operation using a display mode switching button or the like on the second screen of FIG. 38 or the like. This fourth screen displays a plurality of images having a relationship such as thumbnails of images J1 to J5, as a list in a longitudinal and lateral matrix. For example, a thumbnail of the image J1 is displayed on the upper left side, and a thumbnail of the image J2 is displayed on the right side of the thumbnail. On the above-described first screen, regardless of the relationship among the images, information of all the images are displayed as a list. However, on the fourth screen, only a plurality of images having a relationship in the same group are displayed as a list. In response to a user operation, the screen can transit from the fourth screen to the first screen, the second screen, the third screen, or the like.

Moreover, when wide angle image and the narrow angle image are mixed on the first screen or the fourth screen, the thumbnail of the wide angle image and the thumbnail of the narrow angle image may be laid out and displayed in a longitudinal or a lateral direction. In this case, the display sizes of the thumbnails may be set to different display sizes that are determined depending on the sizes of the angle of view of the images. For example, in a case of a panorama image whose horizontal angle of view of the wide angle image is 180° or more, the thumbnails of the wide angle images are displayed on one row, and the thumbnails of the plurality of narrow angle images may be displayed on a lower row of the row in parallel. The number of images in the parallel layout may be variable as 2 images, 3 images, 4 images or the like in one direction.

[Map Display Mode]

Figure 41:
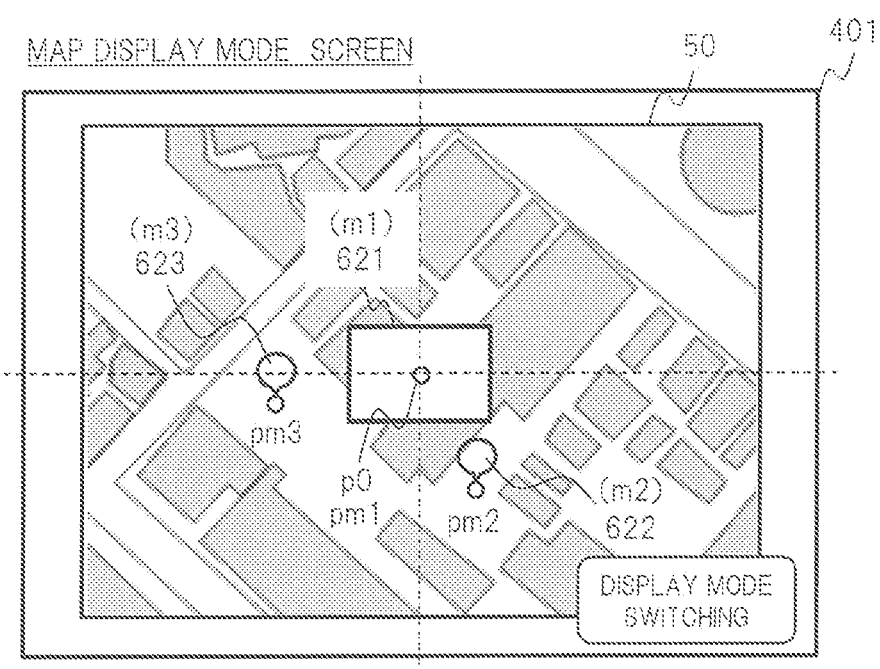
FIG. 41 is a diagram that shows an example of a map display mode screen in the image capturing apparatus of the fourth embodiment.

FIG. 41 shows a display screen when a map display mode is formed as one of display modes as a modified example. The image capturing apparatus 1 acquires map information from the outside through the communication network 4, or uses map information previously held inside itself. The image capturing apparatus 1 displays the map information in the background region 50 within the display screen 401 as a screen corresponding to the map display mode. Based on the first image that is a target image and positional information of the metadata 22 of the second image, the image capturing apparatus 1 displays a graphic indicating each target image on the map of the background region 50. For example, at a center point p0, a thumbnail is displayed as a graphic 621 indicating an image m1 that is the first image whose photographing position is the center point. This graphic 621 may be the transparent frame or the mark. Moreover, at each point close to the point p0, a graphic indicating the second image photographed at the point is displayed with, for example, the mark. For example, at a point pm2, a mark 622 indicating an image m2 that is the second image is displayed. The plurality of images are associated images within a range of a predetermined distance. On this screen, in response to a predetermined operation by the user, the screen can be switched to a screen in another display mode. Furthermore, when a graphic at a desired position is selected and operated on this screen, the detailed display may be carried out on the third screen in the third display mode, or a thumbnail may be displayed at this position.

[Associating System]

As an associating system, in the fourth embodiment, the image capturing apparatus 1 uses the first system, and the display apparatus 2 uses the second system, as similar to the first embodiment.

[Processing Flow (1)]

Processing flows in the image capturing apparatus 1 and the display apparatus 2 of the fourth embodiment are the same as those shown in above-described FIG. 14.

[Processing Flow (2)]

Figure 42:
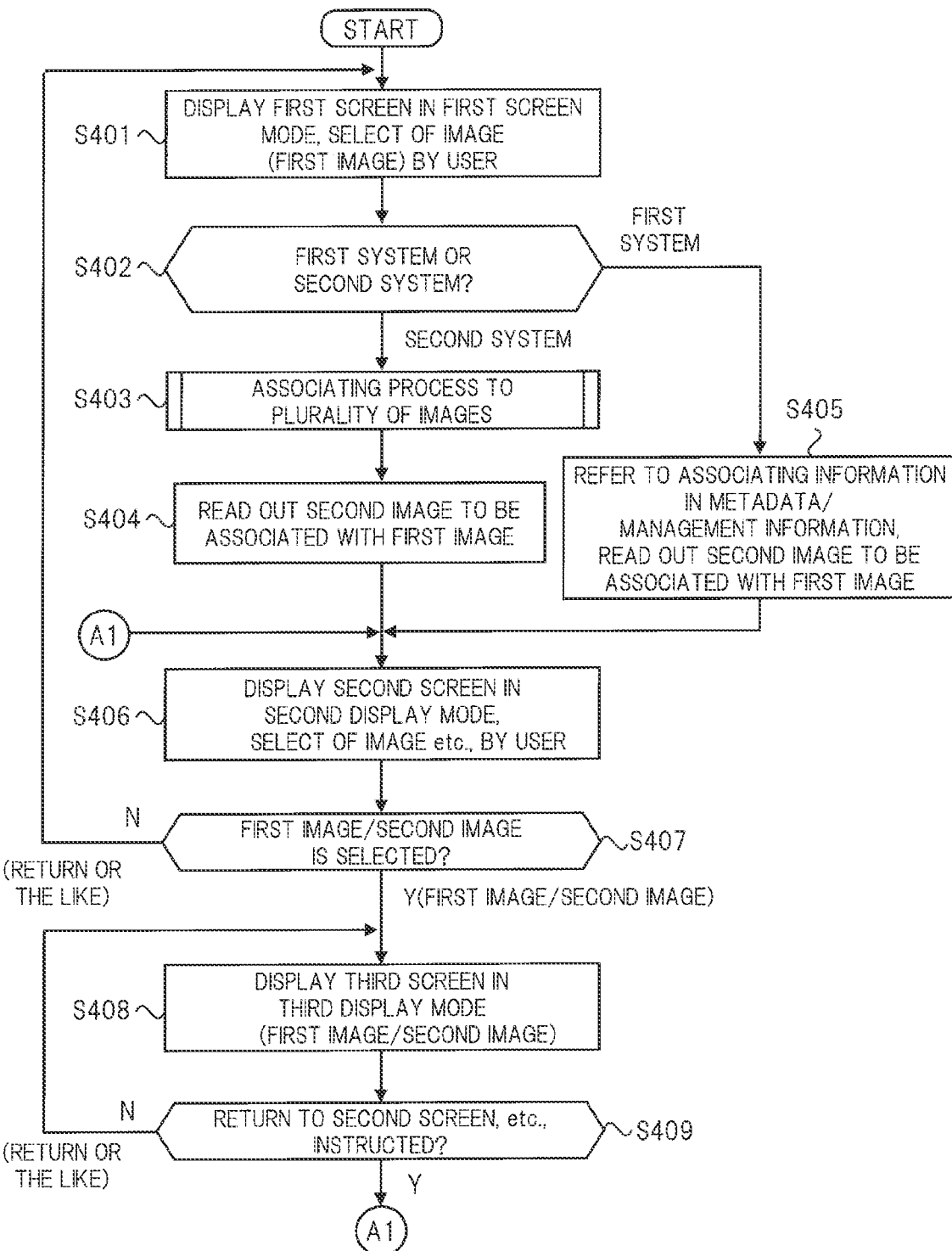
FIG. 42 is a diagram that shows a flow of control processes at the time of reproducing/displaying in the image capturing apparatus and the display apparatus of the fourth embodiment.

FIG. 42 shows a flow of control processing at the time of reproducing/displaying of an image in the image capturing apparatus 1 or the display apparatus 2 of the fourth embodiment. The control in FIG. 42 corresponds to control for transiting display modes as shown in FIG. 30. FIG. 42 has steps S401 to S409. The flow will be explained below in the order of steps. Hereinafter, the following explanation will be given in a case of the image capturing apparatus 1 as a main body. However, the same is true for a case of the display apparatus 2 as a main body.

(S401) Based on a user operation, the controller 101 allows the display controller 12 to display a first screen in a first display mode as shown in FIG. 30 on the display screen 401 of the display part 41 of the display apparatus 104. In response to a user input operation, the display controller 12 receives selection of an image within the first screen or the like. The selected image is set as a first image on the standard side.

(S402) The display controller 12 branches the sequence depending on a first system or a second system. The sequence proceeds to S403 in the case of the second system, and the sequence proceeds to S405 in the case of the first system. That is, since the first system is executed in the case of the image capturing apparatus 1 of the fourth embodiment, the sequence proceeds to S405. Since the second system is executed in the case of the display apparatus 2, the sequence proceeds to S403.

(S403) Immediately before the reproducing/displaying, the display controller 12 carries out the associating process among the plurality of images by using the associating part 15.

(S404) If there is any second image to be associated with the first image as a result of S403, the display controller 12 reads out the image data 23 of this second image.

(S405) In the case of the first system, the associating process has already been carried out. With reference to the associating information in the metadata 22 of the image file 24 of the first image or the management information 21, the display controller 12 checks the association. The display controller 12 reads out the image data 23 of the second image associated with the first image.

(S406) By using the image data 23 that is the result of S404 or S405, the display controller 12 displays a plurality of images including the first and the second images on the display screen in the second display mode. That is, as shown in the example of the second screen of FIG. 30, the display controller 12 displays a graphic of the first image at the center position of the background region 50, and also displays graphics of the second images on the periphery of the center position. In response to a user input operation, the display controller 12 receives selection for the graphics of the first and the second images within the second screen or the like. For example, when only the first image is to be viewed or only the second image is to be viewed, the corresponding graphic is selected and operated. When the screen is returned to the first screen, a predetermined operation is carried out.

(S407) The display controller 12 branches the sequence depending on whether the graphic of the first image or the second image is selected on the second screen in the second display mode or the returning operation or the like is carried out. When the first image or the second image is selected, the sequence proceeds to S408. In the case of another operation such as the pushing down of the return button, the assignment to the first display mode, the tapping on the background region 50, or the like, the sequence returns to S401.

(S408) By using the image data 23 of images corresponding to the graphics selected in S407, the display controller 12 carries out the detailed display of the images on the third screen in the third display mode. The display controller 12 receives a user input operation on the third screen. For example, when the screen is returned to the second screen, the pushing down of the return button, the assignment to the second display mode, the tapping on the image region, or the like is carried out.

(S409) When an operation such as the returning or the like is carried out on the third screen in the third display mode, the display controller 12 allows the sequence to return to S406 as shown in A1. When such an operation is not carried out, the display controller 12 continues the display in the third display mode in S408. Note that the screen may return from the third display mode to the first screen in the first display mode in response to a predetermined operation.

[Associating Process (1)]

The associating part 15 carries out the association among the plurality of images. As similar to the above description, the associating process includes a first process and a second process. As described above, the first process includes a first selection system, a second selection system, a third selection system and the like. In the first embodiment, the first selection system is used. In a modified example, the second selection system or the third selection system is used.

[First Selection System—Photographing Place]

The first selection system is the same as that shown in the FIG. 16 as described above. The associating part 15 sets a position 1601 indicating a photographing place of the first image as a center point with reference to the first image. The associating part 15 determines that second images whose positions are included within a positional range 1600 are images captured substantially at the same photographing places as that of the first image, and selects the images as candidates for the association. As means for determining the same photographing place, not only a system using GPS positional information but also a system using positional information of a near-field communication interface such as BlueTooth (registered trademark), a system using positional information of an indoor position measuring system or the like may be adopted. For example, an apparatus supporting the near-field communication interface is provided in a facility or the like, and the image capturing apparatus 1 acquires the positional information through the communication with the apparatus. Thus, the position can be recognized with high accuracy.

[Second Selection System—Photographing Date and Time]

The second selection system is the same as that shown in the above-described FIG. 17. The associating part 15 takes a moment t1 indicating the photographing date and time of the first image with reference to the first image. The associating part 15 determines that the second images each of which has the photographing date and time included within a date-and-time range 170 are substantially the same as the first image in the photographing date and time, and selects the images as candidates for the association.

[Third Selection System—Setting Character String]

The third selection system is the same as that in the above-described FIG. 18. The associating part 15 selects the second images determined to have the substantially same character strings as the setting character string of the first image, as candidates for the association.

[Fourth Selection System—Type of Imaged Subject]

As another selection system, the following fourth selection system may be used. The image capturing apparatus 1 determines a type of an imaged subject by carrying out an image recognition processing. As the types of the imaged subjects, scenery, abuilding, a person, an animal and the like are cited. The type of the determinable imaged subject is in accordance with accuracy of the image recognition processing or the like. The image capturing apparatus 1 estimates that a plurality of images having the same type of the imaged subject as one another belong to a group having a relationship in accordance with the type of the determined imaging subject, and selects the images as the candidates.

Moreover, the image capturing apparatus 1 may use the type of the determined imaged subject as a standard for determining the relationship among the plurality of images. In accordance with the type of the imaged subject, the image capturing apparatus 1 adjusts the positional range that is, for example, the threshold value of the first selection system or the like. For example, when the type of the imaged object is the scenery, the focal length is large, and therefore, the influence on the image change becomes small even when a difference in the position among the photographing points is large. Therefore, in this case, the positional range is set to a comparatively large value. Thus, the images in a group included within the large positional range can be associated with one another. When the type of the imaged subject is the person, the focal length is small, and therefore, the influence on the image change becomes large if the difference in the position among the photographing points is large. Therefore, in this case, the positional range is set to a comparatively small value.

Similarly, the image capturing apparatus 1 may adjust the threshold value of the positional range or the like in accordance with the determination on the distance to the imaged subject and the difference in the photographing mode. For example, when the photographing mode is set to a micro mode or the like suitable for the scenery photographing, the positional range that is the threshold value is set to a comparatively large value.

[Associating Process (2)]

The second process is shown below. The associating part 15 refers to the information of the photographing direction and the angle of view in the metadata 22 of each of the image files 24 or the management information 21. As a first condition, the associating part 15 determines whether or not the photographing direction (azimuth angle $\theta$, elevation angle $\phi$) of the candidate image is included within a range of the angle of view {horizontal angle of view Ah, vertical angle of view Av} of the first image serving as the standard. The associating part 15 determines an image satisfying this first condition as an image to be associated. Moreover, as a second condition, the associating part 15 may determine whether or not the photographing direction (azimuth angle $\theta$, elevation angle $\phi$) of the candidate image is included within a predetermined range of the angle of view that is extended out of the range of the angle of view {horizontal angle of view Ah, vertical angle of view Av} of the first image serving as the standard. The associating part 15 determines an image satisfying this second condition as an image to be associated. In the second process, the first condition or the second condition is applied.

An example that satisfies the first condition is shown below. As an example of the first image, an image 5d that is a wide angle image of FIG. 28 is used. The horizontal angle of view Ahd of the image 5d is 120°, and a right end position of a photographing range 704 of the horizontal angle of view Ahd is 70° and a left end position thereof is −50°. Within the photographing range 704, the azimuth angle θb=45° in the photographing direction 7b of the image 5b and the azimuth angle θc=−20° in the photographing direction 7c of the image 5c are included. Moreover, although not shown in the drawing, within the range of a vertical angle of view Avd of the image 5d, the elevation angle ϕ b in the photographing direction 7b of the image 5b and the elevation angle ϕ c in the photographing direction 7c of the image 5c are included. Thus, the first condition is satisfied, and the image 5b and the image 5c are associated with the image 5d.

Figure 43:
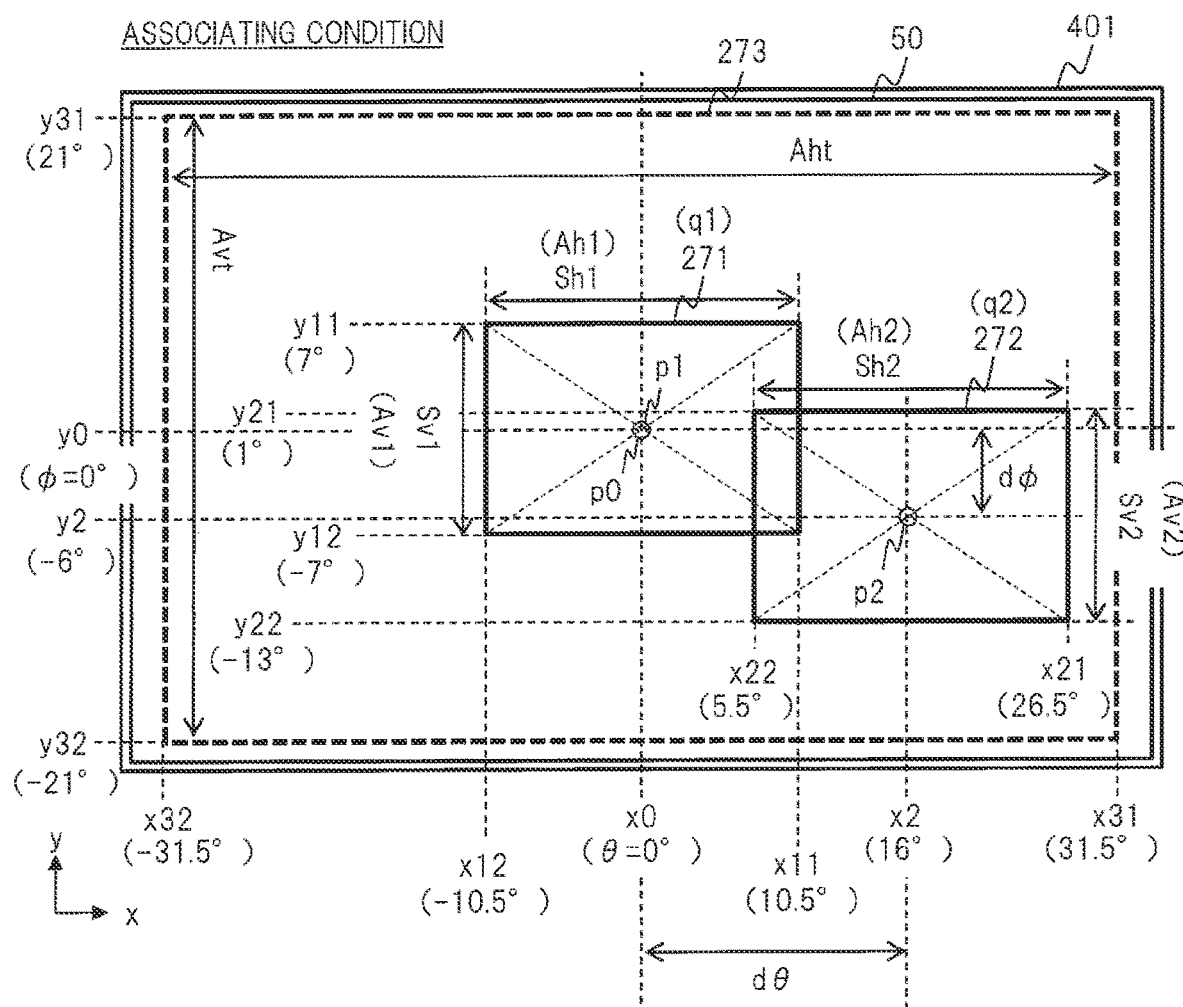
FIG. 43 is an explanatory diagram that shows a condition, etc., of association process in the image capturing apparatus of the fourth embodiment.

FIG. 43 is an explanatory diagram showing the first condition, the second condition or the like at the time of the determination on the relationship among the plurality of images. In the entire background region 50 within the display screen 401, it is supposed that an in-plane horizontal direction corresponding to the azimuth angle θ is an x-direction and an in-plane vertical direction corresponding to the elevation angle ϕ is a y-direction. It is supposed that the lateral width in the x-direction of the display screen 401 is W and the longitudinal width in the y-direction thereof is H. A center point p0 of the display screen 401 is indicated by positional coordinates (x0, y0). It is supposed that, for the entire display screen 401, a background region 50 having the same or larger size is set.

As the first image serving as the standard, an image q1 that is a first narrow angle image is exemplified. It is supposed that a point corresponding to the photographing direction (θ, ϕ) of the image q1 is a center point p1. In the present example, it is supposed that (θ, ϕ) of the center point p1 is (0°, 0°). A graphic 271 indicating the image q1 is disposed so that the center point p1 coincides with the point p0. The graphic 271 has a rectangular shape in this case, and is indicated by a solid-line frame. It is supposed that the horizontal angle of view Ah1 of the image q1 is 21° and the vertical angle of view Av1 thereof is 14°. The graphic 271 of the image q1 has a horizontal size Sh1 corresponding to the horizontal angle of view Ah1 and a vertical size Sv1 corresponding to the vertical angle of view Av1. The right end in the x-direction of the graphic 271 is indicated by a position x11, the left end thereof is indicated by a position x12, and these ends are at 10.5° and −10.5° in the azimuth angle θ, respectively. The upper end in the y-direction of the graphic 271 is indicated by a position y11, the lower end thereof is indicated by a position y12, and these ends are at 7° and −7° in the elevation angle ϕ, respectively.

As the second image, an image q2 that is a second narrow angle image is exemplified. It is supposed that a point corresponding to the photographing direction (θ, ϕ) of the image q2 is a center point p2. In the present example, it is supposed that (θ, ϕ) of the center point p2 is (16°, −6°). A graphic 272 indicating the image q2 is disposed at the center point p2, and is similarly indicated by a solid-line frame. It is supposed that the horizontal angle of view Ah2 and the vertical angle of view Av2 of the image q2 are 21° and 14°, respectively, as similar to those of the image q1. The graphic 272 of the image q2 has a horizontal size S2 corresponding to the horizontal angle of view Ah2 and a vertical size Sv2 corresponding to the vertical angle of view Av2. The right end in the x-direction of the graphic 272 is indicated by a position x21, the left end thereof is indicated by a position x22, and these ends are at 26.5° and 5.5° in the azimuth angle θ, respectively. The upper end in the y-direction of the graphic 272 is indicated by a position y21, the lower end thereof is indicated by a position y22, and these ends are at 1° and −13° in the elevation angle ϕ, respectively.

As an example of the first condition, the photographing direction (θ, ϕ) of the image q2 is included within ranges of the horizontal angle of view Ah1 and the vertical angle of view Av1 centered on the photographing direction of the image q1. In other words, the center point p2 of the image q2 is included within the ranges of the horizontal size and the vertical size of the image q1. Particularly, it is supposed that both of the azimuth angle ∝ and the elevation angle ϕ need to satisfy the condition. In the present example, the azimuth angle θ=16° of the image q2 is out of the range (−10.5° to 10.5°) of the horizontal angle of view Ah1 of the image q1, and the elevation angle #=−6° is within the range (−7° to 7°) of the vertical angle of view Av1 thereof. Therefore, the image q2 fails to satisfy the first condition.

For the second condition, the extended threshold value range 273 is set out of the ranges of the horizontal angle of view Ah1 and the vertical angle of view Av1 centered on the photographing direction of the image g1 that is the first image. The threshold value range 273 is indicated by a broken line. The threshold value range 273 may be a fixed set value for use in packaging or a user setting value. Particularly, the threshold value range 273 may coincide with the size of the background region 50. Moreover, particularly, based on the size of the angle of view of the first image, the threshold value range 273 may be set to a range obtained by a predetermined calculation expression such as a range obtained by adding a predetermined angle of view or a range obtained by multiplying a predetermined rate. In the present example, it is supposed that the threshold value range 273 is three times as large as the range of the angle of view of the first image, and that the horizontal angle of view Aht=63° and the vertical angle of view Avt=420 are set. The right end in the x-direction of the threshold value range 273 is indicated by a position x31, the left end thereof is indicated by a position x32, and these ends are at 31.5° and −31.5° in the azimuth angle θ, respectively. The upper end in the y-direction of the threshold value range 273 is indicated by a position y31, the lower end thereof is indicated by a position y32, and these ends are at 21° and −21° in the elevation angle ϕ, respectively.

As an example of the second condition, the photographing direction (θ, ϕ) of the image q2 is included within the threshold value range 273 based on the angle of view of the image q1. Particularly, it is supposed that both of the azimuth angle θ and the elevation angle ϕ need to satisfy the condition. In the present example, the azimuth angle θ=16° of the image q2 is within the horizontal angle of view Aht of the threshold value range 273, and the elevation angle #=−6° thereof is within the vertical angle of view Avt thereof. Therefore, the image q2 satisfies the second condition. Thus, when the second condition is used, the image q2 is associated with the image q1.

As another conditions, the following conditions are applicable. As a third condition, it is supposed that a part of the range of the angle of view of the second image is overlapped with a part within the range of the angle of view of the first image. As a fourth condition, it is supposed that a part of the angle of view range of the second image is overlapped with a part within the threshold value range out of the range of the angle of view of the first image. For example, a part of the range of the angle of view of the image q2 is overlapped with a part within the range of the angle of view of the image q1. In other words, the position x22 on the left side of the image q2 is located on the left side of the position x11 on the right end of the image q1. Therefore, the image q2 is associated with the image q1.

As a fifth condition, it is supposed that a different value between the angle (θ or φ) in the photographing direction of the first image and the corresponding angle (θ or φ) in the photographing direction of the second image is within a predetermined threshold value angle. In other words, it is supposed that, in calculation of the distance in the positional coordinates between the center point of the first image and the center point of the second image, the distance is within a predetermined threshold distance. For example, the different value dθ in the azimuth angle θ between the center point p1 of the image q1 and the center point p2 of the image q2 is 16°, and the different value dφ in the elevation angle φ therebetween is −6°. It is supposed that the threshold angle is set to (dθt, dφt). In the case of "dθ≤dθt" or "dφ≤dφt", it is supposed that the condition is satisfied.

Also when the first image is a wide angle image and when the second image is a wide angle image, the determination on the association is achieved by similarly applying the above-described conditions. Moreover, particularly, the first condition may be applied when the first image is a wide angle image, and the second condition may be applied when the first image is a narrow angle image. In this manner, the mode of selection for the conditions in accordance with the type of the image or the like and the mode applied in the combination of the plurality of conditions may be applicable.

[Effects, Etc.]

As described above, according to the image capturing apparatus 1 and the display apparatus 2 of the fourth embodiment, the relationship among the plurality of images including the wide angle image and the narrow angle image can be easily recognized, and more convenient use can be achieved. On the display screen, the narrow angle image having the relationship can be automatically displayed so as to be overlapped with the vicinity of the wide angle image, and therefore, the user can easily recognize, intuitively understand, and thus, favorably view the plurality of images having the relationship. The user can also easily understand the relationship between the wide angle image and the narrow angle image. The user can quickly refer to the second image having the relationship from a state in which the user is viewing the first image. The user can favorably view a large number of images while switching the display modes.

The following configurations are listed as modified examples of the fourth embodiment. Also in the fourth embodiment, various modified examples can be made as similar to the first embodiment.

Modified Example (1)—Second Screen

Figure 44:
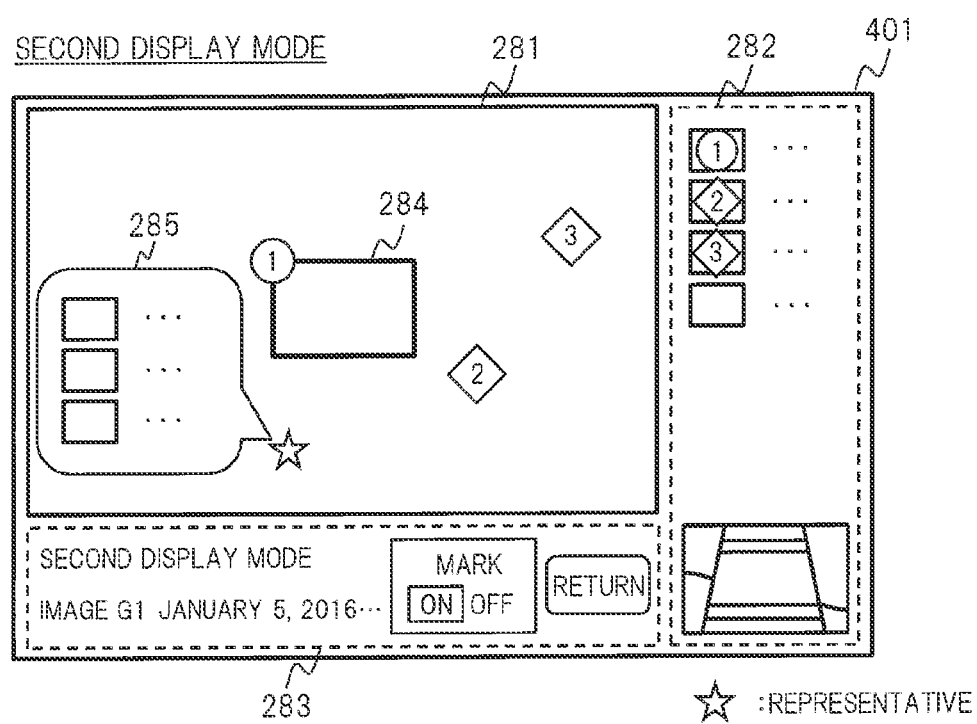
FIG. 44 is a diagram that shows an example of a second display mode screen in an image capturing apparatus according to a modified example of the fourth embodiment.

FIG. 44 shows an example of the second screen in the second display mode according to an image capturing apparatus 1 of a modified example of the fourth embodiment. As similar to the example of FIG. 20, within the display screen 401, there are a main region 281 and regions other than the main region 281 such as a region 282 on the right side and a region 283 on the lower side in the present example. In the main region 281, a thumbnail is displayed as a graphic 284 of the first image at the center position on the background region, and the graphic of the associated second image is displayed on the periphery of the thumbnail. As the graphics of the first image and the second images, different graphics may be displayed in accordance with differences in the type or the photographing date and time of the image or the like. In the present example, an identification number is added to the mark. The thumbnail of the first image is displayed together with the mark whose identification number is 1. As the graphic of the second image, a mark whose identification number is 2 or larger is displayed.

Modified Example (2)—Tilt Operation

As a modified example, a tilt angle indicating the tilt and the rotation of the housing of the image capturing apparatus 1 is detected by using a sensor of the photographing direction measuring part 111 or the like. In accordance with the state of the detected tilt angles, the image capturing apparatus 1 switches the display modes and controls the scrolling of the plurality of images within the second screen or the like. In response to a predetermined operation, a display mode that validates this function and another display mode that invalidates this function can be switched. Normally, in the invalid display mode, the display contents of the second screen are fixed and displayed regardless of the tilt angle of the image capturing apparatus 1. Then, in response to the above-described predetermined operation, the display state can be changed by the scrolling, the enlarging/shrinking or the like.

Figure 45:
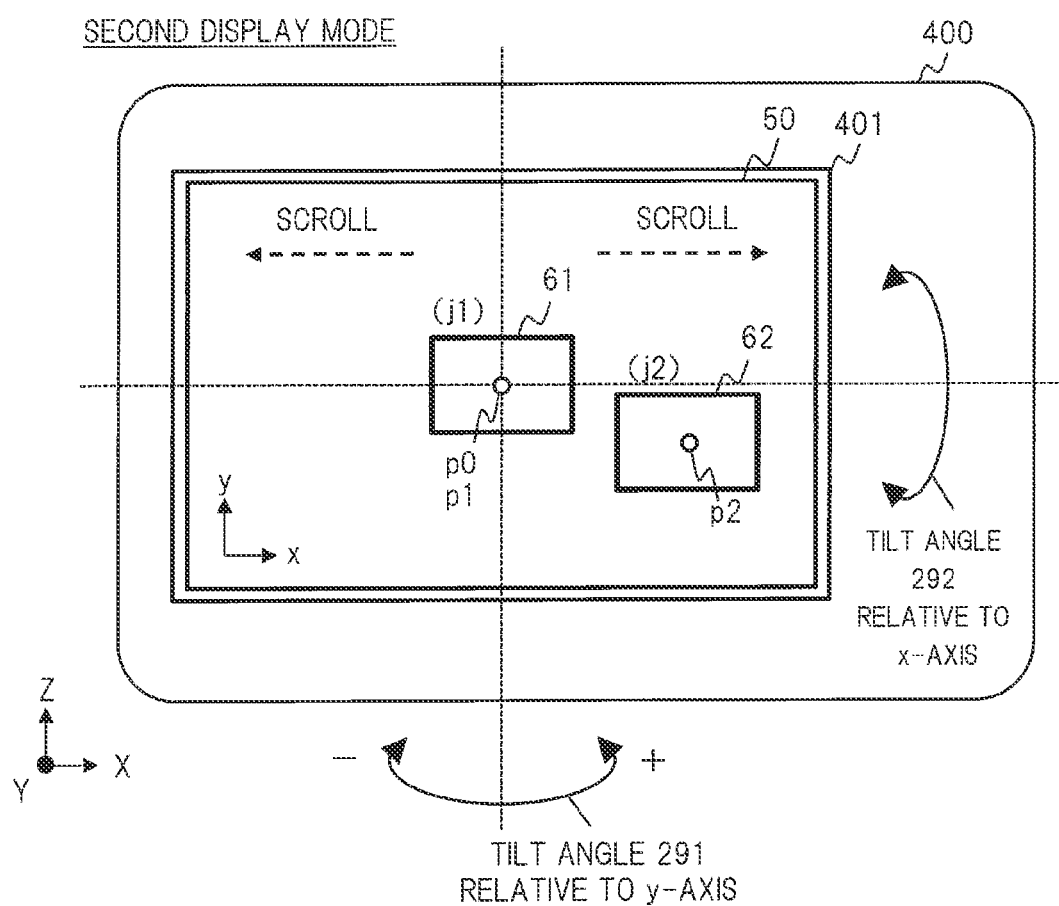
FIG. 45 is a diagram that shows an example of the second display mode screen in the image capturing apparatus according to the modified example of the fourth embodiment.

FIG. 45 shows a state in the valid display mode in which the display screen 401 of the housing 400 of the image capturing apparatus 1 is disposed on the X-Z plane. Regarding the directions of the housing 400 and the display screen 401, a tilting operation relative to the y-axis and its tilt angle 291 as well as a tilting operation relative to the x-axis and its tilt angle 292 are shown. As an example of the second screen, an example that is similar to the second screen of FIG. 30 is shown. On the background region 50 of the second screen, a graphic 61 of the first image is displayed at the center, and a graphic 62 of the second image is displayed so as to be close to the first image.

In this state, an operation for tilting the housing 400 is carried out as a user operation. For example, a tilting operation in the positive direction on the right side relative to the y-axis is carried out. The image capturing apparatus 1 detects a tilt angle 291 at this time, and then, changes the display state within the second screen in accordance with the tilt angle 291 by the scrolling in the right direction. Thus, each image within the second screen is moved leftward, an, at the same time, information located on the right side out of the screen is displayed within the screen. In this display mode, the user can easily change the display state only by carrying out the tilting operation, and can view the plurality of images with less burdensome task. Similarly, a mode of controlling the enlarging/shrinking process in accordance with the tilting operation may be used.

Modified Example (3)—External Apparatus Cooperation

As a modified example, as similar to the modified example of the first embodiment, the image capturing apparatus 1, the display apparatus 2 and the image capturing and display system, which cooperate with an external apparatus, may be prepared. For example, the image capturing apparatus 1 and the display apparatus 2 may take the system of carrying out the association before the transmission of the image file 24 to an external apparatus or another system of carrying out the association after the reception of the image file 24 from the external apparatus.

Fifth Embodiment

Figure 46:
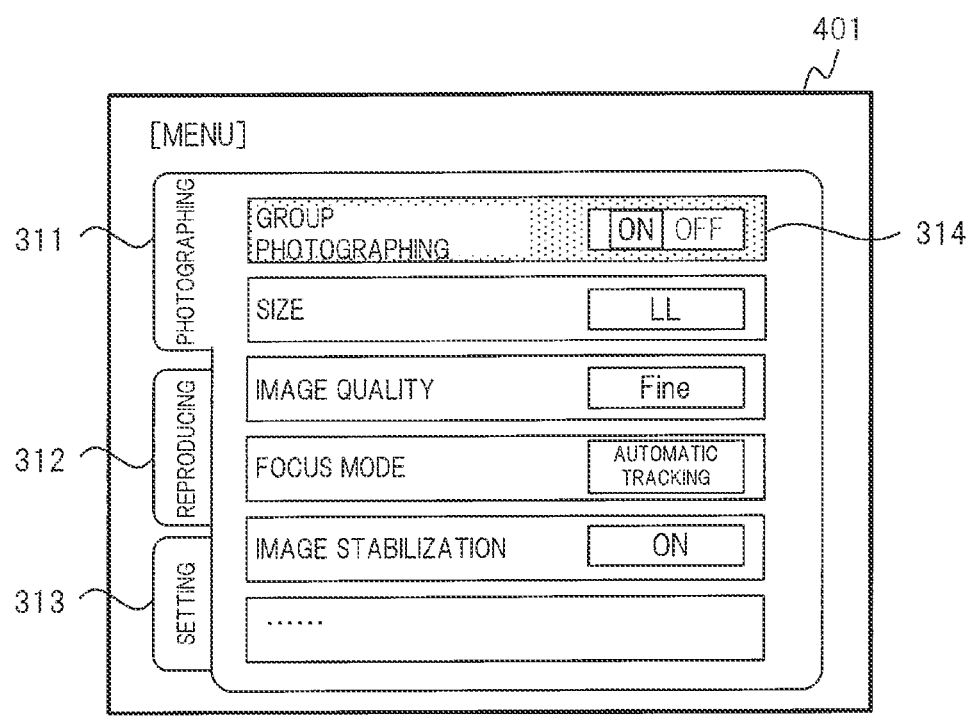
FIG. 46 is a diagram that shows a photographing menu screen in an image capturing apparatus of a fifth embodiment of the present invention.

With reference to FIG. 46, an image capturing apparatus and a display apparatus according to a fifth embodiment of the present invention will be explained. The differences of the configuration of the fifth embodiment from the configuration of the fourth embodiment will be explained below. As similar to the third embodiment, the image capturing apparatus 1 in the fifth embodiment is provided with a unique photographing mode for use in associating a plurality of images with one another.

[Photographing Mode]

As the photographing modes, the image capturing apparatus 1 in the fifth embodiment has a first photographing mode that is a normal photographing mode and a second photographing mode that is a group photographing mode for the association. The image capturing apparatus 1 carries out switching between the photographing modes based on a user input operation and a user setting operation. The user carries out a predetermined operation for switching between the first photographing mode and the second photographing mode at an optional timing through the operation input part 105 or the like.

In the image capturing apparatus 1 in the fifth embodiment, the switching between the photographing modes on the time axis or the like is the same as that of the above-described FIG. 26. At a desired timing, for example, at a moment T2, the user carries out an operation of switching the first photographing mode to the second photographing mode. In the state of the second photographing mode, the image capturing apparatus 1 automatically associates individual images as targets into a group, which are captured during this period. For example, at moments t1 to t4 during the second photographing mode, respective images are captured. The controller 101 carries out the associating process to these images by using the associating part 15, and writes the associating information into the metadata 22 or the management information 21. In the present example, the respective images at the moments t1 to t4 are associated into one group. Into the image file 24 or the management information 21 of these images, a group identifier is written.

At a desired timing, for example, at a moment T4, the user carries out an operation of switching the second photographing mode to the first photographing mode. The image capturing apparatus 1 does not carry out the associating process to the individual images captured in the first photographing mode, such as the images captured at the moment t12. The controller 101 may execute the associating process at the time of returning to the first photographing mode. At the time of reproducing/displaying, the display controller 12 checks the association, and carries out the associating display based on the reference to the group identifier in the image file 24 or the management information 21 or the like.

[Menu Screen]

FIG. 46 shows a menu screen relating to the photographing modes as an example of the display screen of the image capturing apparatus 1. This menu screen is displayed by, for example, pushing down of a center button of a directional pad key 433 of FIG. 4. This menu screen has a photographing menu 311, a reproducing menu 312 and a setting menu 313. The photographing menu 311 has setting items relating to a photographing mode, the reproducing menu 312 has setting items relating to a reproducing/displaying mode, and the setting menu 313 has setting items relating to a setting mode. Each setting item of each mode can be set by the user. For example, in the photographing menu 311, group photographing 314, size, image quality, focusing mode, image stabilizing items, and the like are prepared as the setting items. The size, the image quality and the like are publicly-known setting items.

The user carries out an operation such as tapping on the menu screen, accordingly selects the group photographing 314 as the setting item of the photographing menu 311, and selects an ON button, so that the group photographing mode is set as the photographing mode. When the user selects an OFF button, the group photographing mode is canceled. The turning ON/OFF of the group photographing mode may be achieved by an exclusively used hardware button. Moreover, when the power supply is turned off in the ON state of the group photographing mode, the image capturing apparatus 1 may automatically switch the state of the group photographing mode to the OFF state. Furthermore, when a predetermined period of time has been elapsed from the time at which the group photographing mode is turned ON or at which an image is photographed in the photographing mode, the image capturing apparatus 1 may automatically turn OFF the group photographing mode.

[Effects, Etc.]

As described above, according to the fifth embodiment, the user can easily associate a plurality of images by switching the photographing mode by the user's own determination.

Sixth Embodiment

Figure 47:
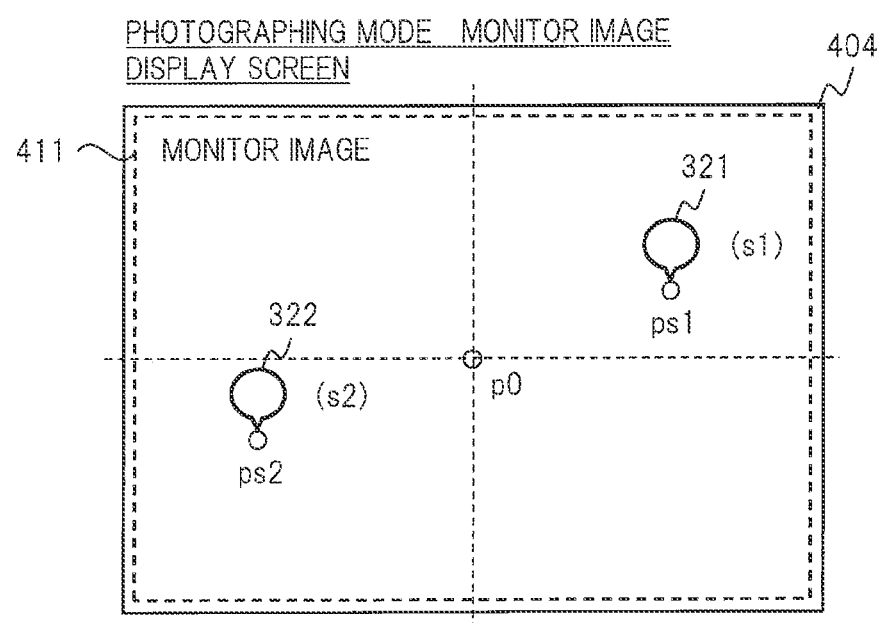
FIG. 47 is a diagram that shows a display screen of a monitor image in a photographing mode in an image capturing apparatus of a sixth embodiment of the present invention.
Figure 48:
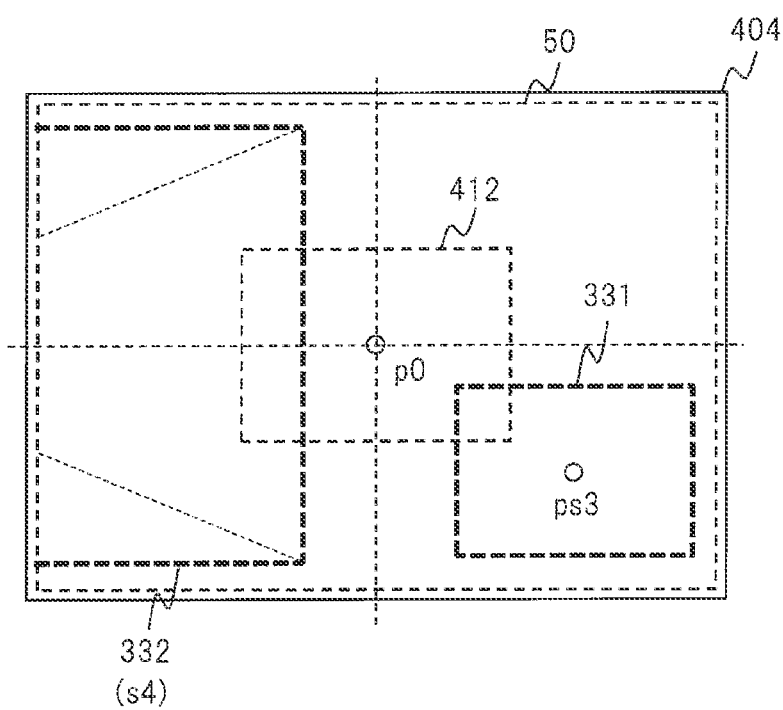
FIG. 48 is a diagram that shows a display screen of a monitor image in a photographing mode in an image capturing apparatus of a modified example of the sixth embodiment.

With reference to FIG. 47 and FIG. 48, an image capturing apparatus and a display apparatus according to a sixth embodiment of the present invention will be explained. The differences of the configuration of the sixth embodiment from the configuration of the fourth embodiment will be explained below. The image capturing apparatus 1 in the sixth embodiment has a function of associating and displaying an already-photographed image on a monitor image displayed on a display screen in a photographing mode. By this function, an assisting function for assisting imaging operations including determination on the photographing direction or the like by the user can be achieved. Moreover, particularly, the sixth embodiment also uses the group photographing mode of the fifth embodiment. While the monitor image is displayed during the group photographing mode as the photographing mode, the already-photographed image is associated as the second image and displayed.

[Photographing Monitor]

FIG. 47 shows a display screen 404 in the EVF 403 of the above-described FIG. 4 in a first monitoring system according to the sixth embodiment. The display controller 12 causes the display screen 404 to display the monitor image for the photographing mode and also displays an image to be associated. In the first monitor system, the monitor image is recognized as the background region 50 and the first image, and a graphic of the second image is displayed on the monitor image. The image capturing apparatus 1 displays a monitor image 411 depending on the photographing direction, the angle of view, or the like at the time of photographing in accordance with the entire background region 50 of the display screen 404. A center point p0 of the display screen 404 and a center point of the monitor image 411 coincide with each other.

The user selects the group photographing mode to start the photographing. The image capturing apparatus 1 selects the group photographing mode in response to a predetermined operation. As similar to the fifth embodiment, the image capturing apparatus 1 associates the images captured during the group photographing mode into the group, and stores information of the associated second images in the storage 102 or the like.

The display controller 12 determines the second images to be associated with the monitor image 411 recognized as the first image. Particularly, the second image that has been already captured during the group photographing mode is associated. The display controller 12 checks the conditions relating to the photographing direction and the angle of view for the monitor image and its second image, and determines whether or not the second image is recognized as the display target. As the conditions at this time, the same conditions as those of the first embodiment can be adopted. The display controller 12 uses, for example, the first condition, and determines the second image as the display target if the photographing direction (θ, φ) of the second image is included within the range of the angle of view of the monitor image 411.

The display controller 12 displays a graphic indicating the second image that is the display target so as to be overlapped within the region of the monitor image 411. In the present example, a mark is used as the graphic. At a point ps1, a photographing direction of an image s1 that is the second image is located, and a mark 321 indicating the image s1 is displayed. At a point ps2, a photographing direction of an image s2 that is the second image is located, and a mark 322 indicating the image s2 is displayed. Because of the marks within the monitor image 411, the user can easily recognize the presence/absence and the position of the already-photographed image within the angle of view of the monitor image. Based on the recognition, the user can determine favorable photographing direction and angle of view of an image to be newly photographed and the like.

FIG. 48 shows an example of a display screen in the second monitor system as a modified example. In the second monitor system, a monitor image 412 is displayed as the first image within the background region 50 of the display screen 404, and a graphic of the second image is displayed within and on the periphery of the monitor image 412. At a center point p0 of the display screen 404, a monitor image 412 that is smaller than the display screen 404 is displayed. The size of the monitor image 412 may be changed in accordance with the state of the angle of view or the like. The display controller 12 similarly checks the association and the conditions of the second image for the monitor image 412, and displays a graphic of a second image. The display controller 12 uses, for example, the second condition, and determines a second image as the display target if the photographing direction or a part of the angle of view of this second image is included within a threshold range that is extended out of the range of the angle of view of the monitor image 412. In the present example, at a point ps3, a photographing direction of an image s3 that is the second image is located, and a transparent frame 331 indicating the image s3 is displayed. Moreover, at a point not illustrated on the background region 50 outside the display screen 404, an image s4 that is the second image is located, and a part of a transparent frame 332 indicating the image s4 is displayed within the display scree 404. The image s4 is a wide angle image. Because of the transparent frame on the periphery of the monitor image 412, the user can easily recognize the presence/absence, position and angle of view of the already-photographed image on the periphery of the angle of view of the monitor image 412, and can determine favorable photographing direction and angle of view of a new image.

Moreover, when a photographing process is executed after the photographing direction or the like is determined in the display state of the monitor image 412 as shown in FIG. 48, a screen state may transit to a state in which the monitor image 411 is displayed on the entire display screen 404 as shown in FIG. 47 based on a predetermined input operation. Furthermore, in accordance with a predetermined input operation, switching may be made between the display state of the graphic of the second image and non-display state thereof. Moreover, determination on whether or not the display for the association with the monitor image as described above is executed can be changed depending in accordance with user settings. Within the display screen of the monitor image, a display mode switching button or the like may be provided.

Moreover, an instruction for carrying out the photographing again can be given by selection for the graphic indicating the already-photographed second image displayed to be associated with the monitor image on the display screen 404 through a predetermined operation such as tapping, pinching or the like. The image capturing apparatus 1 enlarges, within the display screen 404, the second image to which the instruction for carrying out the photographing again has been given, and displays this image as a new monitor screen, and besides, adjusts the focal point or the like by automatically carrying out a zooming control operation. The image capturing apparatus 1 executes the photographing process in the photographing direction and the angle of view in this state.

[Effects, Etc.]

As described above, according to the sixth embodiment, the user can easily recognize the presence/absence and the position of the already-photographed image on the monitor image or the like by using the assisting function, and the user can easily determine the favorable photographing direction and angle of view relating to an image to be photographed next or the like with reference to the already-photographed image. The user can select and use, for example, a photographing direction and an angle of view in which the photographing has not been carried out yet to execute the photographing process.

As modified examples of the sixth embodiment, the following examples are listed. The display screen 401 serving as a touch panel as a modified example is applicable as similar to the above description. Moreover, as another modified example, the present invention can be achieved regardless of the usage with the group photographing mode, and it is only required to carry out a process for checking the association or the like during the display of the monitor image as similar to the fourth embodiment. Moreover, the association between the monitor image and the second image may be temporal association, and the association may be automatically canceled after the displaying of the monitor image ends.

Seventh Embodiment

Figure 49:
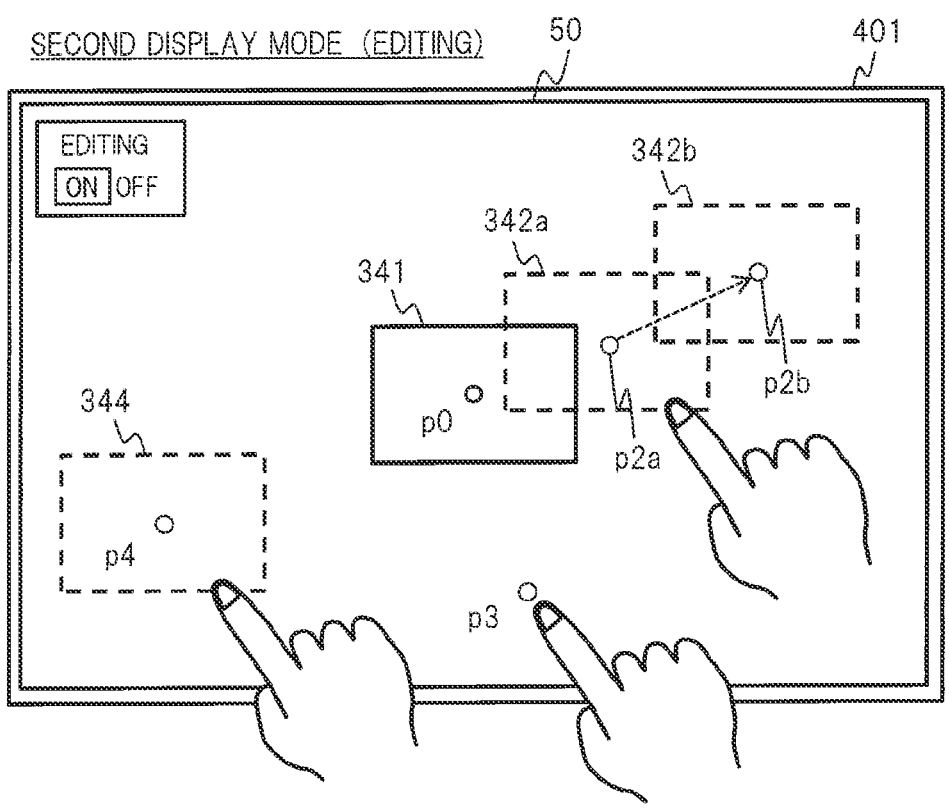
FIG. 49 is a diagram that shows a display screen example of a first editing function in an image capturing apparatus according to a seventh embodiment of the present invention.
Figure 50:
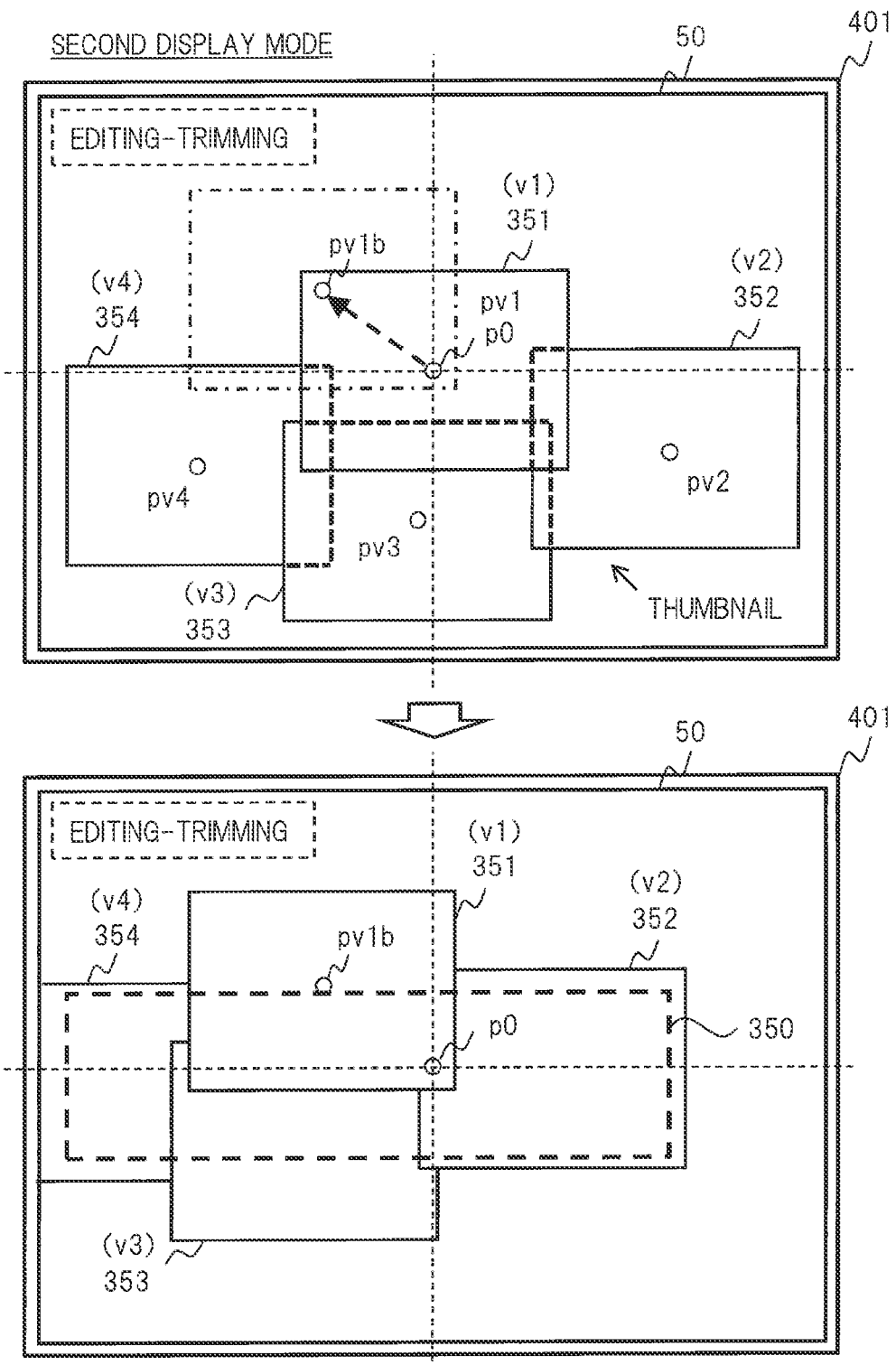
FIG. 50 is a diagram that shows a display screen example of a second editing function in the image capturing apparatus according to the seventh embodiment of the present invention.

With reference to FIG. 49 and FIG. 50, an image capturing apparatus and a display apparatus according to a seventh embodiment of the present invention will be explained. The differences of the configuration of the seventh embodiment from the configuration of the fourth embodiment will be explained below. The seventh embodiment has the editing function of the image as similar to the modified example of the first embodiment. This editing function is a function for allowing the user to determine and to manually set and edit the association among the plurality of images. By using the editing function, the user can add, eliminate and change an image to be associated within the display screen. Moreover, the editing function includes a function for generating a composite image by trimming.

[Editing Function (1)]

FIG. 49 shows an example of a second screen in a second display mode in an image capturing apparatus 1. The following is a case of the image capturing apparatus 1 having the editing function. However, the same is true for a display apparatus 2 having the editing function. In accordance with a user operation, switching can be made between an "ON" state that validates the editing and an "OFF" state that invalidates the editing. In the case of the "ON" state, on the second screen in the second display mode, the image capturing apparatus 1 variably sets the association between the second image and the first image and sets the display position of the graphic of the second image or the like based on a user input operation. The controller 101 stores and manages the display position of the graphic of the second image as one piece of the metadata 22 or the management information 21. At the time of reproducing/displaying, the controller 101 refers to the information and determines the display position of the graphic.

The present example shows a case of display of a transparent frame as the graphic of the second image. First, as similar to the fourth embodiment, the image capturing apparatus 1 automatically determines the display positions of the graphics of the first and second images on the background region 50, and displays the graphics. For example, at a center point p0, a thumbnail that is a graphic 341 of the first image is displayed. Moreover, at a point p2a, a transparent frame that is a graphic 342a of a narrow angle image is displayed as the second image. When the user wishes to change the display position of the graphic of the second image, for example, the user touches the graphic and moves the graphic to a desired position. The controller 101 updates the display state so as to move the display position of the graphic in accordance with the user operation. The present example shows the state of the transparent frame of the graphic 342a after the movement as a graphic 342b located at a point p2b after the movement. The controller 101 stores the position of the graphic of the second image after the movement as a new display position.

Moreover, editing functions include a function for adding a second image to be associated and a function for canceling the association of the second image. In the case of the addition, the user touches a desired position such as a point p3 on the background region 50, and pushes an addition button in a pop-up region to select a second image to be added. The controller 101 displays the graphic relating to the selected second image at this position, and stores the display position so as to make the association between the first image and the second image.

In the case of the cancel, the user selects the graphic of the second image displayed on the background region 50, and assigns the cancel. For example, the user touches a graphic 344 located at a point p4, and pushes a cancel button in the pop-up region. The controller 101 cancels the association between the first image and the second image on which the cancel has been associated to eliminate the display of the graphic.

[Editing Function (2)]

Moreover, the editing functions include a function for generating a composite image by trimming. By this function, a panorama image having an angle of view larger than that of an original image, an image having an angle of view smaller than that of the original image and the like can be generated. First, as similar to the fourth embodiment or the like, the image capturing apparatus 1 acquires an image file 24 relating to a plurality of photographed images or the like. The image capturing apparatus 1 associates and displays the plurality of images on the second screen in the second display mode described above, and turns ON the trimming function of the editing function in response to a user operation. The switching can be made by using a display mode switching button or a mode selection on the reproducing menu or the like.

The upper side of FIG. 50 shows a display example of the second screen caused when the trimming function of the editing function is turned ON, in which four images that are images v1, v2, v3 and v4 are displayed. A thumbnail that is a graphic 351 indicating the image v1 is displayed so that a center point pv1 of the image v1 that is the first image is disposed at the center point p0 of the background region 50. On the periphery of the thumbnail of the image v1, a thumbnail that is a graphic 352 of the image v2 that is the second image is displayed at a point pv2, a thumbnail that is a graphic 353 of the image v3 is displayed at a point pv3, and a thumbnail that is a graphic 354 of the image v4 is displayed at a point pv4.

Moreover, in the present example, the thumbnails of the respective images have a portion overlapped with one another, and a frame line of the overlapped portion is shown with a broken line. The overlapped portion of the thumbnail of the image on the upper (front) side is displayed in accordance with the upper and lower (front and back) layout of the plurality of images. Regarding the upper and lower layout of the images, for example, the first image is displayed on the top layer, and the second image is displayed on the lower layer. The plurality of second images are disposed on the upper and lower layers in an order, for example, depending on the photographing date and time or assigned by the user. The upper and lower layout relationship among the plurality of images can be changed in response to the selection operation to the image or the like. In the present example, the images v1, v2, v3 and v4 are successively disposed in this order from the upper layer. In this state, desired scrolling or enlarging/shrinking is carried out in response to the user operation. For example, it is supposed that the entire image is moved so as to bring the point pv1 of the image v1 to the point pv1b by the scrolling.

The lower side of FIG. 50 shows the second screen after the change of the display state. On the second screen, a trimming frame 350 is displayed on the upper layer than those of the plurality of images on the background region 50. The position, longitudinal and lateral sizes, rotation angle and the like of the trimming frame 350 can be changed in response to user operations such as touching and dragging operations or the like. The user disposes the trimming frame 350 in a desired state at a desired position on an image. In this state, trimming of the image can be carried out in response to a predetermined operation. The predetermined operation is, for example, the pushing down of the shutter button, the input of the trimming execution instruction, or the like. Thus, the image capturing apparatus 1 newly generates image data of the trimming image including the range of the angle of view of each of images included within the trimming frame 350, and stores the data in the storage 102 or the like.

When the trimming is executed, if as described in the present example, respective ranges of the angles of view of the plurality of images are included within the trimming frame 350, the image capturing apparatus 1 composes the ranges of the angles of view of the plurality of images to generate one trimming image. When the trimming image is generated, the image capturing apparatus 1 loads pieces of the image data 23 corresponding to the respective images (v1, v2, v3) onto the memory 133, and composes the pieces of data by using a stitching process that is a publicly-known image processing or the like. Thus, a composite image corresponding to the trimming frame 350 can be obtained. In the present example, a panorama image having a horizontal angle of view corresponding to the lateral size of the trimming frame 350 can be obtained as the composite image. The present invention is not limited to the above-described example, and an image or the like formed by extracting a desired range of an angle of view by the trimming from the range of the angle of view of the wide angle image can be generated.

[Effects, Etc.]

As described above, according to the seventh embodiment, by using the editing function, the user can freely edit the associating display of the plurality of images in the second display mode so as to be easily viewed or recognized by the user himself/herself. Moreover, in the related art method, when it is desirable to generate, for example, a panorama image, such an operation as to capture an image while panning a camera has been required. On the other hand, according to the seventh embodiment, by using the editing function, the user can easily obtain a desired panorama image or an image having a desired angle of view while checking a plurality of photographed images.

Eighth Embodiment

An image capturing apparatus and a display apparatus according to an eighth embodiment of the present invention will be explained. The differences of the configuration of the eighth embodiment from the configuration of the fourth embodiment will be explained below. As similar to the second embodiment, the image capturing apparatus 1 of the eighth embodiment has a function for capturing the celestial sphere image as the wide angle image, and a function for displaying the wide angle image to be associated as the first image or the second image.

The celestial sphere image of the eighth embodiment is the same as that shown in the above-described FIG. 22. The partial configuration relating to the image capture part 103 of the image capturing apparatus 1 is the same as that shown in the above-described FIG. 23. The appearance of the packaging example of the image capturing apparatus 1 is the same as that shown in the above-described FIG. 24. The lens part 32c of the third image capture part 103C is provided with a third lens capable of capturing a narrow angle image 6C at a set angle of view (for example, a general angle of view about 50 degrees) that is less than 180° in the horizontal direction and the vertical direction on the front face. The angle of view set when the image is captured by the image capture part 103C can be set within a predetermined angle of view based on a user operation. For example, it is supposed to capture the narrow angle image 6C having 50° as the horizontal angle of view Ah.

[Second Display Mode—Second Screen]

In the eighth embodiment, as similar to the fourth embodiment, the first image and the second image are displayed so as to be associated with each other on the background region 50 on the second screen in the second display mode. At this time, in the eighth embodiment, the celestial sphere image or the half celestial sphere image can be applied as the first image and the second image. For example, in display using the second screen in the same system as that of FIG. 38, when the first image is the celestial sphere image, a half celestial sphere portion corresponding to the photographing direction of the celestial sphere image is displayed as it is on the circular background region 50.

[Effects, Etc.]

As described above, according to the eighth embodiment, when the celestial sphere image or the like is displayed as the wide angle image, a plurality of images including a narrow angle image having a relationship can be displayed so as to be associated, so that the user can easily recognize the relationship among the plurality of images.

As modified examples of the eighth embodiment, the following examples may be used. When the celestial sphere image is displayed on the second screen, the celestial sphere image may be displayed so as to be not a circular shape but converted to a rectangular region having a horizontal angle of view of 360° as similar to FIG. 36. Moreover, as another modified example, the celestial sphere image may be displayed within the background region 50 so as to be a shrunk circular shape.

In the foregoing, the invention made by the inventors of the present invention has been concretely described on the basis of the embodiments. However, the present invention is not limited to the foregoing embodiments, and various modifications and alterations can be made within the scope of the present invention. The functions of the present invention or the like may be partially or entirely achieved by hardware such as an integrated circuit or the like or by a software program processing.

EXPLANATION OF REFERENCE NUMERALS

1 . . . image capturing apparatus, 2 . . . display apparatus, 3 . . . server, 4 . . . communication network, 11 . . . image capture controller, 12 . . . display controller, 13 . . . touch detection part, 14 . . . setting part, 15 . . . associating part, 21 . . . management information, 22 . . . metadata, 23 . . . image data, 24 . . . image file, 101 . . . controller, 102 . . . storage, 103 . . . image capture part, 104 . . . display apparatus, 105 . . . operation input part, 106 . . . recording part, 107 . . . recording medium, 108 . . . communication interface part, 111 . . . photographing direction measuring part, 112 . . . inner clock, 113 . . . position detecting part, 131 . . . interface circuit part, 132 . . . signal processor, 133 . . . memory, 901 . . . first image, 902, 903 . . . graphic, 904 . . . second image

The invention claimed is:

1. An image capturing apparatus comprising:
an imager configured to acquire image data by capturing images including a first image and a second image;
a display configured to reproduce/display the images on a display screen based on the image data; and
a controller configured to:
acquire first information, the first information including at least either an azimuth angle or an elevation angle as a photographing direction of each image and at least either an angle of view of the each image or angle-of-view related information for calculating the angle of view, and
when a second photographing direction or a partial angle of view of the second image is included within a range of a first angle of view in a first photographing direction of the first image or within a range of a threshold angle of view extended out of the range of the first angle of view, control the display to reproduce/display (1) the first image or a first graphic indicating the first image selected based on a user operation on a background region corresponding to a predetermined range of angle of view within the display screen, and (2) the second image or a second graphic indicating the second image in a positional relationship corresponding to the second photographing direction, wherein the background region is a rectangular or circular region corresponding to a range of an angle of view that is equal to or more than 180° in a spherical face of a celestial sphere centered on the image capturing apparatus, and wherein at a time of the reproducing/displaying, on the background region, the controller is configured to control the display to reproduce/display, onto the spherical face, (1) a projection image of the first image, a shrunk first image thereof, or an enlarged first image thereof at a position corresponding to the first photographing direction of the first image, and (2) a projection image of the second image, a shrunk second image thereof, or an enlarged second image thereof at a position corresponding to the second photographing direction of the second image.

2. The image capturing apparatus according to claim 1, further comprising a storage storing the image data and the first information, wherein the angle-of-view related information includes an electronic zooming magnification, a focal length, and a dimension or model type of an image capture element, and wherein when the angle-of-view related information is included in the first information, the angle of view is calculated from the angle-of-view related information, and the angle of view is written into the first information.

3. The image capturing apparatus according to claim 1, wherein the second graphic has a shrunk image of the second image, an enlarged image of the second image, a predetermined graphic including a mark, a transparent frame, or an attribute value of the second image.

4. The image capturing apparatus according to claim 1, wherein a display size of the first image or the first graphic is a size corresponding to the first angle of view of the first image, and wherein a display size of the second image or the second graphic is a size corresponding to the second angle of view of the second image.

5. The image capturing apparatus according to claim 1, wherein, when there are a plurality of second images having the positional relationship within a same region on the background region, a graphic indicating a representative is displayed as the second graphic, and wherein in accordance with a selection operation of the graphic indicating the representative, information relating to the plurality of second images is displayed so that the second image can be selected.

6. An image capturing apparatus comprising:

an imager configured to acquire image data by capturing images including a first image and a second image;

a display configured to reproduce/display the images on a display screen based on the image data; and a controller configured to:

acquire first information, the first information including at least either an azimuth angle or an elevation angle as a photographing direction of each image and at least either an angle of view of the each image or angle-of-view related information for calculating the angle of view, and when a second photographing direction or a partial angle of view of the second image is included within a range of a first angle of view in a first photographing direction of the first image or within a range of a threshold angle of view extended out of the range of the first angle of view, control the display to reproduce/display (1) the first image or a first graphic indicating the first image selected based on a user operation on a background region corresponding to a predetermined range of angle of view within the display screen, and (2) the second image or a second graphic indicating the second image in a positional relationship corresponding to the second photographing direction, wherein, at a time of the reproducing/displaying, based on the user operation, on the display screen, the controller is configured to control the display to reproduce/display as a first screen in a first display mode, information relating to the images captured by the imager as a list, as a second screen in a second display mode, the first image or the first graphic selected within the first screen on the background region, and the second image or the second graphic having the positional relationship, and as a third screen in a third display mode, the first image or the second image selected within the second screen in detail.

7. The image capturing apparatus according to claim 1, wherein, at a time of an image capturing, a monitor image during a photographing is displayed as the first image on the background region of the display screen, and the second graphic is displayed when there is the second image.

8. The image capturing apparatus according to claim 1, wherein, at the time of the reproducing/displaying, based on the user operation on the display screen, a trimming frame is disposed on the first image and the second image on the background region, and a composite image among ranges of angle of view of images included within the trimming frame is generated and stored as the image data.

9. The image capturing apparatus according to claim 1, wherein the imager is allowed to capture a wide angle image having an angle of view that is equal to or more than 180° and equal to or less than 360°, and wherein at least either the first image or the second image is the wide angle image.

10. The image capturing apparatus according to claim 1, wherein the images captured are still images or motion images.

11. The image capturing apparatus according to claim 6, wherein the background region is a rectangular or circular region corresponding to a range of an angle of view that is equal to or more than 180° in a spherical face of a celestial sphere centered on the image capturing apparatus, and wherein at a time of the reproducing/displaying, on the background region, the controller is configured to control the display to reproduce/display, onto the spherical face, (1) a projection image of the first image, a shrunk first image thereof, or an enlarged first image thereof at a position corresponding to the first photographing direction of the first image, and (2) a projection image of the second image, a shrunk second image thereof, or an enlarged second image thereof at a position corresponding to the second photographing direction of the second image.

12. The image capturing apparatus according to claim 6, further comprising a storage storing the image data and the first information,
    wherein the angle-of-view related information includes an electronic zooming magnification, a focal length, and a dimension or model type of an image capture element, and
    wherein when the angle-of-view related information is included in the first information, the angle of view is calculated from the angle-of-view related information, and the angle of view is written into the first information.

13. The image capturing apparatus according to claim 6,
    wherein the second graphic has a shrunk image of the second image, an enlarged image of the second image, a predetermined graphic including a mark, a transparent frame, or an attribute value of the second image.

14. The image capturing apparatus according to claim 6,
    wherein a display size of the first image or the first graphic is a size corresponding to the first angle of view of the first image, and
    wherein a display size of the second image or the second graphic is a size corresponding to the second angle of view of the second image.

15. The image capturing apparatus according to claim 6,
    wherein, when there are a plurality of second images having the positional relationship within a same region on the background region, a graphic indicating a representative is displayed as the second graphic, and
    wherein in accordance with a selection operation of the graphic indicating the representative, information relating to the plurality of second images is displayed so that the second image can be selected.

16. The image capturing apparatus according to claim 6,
    wherein, at a time of an image capturing, a monitor image during a photographing is displayed as the first image on the background region of the display screen, and the second graphic is displayed when there is the second image.

17. The image capturing apparatus according to claim 6,
    wherein, at the time of the reproducing/displaying, based on the user operation on the display screen, a trimming frame is disposed on the first image and the second image on the background region, and a composite image among ranges of angle of view of images included within the trimming frame is generated and stored as the image data.

18. The image capturing apparatus according to claim 6,
    wherein the imager is allowed to capture a wide angle image having an angle of view that is equal to or more than 180° and equal to or less than 360°, and
    wherein at least either the first image or the second image is the wide angle image.

19. The image capturing apparatus according to claim 6,
wherein the images captured are still images or motion images.

* * * * *